United States Patent
Reis et al.

(10) Patent No.: US 10,009,910 B2
(45) Date of Patent: Jun. 26, 2018

(54) REDUCED POWER FOR AVOIDANCE OF INTERFERENCE IN WIRELESS COMMUNICATIONS

(71) Applicant: Higher Ground LLC, Palo Alto, CA (US)

(72) Inventors: Robert S. Reis, Palo Alto, CA (US); Mark E. Russell, Pine Grove, CA (US); Shmuel Shaffer, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 0 days. days.

(21) Appl. No.: 15/455,775

(22) Filed: Mar. 10, 2017

(65) Prior Publication Data
US 2017/0188377 A1    Jun. 29, 2017

Related U.S. Application Data

(63) Continuation-in-part of application No. 15/379,023, filed on Dec. 14, 2016.
(Continued)

(51) Int. Cl.
| | |
|---|---|
| H04W 4/00 | (2018.01) |
| H04W 72/08 | (2009.01) |
| H04L 12/26 | (2006.01) |
| H04W 52/02 | (2009.01) |
| H04W 52/24 | (2009.01) |
| H04L 29/08 | (2006.01) |

(52) U.S. Cl.
CPC .......... *H04W 72/085* (2013.01); *H04L 43/16* (2013.01); *H04W 52/0209* (2013.01); *H04W 52/243* (2013.01); *H04L 67/12* (2013.01)

(58) Field of Classification Search
CPC .............. H04W 72/082; H04W 52/343; H04L 43/0882; H04L 43/087
See application file for complete search history.

(56) References Cited

U.S. PATENT DOCUMENTS

| | | | |
|---|---|---|---|
| 2010/0118733 A1* | 5/2010 | Wu | H04W 52/265 370/254 |
| 2015/0230105 A1* | 8/2015 | Negus | H04B 7/0408 370/329 |
| 2015/0282184 A1* | 10/2015 | Yang | H04L 5/003 455/513 |

* cited by examiner

*Primary Examiner* — Shukri Abdallah Taha
(74) *Attorney, Agent, or Firm* — Parker Ibrahim & Berg LLP; James M. Behmke; Stephen D. LeBarron

(57) ABSTRACT

In one embodiment, a device of a first wireless communication network determines a link budget from a terminal in the first communication network to an unintended receiver for a communication from the terminal to an intended receiver in the first wireless communication network, based on the communication being configured with initial communication parameters. The device also determines whether one or more adjusted communication parameters would result in reducing a received power at the unintended receiver being below a link budget threshold, while still satisfying a receive sensitivity of the intended receiver. If so, the device causes the terminal to transmit the communication using the adjusted communication parameters. In one embodiment, the device is the terminal, and causing comprises transmitting as the terminal. In another embodiment, the device is a server of the first communication network, and causing comprises instructing the terminal to transmit the communication using the adjusted communication parameters.

22 Claims, 43 Drawing Sheets

Related U.S. Application Data

(60) Provisional application No. 62/267,065, filed on Dec. 14, 2015.

| INPUT PARAMETER | VALUE | UNIT | NOTES |
|---|---|---|---|
| ANTENNA SIZE | 5x5 | cm | |
| ANTENNA TRANSMIT GAIN | 9 | dBi | |
| TRANSMIT FREQUENCY | 5.9 to 6.4 | GHz | |
| POWER INPUT TO THE ANTENNA | 1 | Watts | |
| EIRP (dBW) | 9 | dBW | |
| EIRP (watts) | 7.9 | watts | |
| MAX. DEVICE DUTY CYCLE (TDMA) | 50 | % | OVER 10 SEC. |

FIG. 7

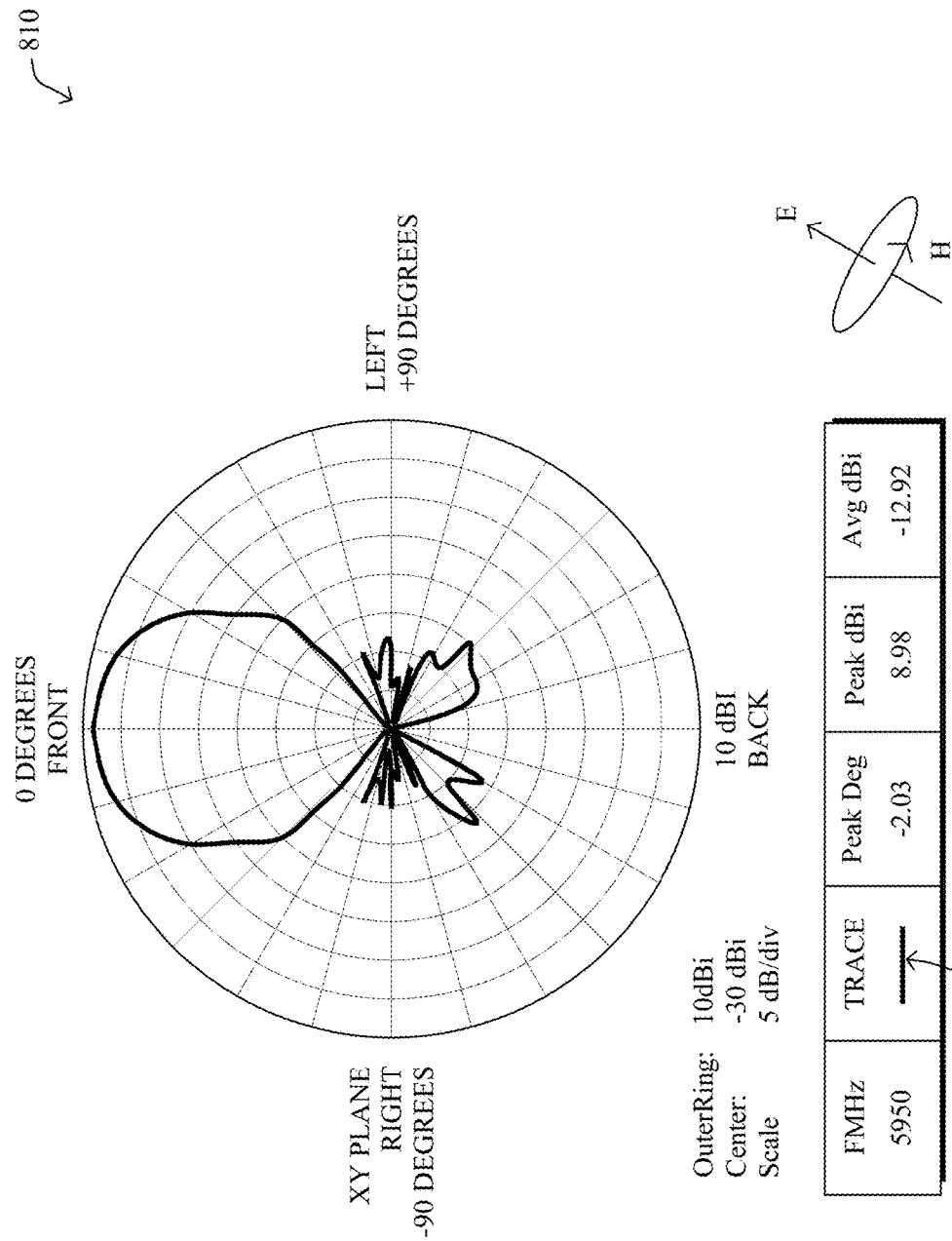

| DEGREES OFF BORE-SITE 910 | GAIN (dBI) 920 | EIRP (dBW) 930 |
|---|---|---|
| 0 | 9 | 9 |
| 15 | 7.5 | 7.5 |
| 30 | 3 | 3 |
| 45 | -8 | -8 |
| 60 | -28 | -28 |
| 75 | -17 | -17 |
| 90 | -20 | -20 |

GAIN PATTER/TABLE FOR QUAD PATCH ANTENNA (XY & XZ PLANE)

FIG. 9

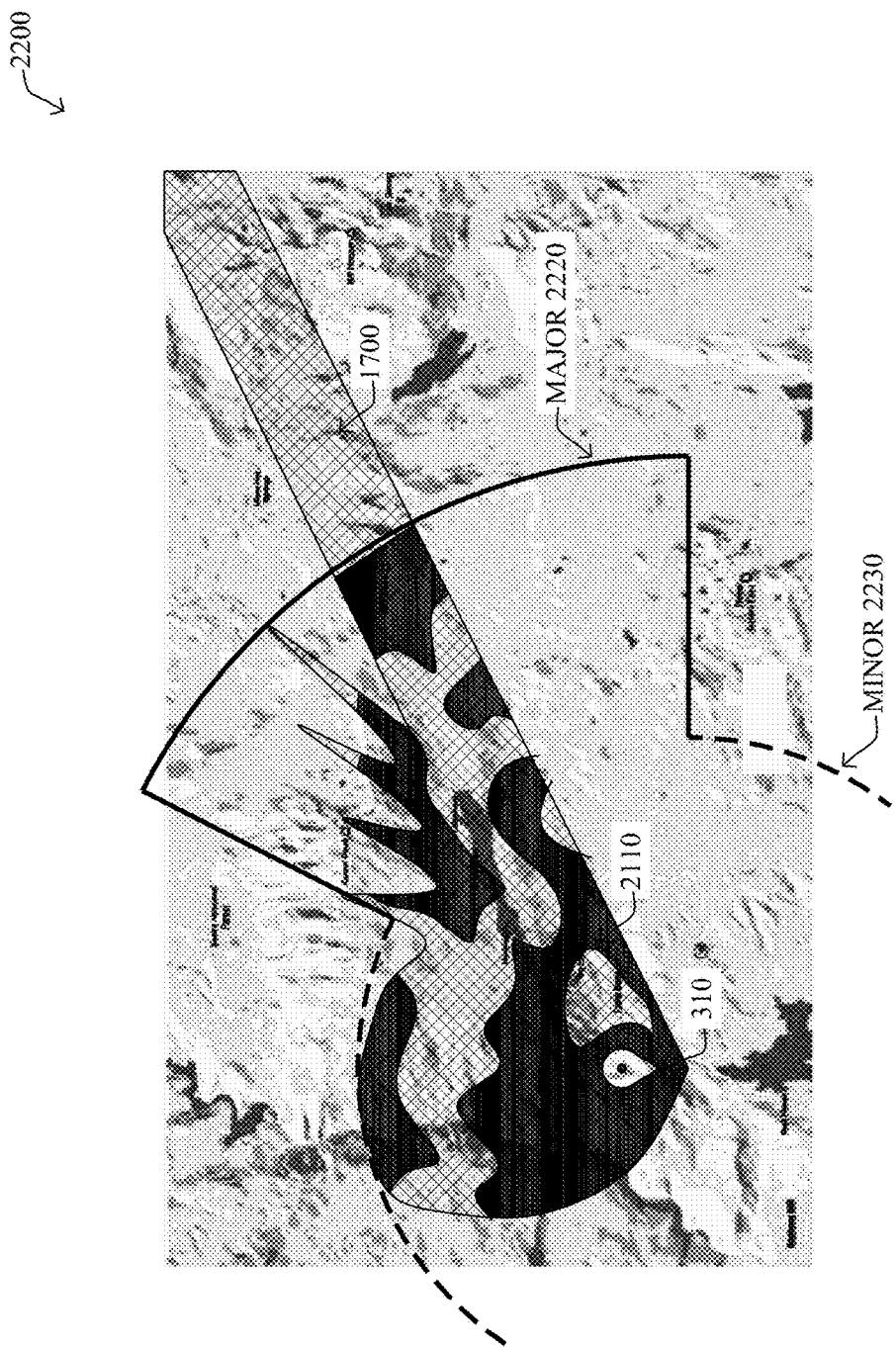

| XMTR CALL SIGN | FREQ. | XMTR BEARING | POL. | TOTAL ELEV. (ft) | RCV BEARING | POINT NORTH? | RADIO HORIZON (mi) |
|---|---|---|---|---|---|---|---|
| WCE217 | 5928.75 | 123.5 | V | 518 | 303.5 | YES | 7.8 |
| WGF58 | 5927.5 | 24 | V | | 204 | NO | |
| WLR549 | 5926.25 | 328 | H | | 148 | NO | |
| WLW366 | 5926.25 | 62.5 | H | | 242.5 | NO | |
| WMM923 | 5927.5 | 18.5 | V | | 198.5 | NO | |
| WMM923 | 5927.5 | 124.4 | V | 1450 | 304.4 | YES | 15.2 |
| WMQ211 | 5927.5 | 305.3 | V | | 125.3 | NO | |
| WMQ270 | 5927.5 | 240.2 | V | 1157 | 62.2 | YES | 46.9 |
| WMQ536 | 5927.5 | 63.9 | V | | 243.9 | NO | |
| WMQ660 | 5927.5 | 247.7 | H | 430 | 67.7 | YES | 15.8 |
| WMQ660 | 5927.5 | 349.6 | H | | 169.6 | NO | |
| WPNJ399 | 5926.25 | 54.9 | V | | 234.9 | NO | |
| WMQ811 | 5927.5 | 6.6 | V | | 186.6 | NO | |
| WMR809 | 5926.5 | 192.9 | V | 1329 | 12.9 | YES | 23.6 |
| WNTJ326 | 5928.75 | 248.5 | V | | 68.5 | NO | |
| WPNJ518 | 5926.5 | 174.1 | V | 486 | 354.1 | YES | 8.5 |
| WPTD331 | 5929.575 | 96.8 | V | 330 | 276.8 | YES | 6.3 |
| WQKZ948 | 5928.75 | 162.2 | H | 450 | 342.2 | YES | 21.9 |

ACTIVE PtP MICROWAVE LINKS BETWEEN 5925.01 MHz AND 5930.0 MHz (US)

FIG. 25A

REDUCED POWER FOR AVOIDANCE OF INTERFERENCE IN WIRELESS COMMUNICATIONS

RELATED APPLICATIONS

This application is a continuation-in-part of U.S. patent application Ser. No. 15/379,023 filed on Dec. 14, 2016, entitled AVOIDANCE OF INTERFERENCE IN WIRELESS COMMUNICATIONS, by Reis, et al., which claims priority to U.S. Provisional Patent Appl. No. 62/267,065 filed on Dec. 14, 2015, entitled CHANNEL CLEARANCE AND AVOIDANCE IN WIRELESS COMMUNICATIONS, by Reis, et al., the contents of each of which being incorporated herein by reference in their entirety.

TECHNICAL FIELD

The present disclosure relates generally to wireless communication systems, and, more particularly, to reduced power for avoidance of interference in wireless communications.

BACKGROUND

Wireless communication systems have become ubiquitous in the world today, such as, for example, cellular mobile telephony, point-to-point microwave systems, satellite communication systems, and so on. Within each of these systems, and particularly due to the co-existence of such systems, challenges are presented when it comes to managing communication in a manner that prevents or at least minimizes interference. Common methods of interference minimization and/or avoidance may include use of different frequency bands, different polarizations, multiplexing techniques, geographical separation, etc. These methods typically work well for networks having fixed transmitters and receivers. When receivers or transmitters are allowed to move, however, the occurrence of interference may be greater, and performance may degrade.

For example, certain wireless communication frequencies (e.g., C-band communications) can only communication when there is a clear line-of-sight (LOS) between transmitter and receiver. Accordingly, interference of a C-band transmitter with a C-band receiver is possible only if there is a clear line-of-sight from the transmitter to the receiver. As such, if the transmitter roams, it may move from a point at which no interference was possible to one in which it becomes a potential interferer with the receiver. Other factors involved in determining whether a transmitter, in general, interferes significantly with a received signal, in addition to overlapping communication bands/channels, may further include transmit power, receive antenna type/gain, polarizations, distance from the transmitter to the receiver, and so on.

In certain environments, radio signal interference may be nothing more than a slight nuisance, while in other environments, the interference may be more problematic to the communication network, such as reduced bandwidth, lost (e.g., and repeated) messages, and so on. In still other environments, however, such interference may not only be particularly detrimental (e.g., introducing noise to received voice communication or partial/complete loss of picture for TV communication), but it may also be strictly prohibited by communication regulations, perhaps even being criminally offensive. Regardless of the environment, it is thus beneficial to ensure adequate interference mitigation, and in some instances absolute interference avoidance.

SUMMARY

According to one or more of the embodiments herein, a device of a first wireless communication network determines a link budget from a terminal in the first communication network to an unintended receiver for a communication from the terminal to an intended receiver in the first wireless communication network, based on the communication being configured with initial communication parameters. The device may then also determine whether one or more adjusted communication parameters would result in reducing a received power at the unintended receiver being below a link budget threshold, while still satisfying a receive sensitivity of the intended receiver. If so, the device may then cause the terminal to transmit the communication using the adjusted communication parameters. Notably, in one embodiment, the device is the terminal, and thus causing comprises transmitting as the terminal. In another embodiment, the device is a server of the first communication network, and thus causing comprises instructing the terminal to transmit the communication using the adjusted communication parameters.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example antenna configuration table;

FIGS. 8A-8B illustrate an example of antenna patterns;

FIG. 9 illustrates an example of antenna gain patterns;

FIG. 22 illustrates an example of major and minor horizons associated with the reduced protection zone of FIG. 21;

FIG. 25A illustrates an example of active point-to-point microwave links between 5925.01 MHz and 5930.0 MHz in the United States;

DESCRIPTION OF EXAMPLE EMBODIMENTS

A communication network is a distributed collection of nodes (e.g., transmitters, receivers, transceivers, etc.) interconnected by communication links and segments for transporting signals or data between the nodes, such as telephony, TV/video, personal computers, workstations, mobile devices, servers, routers, base stations, satellites, or other devices. Many types of communication networks are available, including, but not limited to, computer networks (e.g., local area networks, wide area networks, and so on), communication networks (e.g., cellular networks, broadband networks, etc.), infrastructure or backhaul networks (e.g., C-Band/microwave inter-tower or "point-to-point" (PtP) networks, etc.), and many others.

Figure 1:
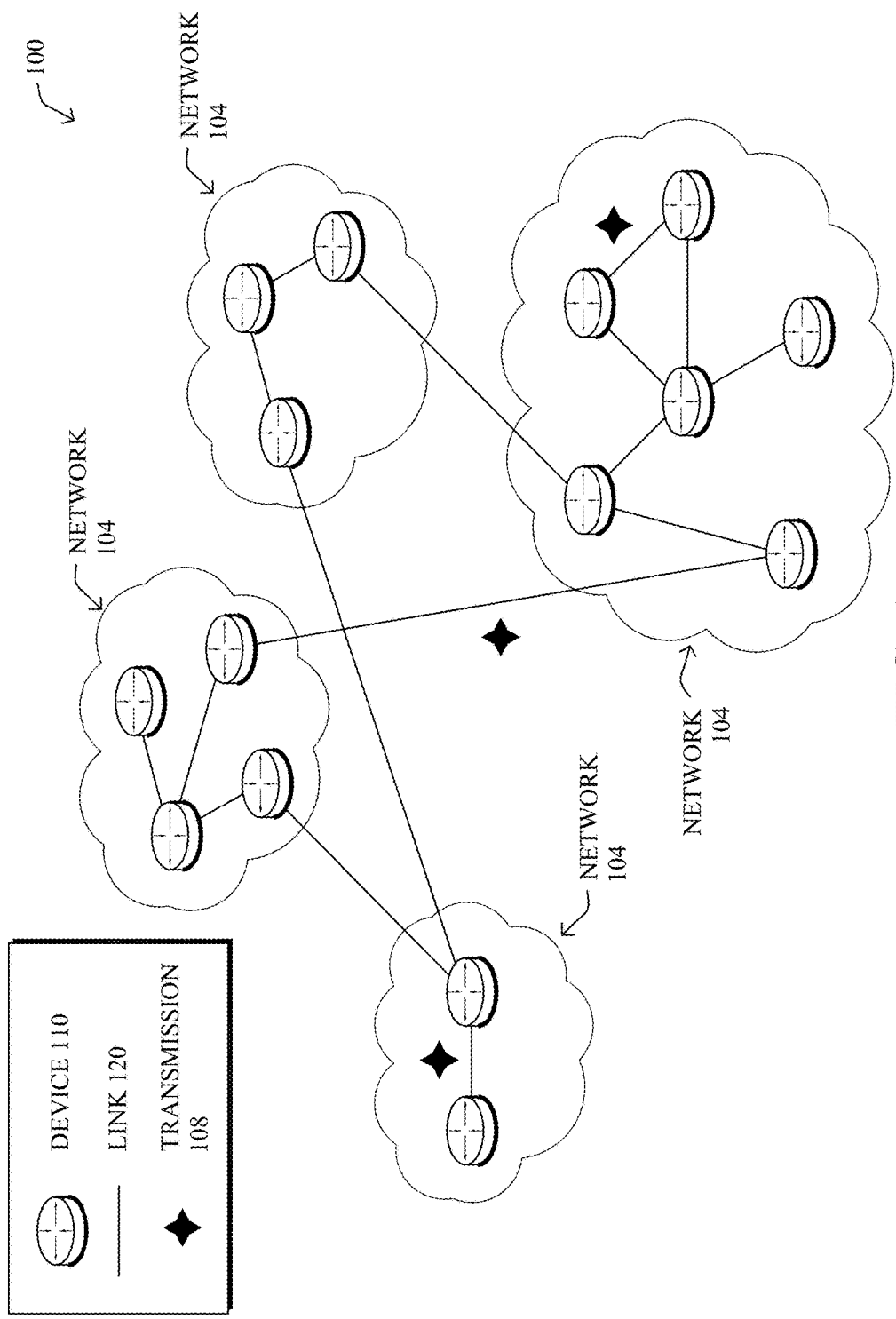
FIG. 1 illustrates an example communications network.

FIG. 1 illustrates an example, and simplified, communications network 100. As shown, one or more individual networks 104 may contain various devices 110 communicating over links 120 specific to the particular network 104, or else between networks. As will be appreciated, networks 104 may include, but are not limited to, local area networks (LANs), wide area networks (WANs), the Internet, cellular networks, infrared networks, microwave networks, satellite networks, or any other form or combination of data network configured to convey data between communicating devices. Networks 104 may include any number of wired or wireless links between the devices, though, as noted herein, the interference techniques herein are generally concerned only with the wireless (or other shared media) links. Example wireless links, therefore, may specifically include, but are not limited to, radio transmission links, near-field-based links, Wi-Fi links, satellite links, cellular links, infrared links, microwave links, optical (light/laser-based) links, combinations thereof, or the like.

Data transmissions 108 (e.g., packets, frames, messages, transmission signals, voice/video/TV/radio signals, etc.) may be exchanged among the nodes/devices of the computer network 100 using predefined communication protocols where appropriate, and such communication may notably be bidirectional or unidirectional. In this context, a protocol consists of a set of rules defining how the nodes interact with each other.

Devices 110 may be any form of electronic device operable to communicate via networks 104. For example, devices 110 may be a desktop computer, a laptop computer, a tablet device, a phone, a smartphone, a wearable electronic device (e.g., a smart watch), a smart television, a set-top device for a television, a specifically designed communication terminal, a satellite phone, a workstation, a sensor/actuator, other IoT devices, etc.

As mentioned above, wireless communication systems, particularly the co-existence of overlapping wireless communication systems, present challenges with regard to preventing or minimizing interference, a problem that is exacerbated when receivers or transmitters are allowed to move. In particular, as described below, the challenge of preventing interference is paramount when an existing communication system operates within dedicated frequency bands, and then a mobile transmitter for a different communication system is introduced into the incumbent system's environment that reuses those same frequency bands that the incumbent system may be already using.

Figure 2:
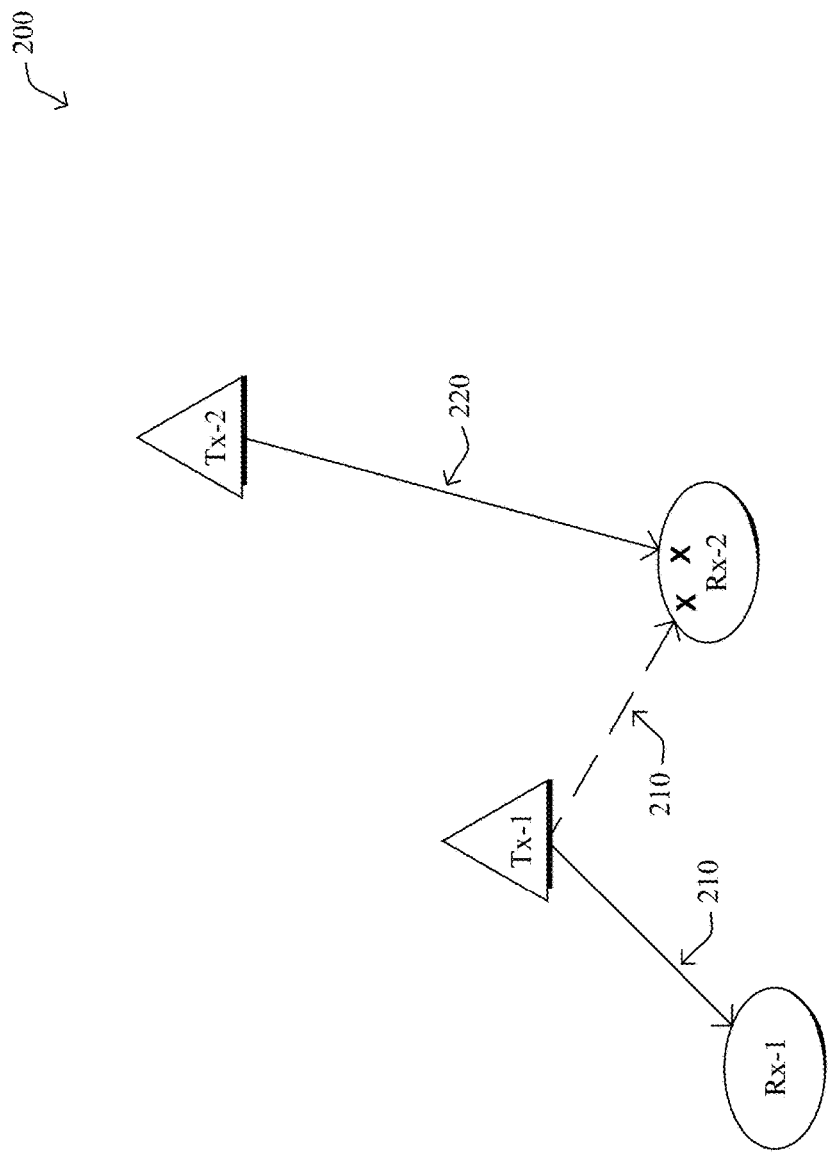
FIG. 2 illustrates an example of communication interference.

FIG. 2 illustrates a simplified example of communication interference in a network 200. Specifically, assume that transmitter Tx-1 communicates with a receiver Rx-1 (signals 210), and transmitter Tx-2 communicates with a receiver Rx-2 (signals 220). In the simple event that these two pairs communicate on the same (or similar) frequency, when transmitter Tx-1 attempts to transmit a signal 210 to receiver Rx-1, it may inadvertently interfere with the ability of receiver RX-2 to receive signals 220 from e.g., transmitter Tx-2. In other words, the interfering signal 210 has introduced "noise" into the receiver Rx-2, interfering with the reception of the signal 220 for which receiver Rx-2 was intended to receive, rending the intended signal 220 indecipherable.

Notably, and as further noted above, while radio signal interference in certain environments is nothing more than a nuisance (added noise to voice communication, messages are low priority, can be repeated, etc.), other environments may consider interference to be particularly detrimental or even strictly prohibited. One such example network that would require adequate interference mitigation, and in particular absolute interference avoidance, is the large existing incumbent communication system using the C-Band (5925-6425 MHz) for high-bandwidth backhaul tower-to-tower communication. For instance, this communication system utilizes a microwave transmission infrastructure that includes numerous terrestrial receivers (or receivers, transceivers, repeaters, etc.) which are on what is generally referred to by the art as a Point-to-Point (PtP) network with PtP Transmitters (PtPTs) transmitting messages to respective PtP Receivers (PtPRs).

Figure 3:
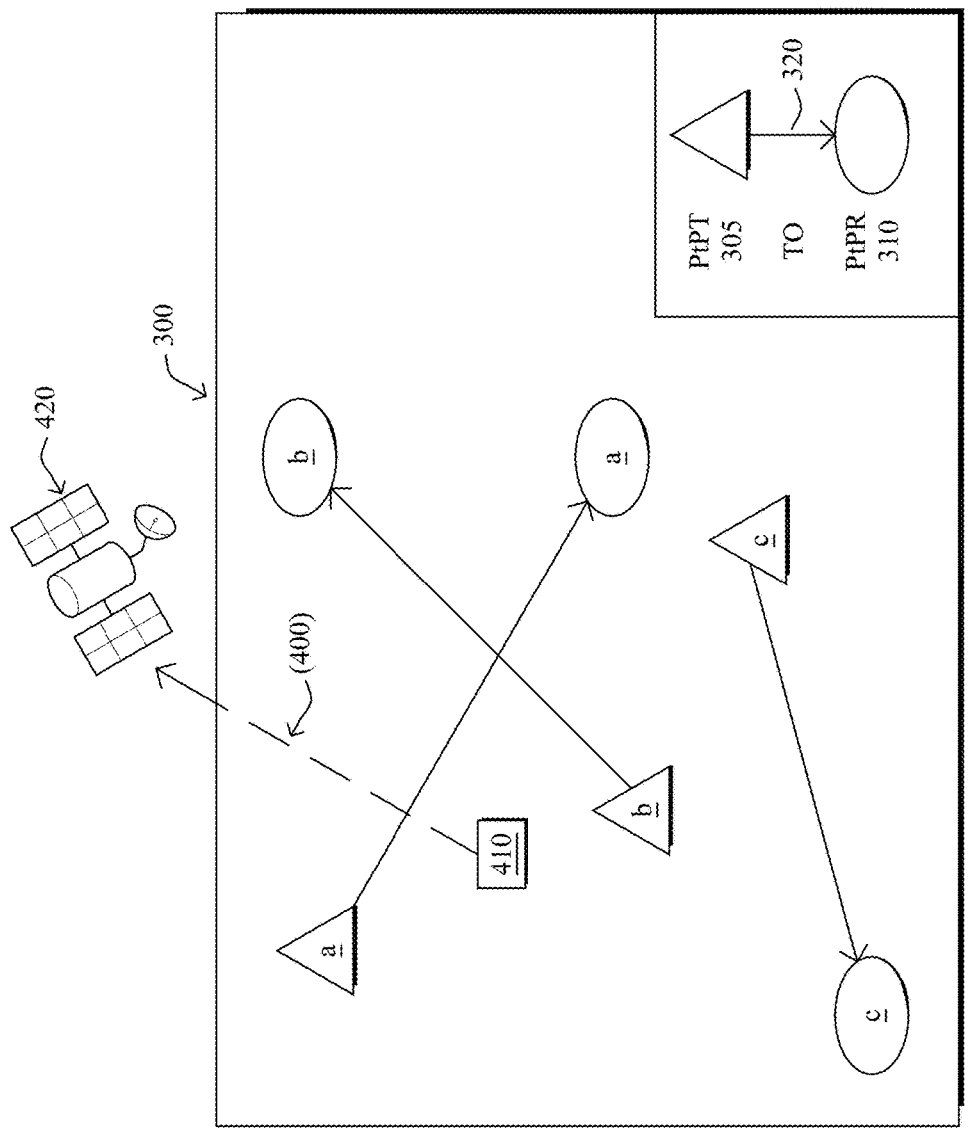
FIG. 3 illustrates an example point-to-point communications network with the potential for interference from a satellite communications network.

FIG. 3 illustrates an example PtP communications network 300 with the potential for interference, for example, from a satellite communications network 400. In particular, PtPTs 305 and PtPRs 310 may be distributed geographically, such as on towers at the tops of mountains, buildings, etc., where PtPTs are configured to communicate wireless transmissions 320 (e.g., microwave, C-band, etc.) with a respective (and opposing) PtPR, as generally indicated by the sub-text "a", "b", and "c". (Note that only receivers are subject to interference, so many references below are made to PtPRs 310 only. However, in certain embodiments, particularly for bidirectional communication systems, a receiver or PtPR may also be a transmitter or PtPT. As used herein, therefore, the term "PtPR" may be used to describe both receivers and transmitters, where appropriate.) In accordance with yet another embodiment, the PtPR may be an unintended satellite in the vicinity of (e.g., in angular proximity of) an intended satellite (e.g., 420, below), where transmission intended to be received by the intended satellite may interfere with the operations of the unintended satellite.

The PtPTs 305 and PtPRs 310 of the network ("incumbent system", "existing system", etc.) 300 are illustratively static; their location, antenna height above ground, direction they are pointing (azimuth and elevation), as well as their radio characteristic (e.g., frequency, lobe shape, and polarity: horizontal, vertical, or both) are generally well known. According to the United States Federal Communications Commission (FCC), for instance, point-to-point microwave transmitters and receivers in the United States are registered within a Universal License Service (ULS) database, which includes details on geo-coordinates (location), antenna types, frequency bands used within the C-band, polarizations, power, etc. Currently, in the US, there are approximately 56,000 PtPRs in the C-band frequency range; all of which are operating within FCC regulations.

In order to introduce a new communication device/terminal 410 that is configured to transmit in the C-band within the environment 300 of the incumbent PtPRs, mechanisms need to be defined to prevent interfering with the operations of the incumbent system. For instance, to create a network of earth station terminals 410 for use with C-band operations with satellites 420 that can provide communication functionality such as, e.g., consumer-based text messaging/light email, voice communication, picture/video communication, and Internet of Things ("IoT") communications, particularly in areas unserved by terrestrial commercial mobile radio services ("CMRS") networks (e.g., cellular or other terrestrial mobile network coverage), such new terminals must be controlled within the environment of the incumbent PtPRs in a manner that prevents harmful interference with the operations (e.g., licensed communication operations) of the incumbent system 300.

The techniques herein provide a robust interference protection regime to ensure that prospective transmitters of one system (e.g., a satellite communication network 400) will not cause harmful interference to an incumbent system (e.g., PtP operations in system 300). As explained below, each receiver (e.g., PtPR) will have one or more associated "Protection Zones", where potential transmitters (e.g., earth station terminals, UAVs, etc.) will be subject to heightened interference protection requirements to ensure that no harmful interference inflicted upon a receiver (which, as described herein, may be based on sufficient availability of frequency bands, spatial, and satellite diversity at C-band frequencies). (As described below, each incumbent receiver may have as many protection zones as the number of intended receivers/satellites that the terminal may attempt to communicate with from a given place, as well as different zones for other reasons, as detailed further herein.)

Figure 4:
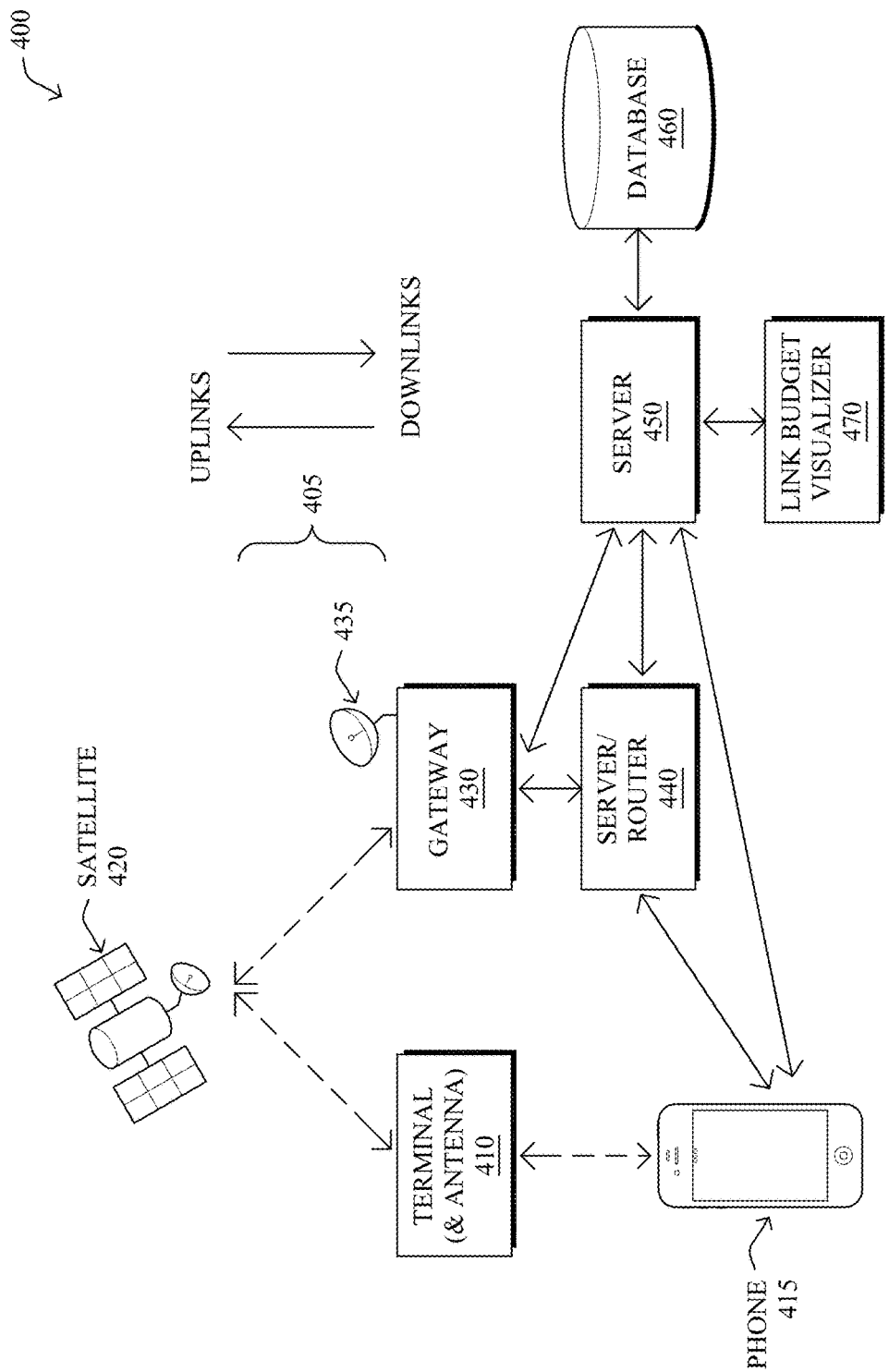
FIG. 4 illustrates an example satellite communications network.

FIG. 4 illustrates an example simplified satellite communications network 400, where one or more communication transmitters 410, which may be mobile or fixed, may be a standalone device, or may be attached to or otherwise associated with another computing device, such as a smartphone 415 or other suitable cooperative device (e.g., laptop, tablet, personal computer, measurement sensors, other types of IoT devices, etc.). Illustratively, the transmitters 410 may be referred to herein as transmitters, terminals, mobile earth terminals (METs), prospective transmitters, etc. According to the illustrative satellite embodiment, the terminals 410 may communicate bi-directionally with conventional (e.g., C-band) geostationary satellites 420, which generally have a known and static location above the earth. (Other, more complex algorithms may be used for determining the location of, and communicating with, non-geostationary satellites, but for simplicity the description herein is based on geostationary satellites. However, the embodiments herein are not so limited.) A ground station or gateway 430 (or "ground receiver", "ground station receiver", etc.) is an illustrative facility at the other end of the satellite transmission. The ground station 430 may include various computing servers connected to a satellite antenna (e.g., satellite dish 435) pointing at the satellite 420.

Transmissions 405 from the terminal 410 to the satellite are relayed from the satellite 420 to the dish 435 on the ground of the ground station 430. Similarly, the ground station 430 transmits to the terminal 410 by sending radio signals via its dish 435, which transmits it to the satellite 420, which then frequency shifts this radio signal and broadcasts it downwards to be received by the terminal 410 (notably within a proper link budget). As referenced herein, the "forward-path" or "downlink" refers to a frequency band that the satellite 420 uses to transmit to the terminals 410 and ground station 430. Conversely, the "return-path" or "uplink" frequency refers to a frequency band that the terminals and ground station use to transmit to the satellite. (Note that the same or different antennas may be used by the various communication devices, e.g., one for uplink, one for downlink, or one for both, and the view and description herein is merely a simplified example for purposes of illustration.) It should be noted that in the illustrative embodiment, the return-path (uplink) frequency band used by the terminals 410 may overlap with frequency bands used by the PtPRs, and as such would be subject to PtPR interference avoidance requirements.

Furthermore, in the illustrative embodiment, three example real-world satellites may be used, such as the Galaxy 3-C satellite at 95.05° W.L., Galaxy 12 satellite at 129° W.L., and Galaxy 19 satellite at 97° W.L. Each of these three Galaxy satellites 420 currently communicate with one of three gateway/remote control earth stations 430 in Napa, Calif. (Call Sign E970391), and Hagerstown, Md. (Call Signs E050048 and E050049), and operate on C-band frequencies in the 3700-4200 MHz (downlink/space-to-Earth) and 5925-6425 MHz (uplink/Earth-to-space) bands. Notably, any satellites, satellite systems, communication frequencies, ground stations, etc., may be used in accordance with the techniques herein, and those mentioned herein are merely for use as an example implementation of an illustrative embodiment, and are not meant to be limiting to the scope of the present disclosure.

Additionally, though specific implementation embodiments are shown herein with relation to terminals 410 being part of, or associated with, a personal communication device (e.g., for text messaging, short emails, voice communication, etc. from a phone), any number of implementations use the techniques described herein, such as being used for sensors or actuators (e.g., IoT implementations), vehicular control (e.g., drones, robots, unmanned aerial vehicles or "UAVs", etc.), or any other system that uses wireless communication, whether located on land, a waterway (e.g., ocean), or in the air.

With reference still to FIG. 4, satellite communication network may further include one or more routers 440 that may be interconnect the devices, such as terminals 410 (and/or phones 415), gateways/ground stations 430, etc. Routers 440 may be interconnected with such devices over standard communications links, such as cellular, Internet, and so on, and may allow further communication by the devices to one or more servers 450, which illustrative have access to one or more databases 460 as described herein (e.g., the FCC ULS database). One or more applications, such as a visualizer tool 470, may also be available via the servers 450 or optionally on the localized terminals 410 (e.g., phones 415), for use as described below. Those skilled in the art will appreciate that any number of communication links, routers, devices, etc. may be available within the satellite communication network 400, and the simplified view shown herein is for illustrative purposes only. Also, while certain devices are shown separately, various functionality (processing, storage, communication, etc.) may be implemented in any suitable configurations, such as the servers 450 being part of the gateway 430, the database 460 being part of the servers 450, and so on. Accordingly, the view in FIG. 4 and the associated description is meant as an example, and not meant to limit the scope of the present disclosure.

Figure 5:
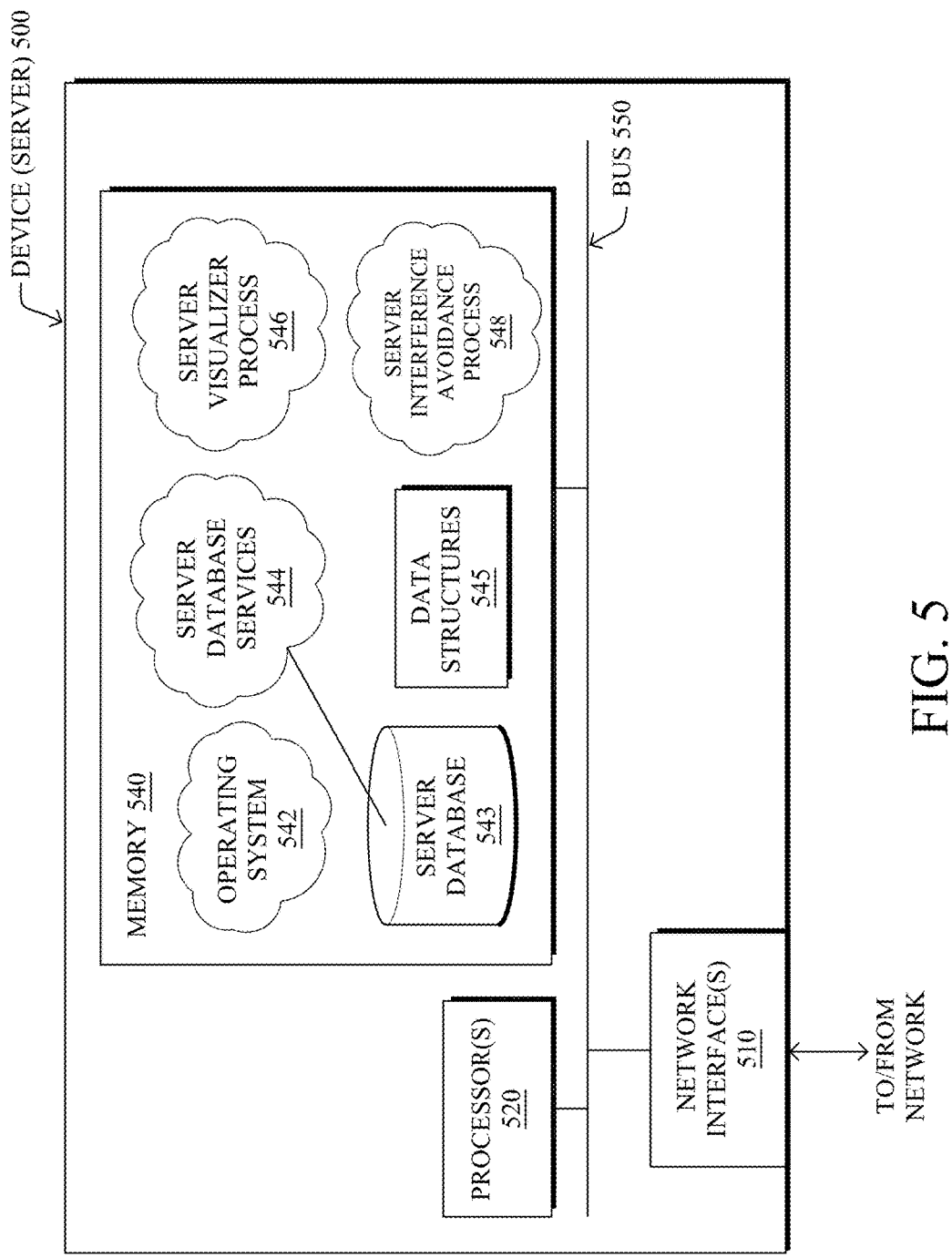
FIG. 5 illustrates an example device configuration, e.g., as a server.

FIG. 5 illustrates a schematic block diagram of an example computing device 500, that may be used with one or more embodiments described herein, e.g., as a ground station/gateway 430, server 450, or other "centralized" device. The device may comprise one or more network interfaces 510 (e.g., wired, wireless, etc.), at least one processor 520, and a memory 540 interconnected by a system bus 550. The network interface(s) 510 contain the mechanical, electrical, and signaling circuitry for communicating data to network(s) 104 and, more particularly, devices 410, 415, 430, etc. The network interfaces may be configured to transmit and/or receive data using a variety of different communication protocols. Note, further, that the nodes/devices may have two different types of network connections 510, e.g., wireless, optical, and wired/physical connections, including connectivity to a satellite dish 435, and that the view herein is merely for illustration.

The memory 540 comprises a plurality of storage locations that are addressable by the processor 520 for storing software programs and data structures associated with the embodiments described herein. The processor 520 may comprise hardware elements or hardware logic adapted to execute the software programs and manipulate the data structures 545. An operating system 542, portions of which is typically resident in memory 540 and executed by the processor, functionally organizes the device by, among other things, invoking operations in support of software processes and/or services executing on the device. These software processes and/or services may illustratively include server database services 544 (e.g., controlling server database 543, and/or accessing an external database 460), a server visualizer process 546 (e.g., an app or an interface to an external visualizer tool 470), and a server interference avoidance process 548, each as described herein.

Figure 6:
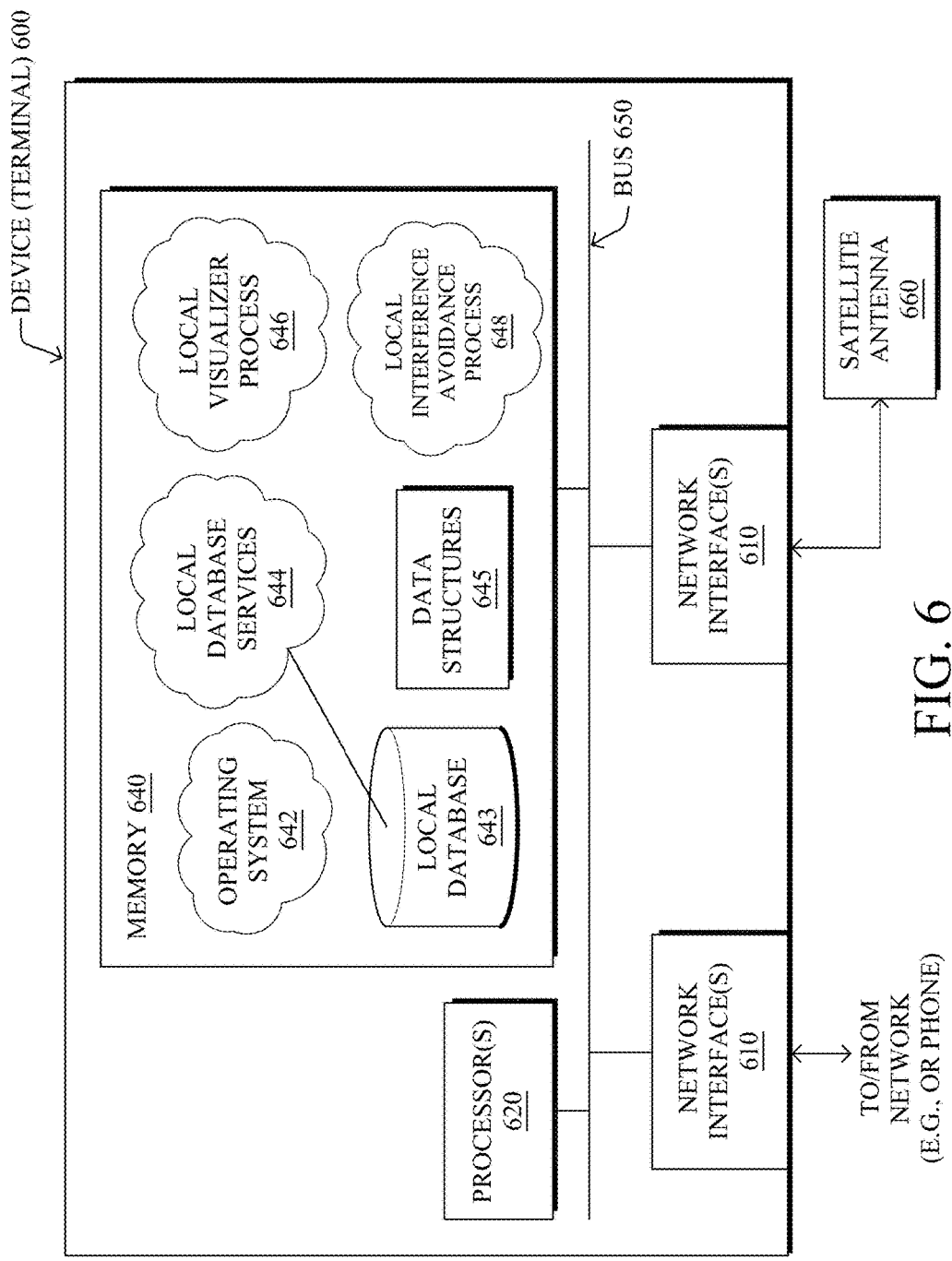
FIG. 6 illustrates another example device configuration, e.g., as a terminal.

Additionally, FIG. 6 illustrates another example device configuration 600, particularly as a terminal/transmitter 410. Note that the terminal 410 may be embodied as a number of various implementations, such as a smartphone peripheral attachment, a component of a smartphone, a standalone handheld device, a sensor components, IoT, vehicular (e.g., unmanned) components, and so on. For instance, terminal 410 may be an attachment to a mobile phone 415 or other mobile device, where some of the processing occurs on the mobile phone and other portions, such as satellite communication, are performed on the attached (or associated) terminal 410. In accordance with another embodiment, an attachment that contains the terminal circuitry is loosely coupled to a mobile device. In accordance with yet another embodiment, all of the components of the terminal 410 are integrated into a single embedded (standalone) system. As such, the schematic block diagram of the device 600 is merely meant as an example representation of illustrative components representing a terminal 410 that may communicate within its own network 400 (e.g., satellite system), while being controlled to prevent interference within shared frequency bands of incumbent network 300.

Device 600, a terminal 410 (e.g., transmitting device), may comprise one or more network interfaces 610 (e.g., wired, wireless, etc.), at least one processor 620, and a memory 640 interconnected by a system bus 650. The network interface(s) 610 contain the mechanical, electrical, and signaling circuitry for communicating data to network(s), such as an attached (or otherwise associated) mobile device (e.g., phone) 415 or other associated device, as well as other network communication techniques, such as wired connection to a personal computer or laptop (e.g., a USB connection). One of the network interfaces 610, in particular, is a wireless network interface (e.g., a transmitter/receiver) configured to interface with a local antenna 660 of the device, which, illustratively, may be a C-band antenna (e.g., configured to communicate with a satellite 420, as described below), and may comprise various communication front-end components such as amplifiers, filters, digital-to-analog and/or analog-to-digital converters, digital signal processors (DSPs), etc. As mentioned above, network interfaces may be configured to transmit and/or receive data using a variety of different communication protocols, and the device 600 may have different types of network connections, e.g., at least one wireless connection, but also optionally other wireless connections and wired/physical connections, and that the view herein is merely for illustration.

A memory 640 comprises the storage locations that are addressable by the processor 620 for storing software programs and data structures associated with the embodiments described herein, where the processor 620 may comprise hardware elements or hardware logic adapted to execute the software programs and manipulate the data structures 645. An operating system 642, portions of which is typically resident in memory 640 and executed by the processor, functionally organizes the device by, among other things, invoking operations in support of software processes and/or services executing on the device. These software processes and/or services may illustratively include local database services 644 (e.g., maintaining local database 643 itself, or accessing an external database), a local visualizer process 646 (e.g., an app or an interface to an external visualizer tool 470), and a local interference avoidance process 648, each as described herein. Note that in certain embodiments, the terminal device 600 (410) may have limited resources (CPU, memory), and the software processes and/or services of the terminal device may be configured to operate in collaboration with a centralized system device 500 (ground station 430/server 450, described above), and may communicate with the centralized device either via broadband communication such as wireless or wired (e.g., USB), or via a very low bandwidth satellite link, particularly as described herein.

Illustratively, the techniques described herein may be performed by hardware, software, and/or firmware, such as in accordance with the various processes of device 500 (ground station 430/server 450) and/or device 600 (terminal 410), which may contain computer executable instructions executed by processors 520/620 to perform functions relating to the techniques described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, or on specific devices, those skilled in the art will appreciate that processes may be routines or modules within other processes, and that various processes may comprise functionality split amongst a plurality of different devices (e.g., client/server relationships).

FIG. 7 illustrates an example antenna configuration (table) 700 for an antenna 660 according to one or more embodiments herein. For example, the illustrative antenna may be approximately 6 cm×4 cm in size, 5 cm×5 cm, or any other suitable size or shape, e.g., with approximately 9 dBi of gain. According to the illustrative embodiments herein, the antenna may operate in the 5.9-6.4 GHz transmission range. The antenna's illustrative input power is 1 Watt (0 dBW). Also, the peak equivalent (or effective) isotropically radiated power (EIRP) using a 9 dBi antenna is 9 dBW (e.g., 7.9 watts). Notably, any suitable antenna configuration may be used (e.g., 50% duty cycle, etc.), and the parameters shown are merely an illustrative example for purposes of discussion herein. Note also, that table 700 is a vast simplification of all of the possible parameters and configurations of an antenna, and is meant to be merely for discussion of an illustrative embodiment herein.

Figure 8B:
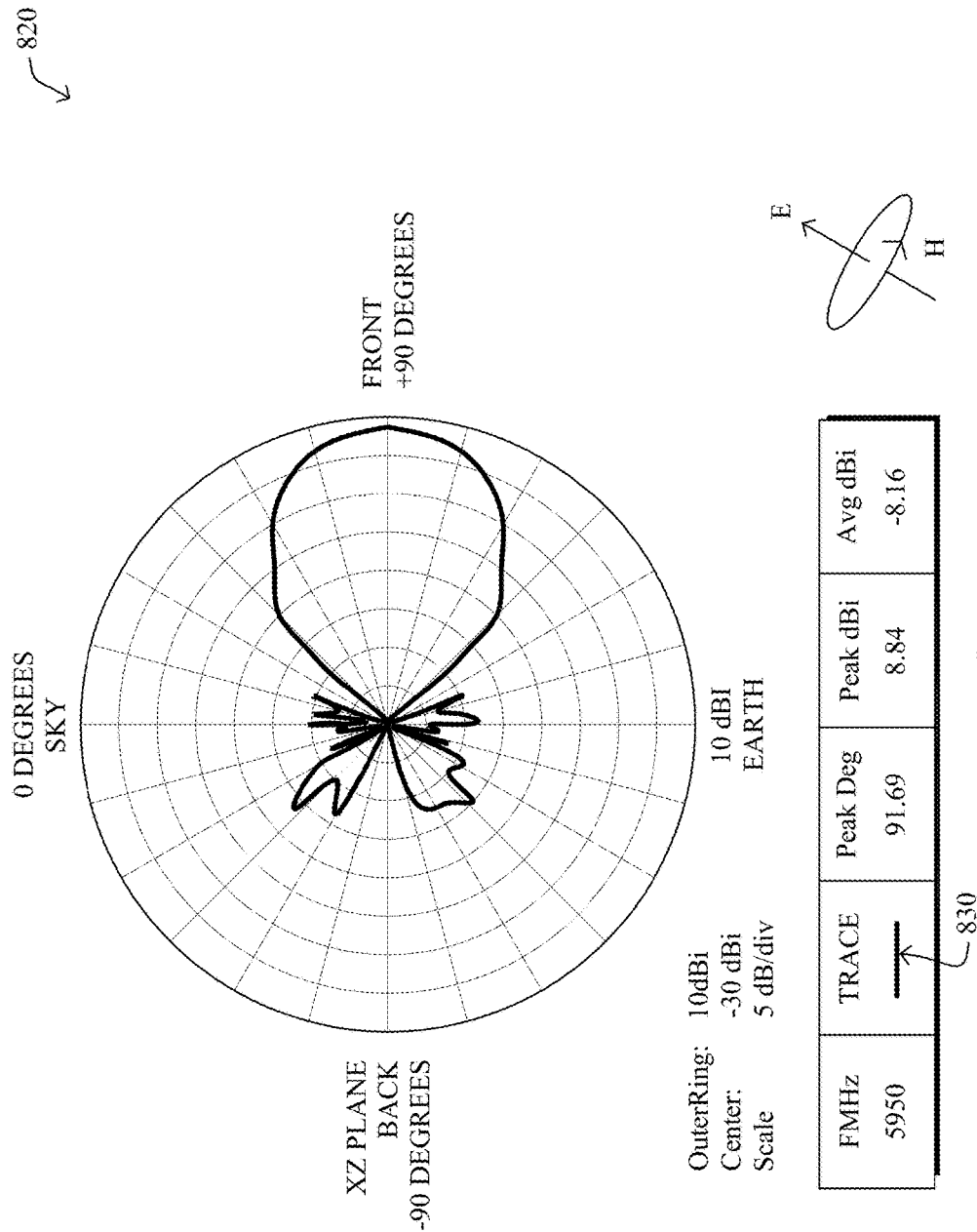

FIGS. 8A-8B illustrate an example earth station terminal antenna gain pattern. The antenna 660 of the terminal 410 (device 600) may be illustratively embodied as a simple, rectangular quad-patch antenna (e.g., 6 cm×4 cm in size) with approximately 9 dBi of gain, as shown in the configuration of FIG. 7. It can be operated in either the vertical or horizontal polarization, or in both. In the azimuth plane 810 (FIG. 8A) or in the elevation plane 820 (FIG. 8B), the pattern 830 is virtually the same. Moreover, table 900 in FIG. 9 shows an illustrative gain pattern 920 and EIRP 930 for the illustrative antenna of earth station terminal 600 (e.g., a quad-patch antenna in the XY and XZ plane), ranging from 0 to 90 degrees off bore-sight 910.

Figure 10A:
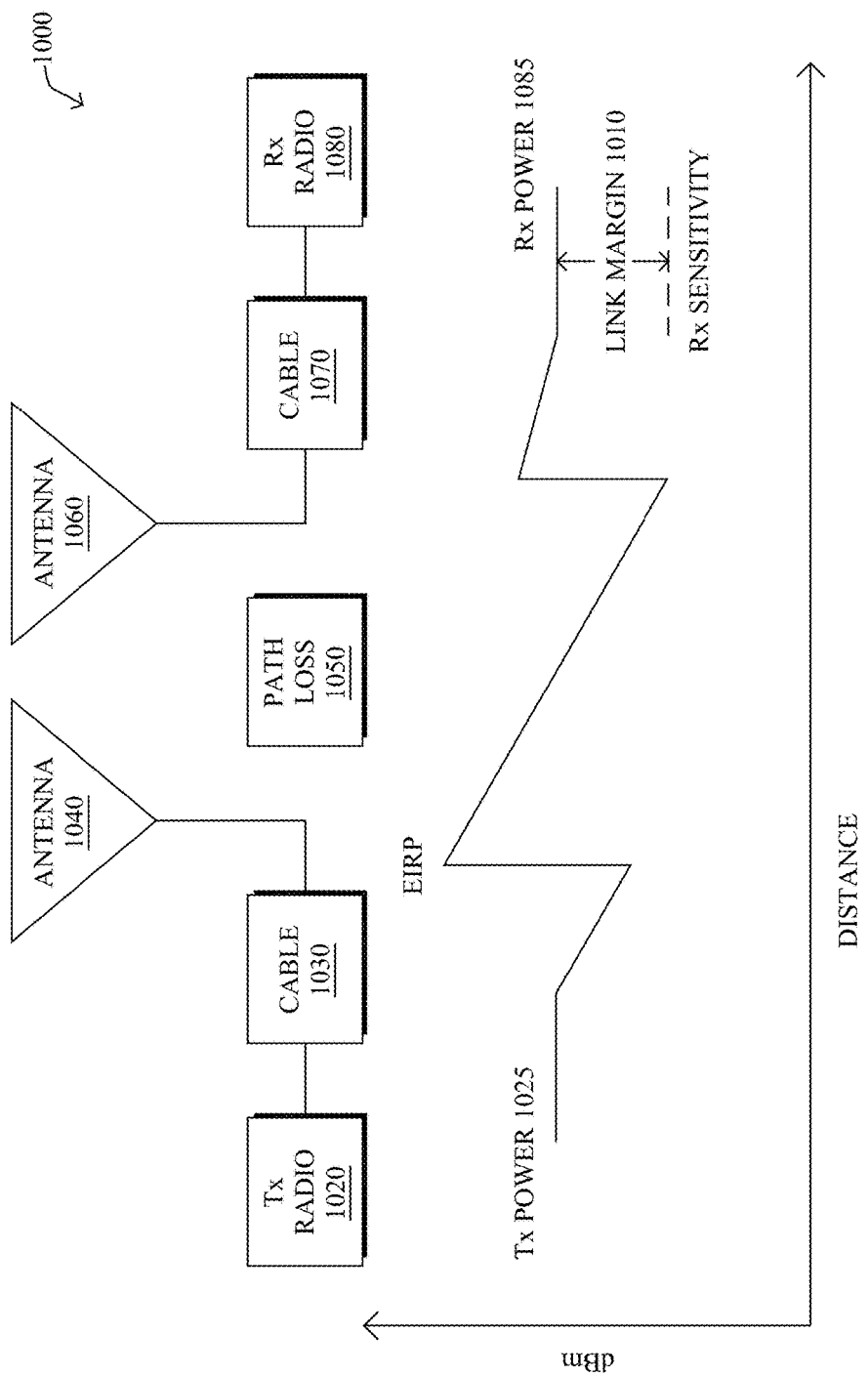
FIGS. 10A-10B illustrate example demonstrations of link margin, link budget, and noise floors in wireless communications.

For further understanding, FIG. 10A illustrates an example demonstration 1000 of link margin 1010 in wireless communications. In particular, the basic concept is that a transmitting radio 1020 transmits a signal with an original transmit power 1025, which on the way through cable 1030 to antenna 1040, experiences certain link loss until the EIRP gain at the antenna. Over the distance of the radio wave, path loss 1050 is naturally experienced through the transmission medium until reaching the receiving antenna 1060 (e.g., at an intended receiver or else at an unintended, and thus interfered with, receiver), which amplifies the received signal and conveys it through local cabling 1070 to the ultimate receiver radio 1080 with a resultant receive power 1085. (Note that the illustrated path loss shows a linearly decreasing loss rate, but in reality, the curve may be much more complex (e.g., decreasing at a greater rate as the transmission travels further from the transmitter). For instance, for a simple dot antenna, the attenuation is function of $R^3$, while for a better antenna it can improve to be a function of $R^2$.) The difference between the received power 1085 and the receiver's sensitivity is referred to as the link margin 1010. Said differently, link margin 1010, measured in dB, is the difference between the actual received power and the receiver's sensitivity (i.e., the received power at which the receiver will stop working).

Figure 10B:
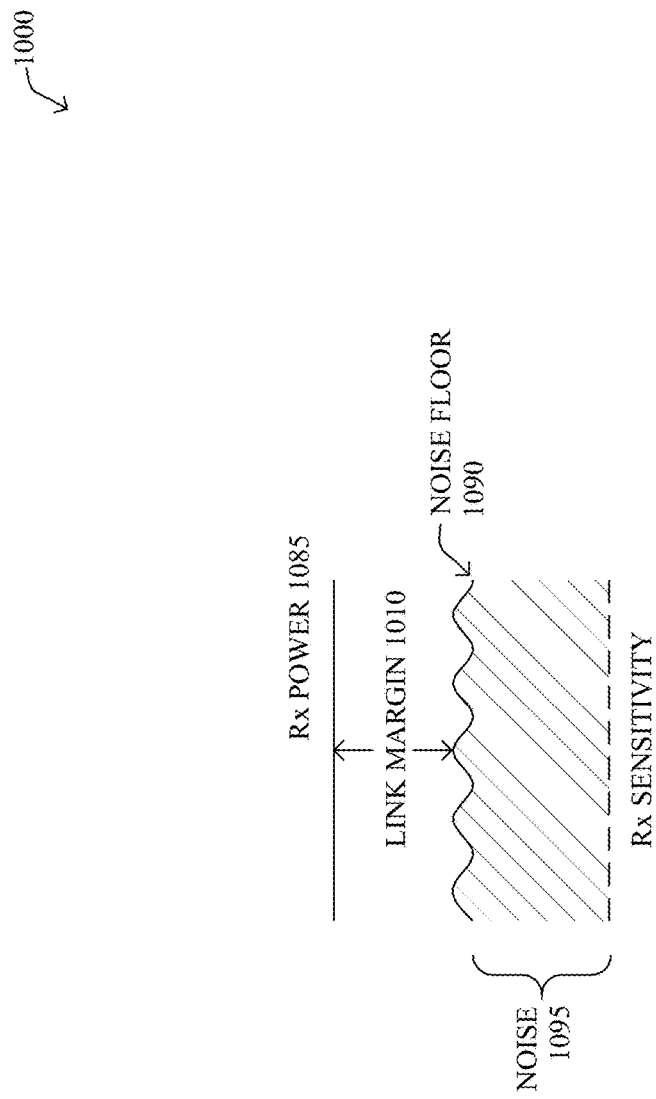

Note that in a typical real-world environment, radio communication and electronics often are subjected to incidental noise (i.e., any signal other than the one being monitored), such as thermal noise, blackbody, cosmic noise, atmospheric noise, etc., as well as and any other unwanted man-made signals. A "noise floor" is the measure of the signal created from the sum of all the noise sources and unwanted signals within a measurement system. As shown in FIG. 10B, for example, a noise floor 1090 is shown based on this incidental noise 1095, indicating the level of received power (over the receiver's sensitivity) at which the receiver may begin adequately separate an intended signal from the noise (without advanced separation techniques). The receiver, therefore, may be configured to simply ignore signals below this noise floor (e.g., squelching the static/noise). Accordingly, the link margin 1010, as opposed to merely being based on the receiver's sensitivity as in FIG. 10A, may be more accurately be based on the receiver's noise floor (i.e., the difference between the receiver's noise floor 1090 and the received power 1085). Either calculation for link margin may be used herein, e.g., depending upon the implementation and configuration of the receivers, and the techniques herein are not limited to either one.

As described herein, the link margin 1010 (above the receiver sensitivity or, preferably, above the noise floor) may be considered when determining link power budget (or simply "link budget") computations. In general, the link budget equation may be based on a simplified equation where the received (Rx) power is equal to the transmitted (Tx) power plus gains minus losses:

Rx Power (dB)=Tx Power (dB)+Gains (dB)−Losses (dB)      Eq. 1.

In the event that the link budget equation results in a receive power that is greater than the sensitivity or, more particularly, a noise floor of an intended receiver, i.e., has a positive link margin 1010, then that transmission should be received successfully. At the same time, however, should the receive power at an unintended receiver be greater than that unintended receiver's sensitivity or, more particularly, a noise floor, then the transmitted signal could interfere with the unintended receiver's operations.

Another simplified, but more complex link budget equation may be established depending upon the particular communication environment, such as, for example:

$$20 \log D - GT_{az} - GT_{el} - (GR + 38) - \text{Pol} > T$$      Eq. 2, where D is the distance between the transmitter and receiver, $GT_{az}$ is the transmit gain in the azimuth direction to the receiver, $GT_{el}$ is the transmit gain in the elevation direction to the receiver, GR is the receiver gain, Pol is the polarization gain, and T is a predetermined threshold value, e.g., the noise floor of the particular receiver. In general, to provide extra protection for unintended receivers, T may be set at some value (e.g., 6 dB) less than the prevailing Boltzmann noise ("noise floor"). Said differently, different values/levels of T may be used for different types of receivers, and also depending on whether the receiver is an intended receiver or unintended receiver: that is, when calculating the threshold T for an intended receiver to sufficiently receive a transmission, the receiver's noise value (or sensitivity) may be used, while for an unintended receiver, a precautionary adjustment to the threshold T may be made, such as e.g., the noise floor minus 6 dB (or some other determined adjustment value). Note that as described below, according to the techniques herein, if the power budget exceeds a threshold T to an intended receiver, but is simultaneously below a corresponding threshold T for an unintended receiver at a given location, then that location/transmission is considered to be acceptable (i.e., reaches the intended receiver, and does not interfere with an unintended receiver).

Figure 11:
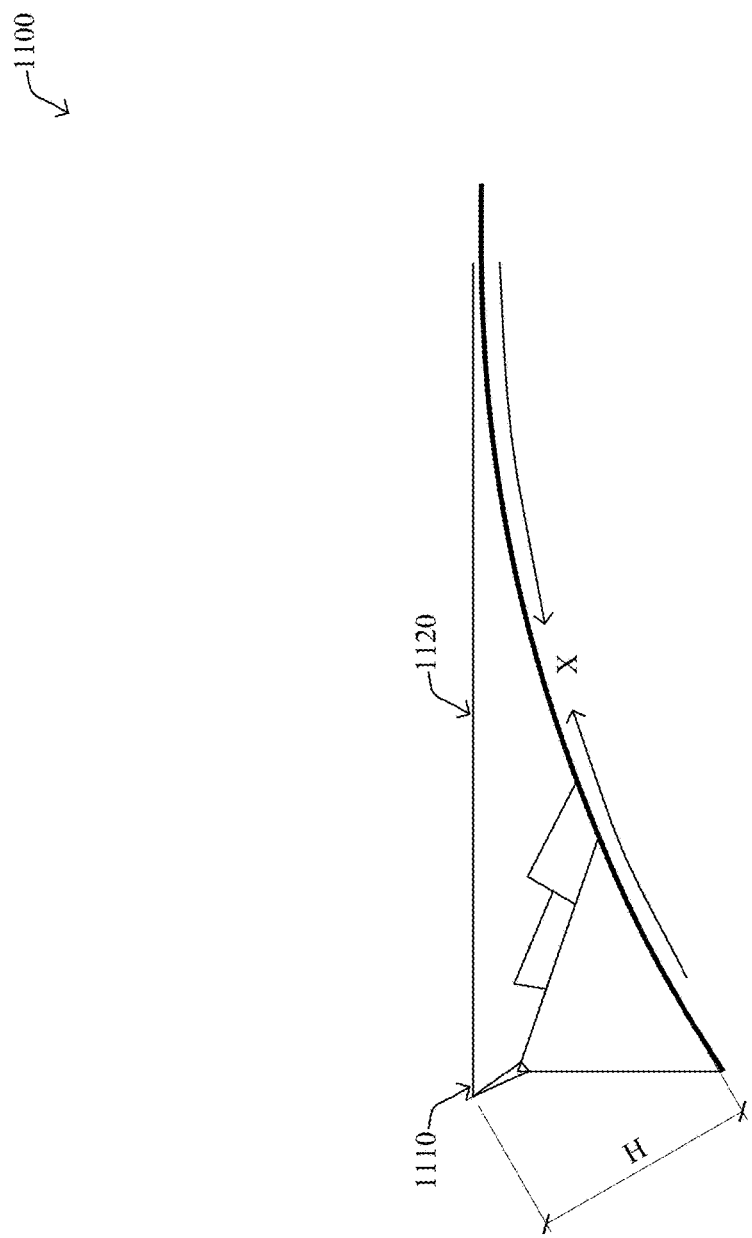
FIG. 11 illustrates an example of line-of-sight communication.

Additionally of note, the earth is a strong attenuator at microwave frequencies. Therefore, signals within the C-band that travel towards a PtP receiver antenna will stop either at the point where the signal hits a hill or at the curvature of the earth. FIG. 11 illustrates an example 1100 of line-of-sight communication, where an example microwave communication tower 1110 (PtP transmitter 310), illustratively located at height "H" above sea-level, produces a line-of-sight 1120 based on the curvature "X" of the earth. Note further that refraction due to atmospheric pressure along the surface of the earth extends the effective radio horizon. As such, the techniques herein may also use the standard "4/3 earth model" to account for horizon extension due to refraction, as may be appreciated by those skilled in the art.

Specifically, the limiting distance for line-of-sight communications such as microwave communications can be derived by the simplified formula:

$$\text{Radio Horizon (mi)} = \text{SQRT of } (2 \times \text{Height}) \quad \text{Eq. 3,}$$

where the Height (ft.) is the sum of the antenna tower plus height above sea level. By way of example, the height of a PtP transmit tower might be on the order of 50 feet on top of a 300 foot (or so) hill. This would define a maximum communications range (line of sight 1120) of about 26.5 mi to a sea level receiver. Various other factors may extend or reduce this number, such as obstructions or receivers above sea-level (the calculation above assumes a sea-level receiver). For instance, one would add 2.8 miles to this number if a receiver (or conversely, a terminal transmitter herein) is expected to be held at about 4 feet above the earth. Note that information about terrain (used below) may be obtained from a number of sources. e.g., but not limited to, U.S. Geological Survey (USGS) national maps/topographical information, Google Earth™, and so on. It is also noted that, should the prospective transmitter or incumbent receivers be in a maritime location (e.g., ocean), aerial location (e.g., balloon-based networking), or location other than on land, other factors may be taken into consideration with regard to the line of sight, as may be appreciated by those skilled in the art. (Also, in the specific embodiment where the system is used to avoid interference with a satellite located in a similar angle in the sky, the radio horizon may be set to infinity and need not be factored into the calculations.)

—Avoiding Interference in Wireless Communications—

As mentioned above, the techniques herein provide a robust interference protection regime to ensure that prospective transmitters of one system (e.g., a satellite communication network 400) will not cause harmful interference to an incumbent system (e.g., PtP operations in system 300). As described below, the techniques herein may determine whether a prospective transmitter 410 will interfere significantly enough with unintended receiving terminals (receivers 310) to cause impermissible or otherwise unacceptable degradation in performance of the incumbent wireless communication system. Said differently, the techniques herein determine acceptability of transmission by a transmitter 410 within the presence of incumbent communication receivers 310 based on the risk of interfering with such receivers, and allow or deny such transmission, accordingly. (As mentioned above, and as will be appreciated by those skilled in the art, interference with an unintended receiver may be based on interfering with ground-based PtPRs, a neighboring satellite, a ground station associated with another satellite, or any other unintended receiver where a transmission may raise the noise floor of that unintended receiver.)

In particular, as described in greater detail below, based on a database of incumbent receiver properties (e.g., the FCC ULS database identifying PtP operations in the C-band), the techniques herein determine the location, altitude above sea level, antenna polarity, and orientation of each incumbent receiver 310, and identify a "Protection Zone" for each receiver, such that a given patch of earth (or sea, air, space, etc.) is identifiable as either a) requiring protection against transmission by a terminal 410 or b) not requiring protection against transmission by terminal 410. Once the receiver protection zones are combined with real-time location information from a terminal 410 seeking to transmit, the system herein may then act accordingly to prevent any harmful interference to incumbent (e.g., PtP) operations, while determining one or more acceptable frequency bands (if any) on which the terminal may transmit in a given power. Notably, as described below, the techniques may be performed based on either a centralized manner (achieved by collaboration between the ground station 430/server 450 and the terminal 410), or localized (decentralized) manner (contained entirely on the terminal 410, given sufficient processing resources), or else within a network planning tool (e.g., for placement of a transmitting station of a new wireless communication system in the presence of an incumbent wireless communication system, where the incumbent wireless communication may require interference protection).

Figure 12A:
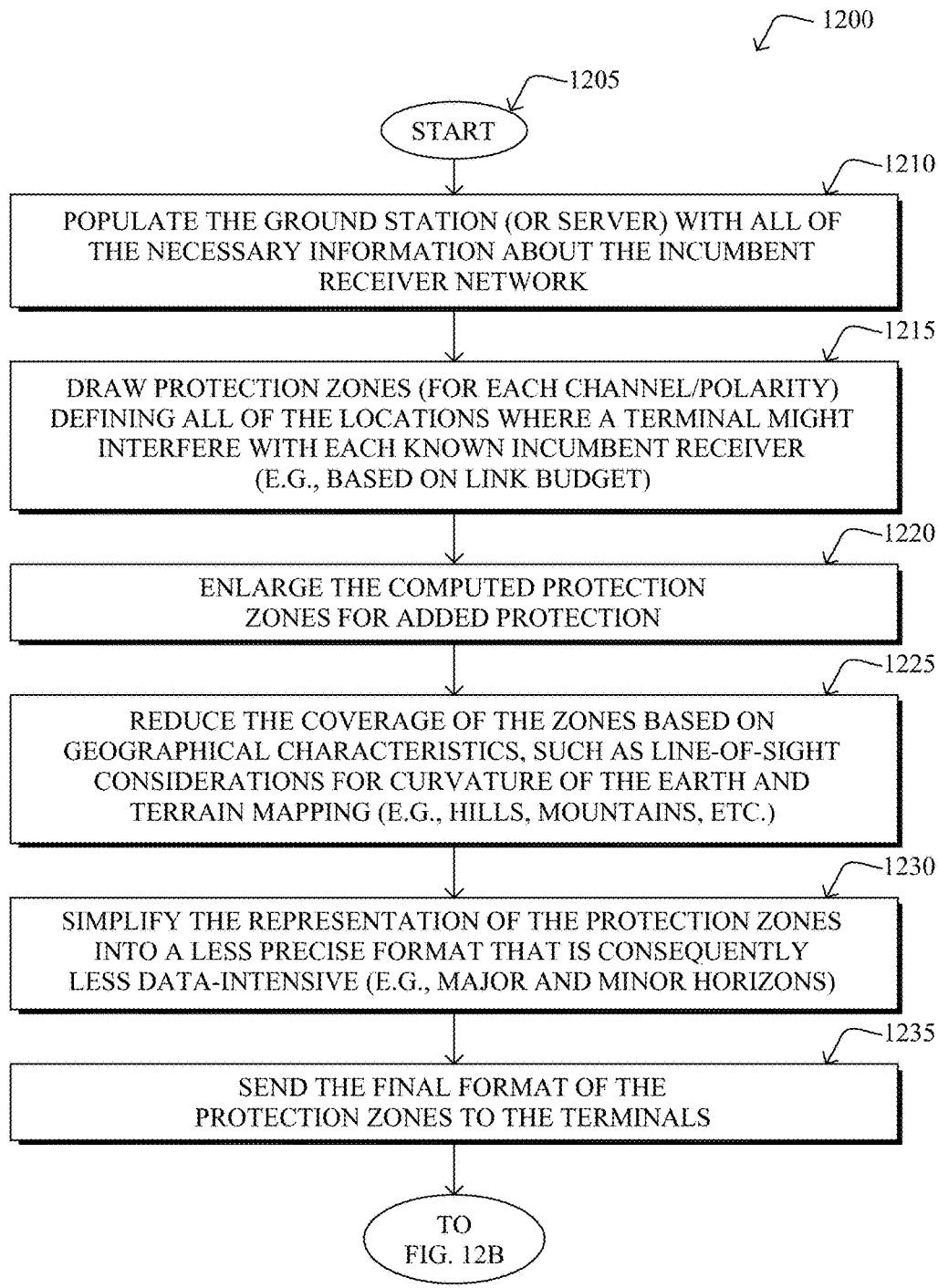
FIGS. 12A-12B illustrate an example simplified procedure for avoiding interference in wireless communications according to one example embodiment herein.
Figure 12B:
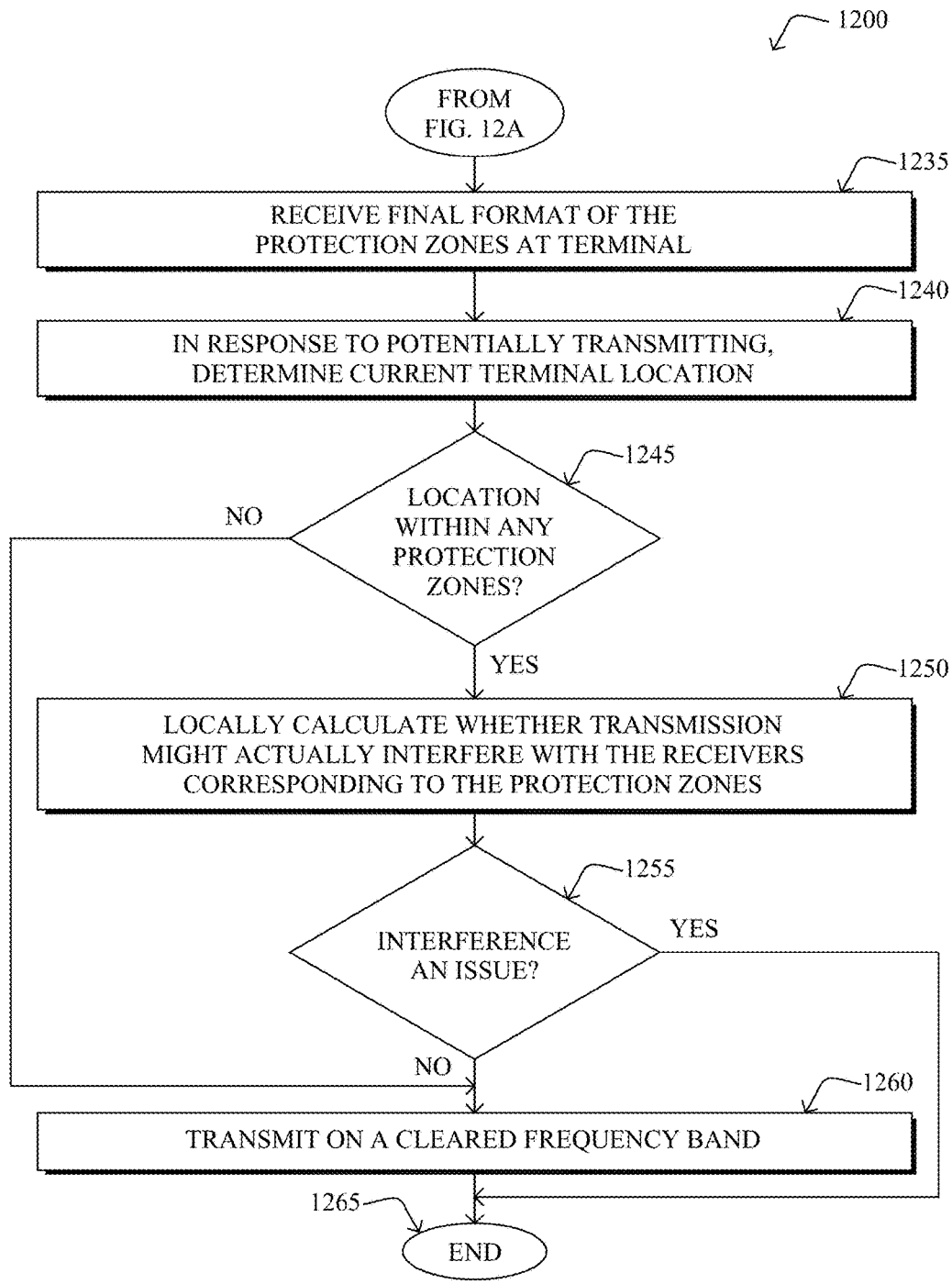

As an up-front illustration of the capabilities of the techniques herein, FIGS. 12A-12B show an example simplified procedure 1200 for avoiding interference in wireless communications according to a particular example embodiment herein. (Note that the procedure 1200 is meant as an example demonstration of a particular embodiment of the techniques herein in order to frame an understanding for the more detailed description below. The steps shown in FIG. 12A-12B are not meant to be limiting to the present disclosure, and additional, fewer, simplified, more complicated, and/or entirely different steps may be performed by the systems herein in accordance with various aspects of the techniques herein.)

In particular, example procedure 1200 begins in step 1205 of FIG. 12A at the ground station, and then proceeds to step 1210 populate the ground station 430 (or server 450) with all of the necessary information about the incumbent receiver network 300 in order to determine (e.g., draw) protection zones (for each channel/polarity and intended receiver) in step 1215 defining all of the locations where a terminal 410 might interfere with each known incumbent receiver 310 (e.g., based on link budget, as described below). In step 1220, the ground station may enlarge the computed protection zones for added protection, and then in step 1225 may reduce the coverage of the zones based on geographical characteristics, such as line-of-sight considerations for curvature of the earth and terrain mapping (e.g., hills, mountains, etc.). Since the protection zones at this point may be a series of complicated curves and contour lines, and since the terminals 410 may have limited resources (e.g., memory), in step 1230 the ground station may simplify the representation of the protection zones into a less precise representation (format) that is consequently less data-intensive, such as a more simplified polygon representation or angular/distance representation based on major and minor horizons (described below). The final representation of the protection zones may then be sent to (or otherwise retrieved by) the terminals 410 (e.g., initial configuration, download over higher-bandwidth links, etc.) in step 1235.

Now, in FIG. 12B, procedure 1200 continues at the terminal 410 where the final representation of the protection zones is uploaded or otherwise received and stored by the terminals (step 1235), such that whenever the terminal 410 wishes to transmit on a potentially interfering frequency band, it first determines its location in step 1240, then checks whether that location is within any protection zone of any incumbent receiver in step 1245. If so, then in step 1250 the terminal may locally calculate whether it might actually interfere with the receivers corresponding to the protection zones, since, as mentioned above, much of the precision of the protection zones (based on link budget, terrain, etc.) may have been lost through the simplification of their representation. As such, based on the local determination (step 1255) that interference would not be an issue, or else based on not being in a protection zone at all in step 1245, the terminal 410 may transmit on a cleared frequency band in step 1260. Otherwise, transmission is not allowed, and the illustrative procedure 1200 ends in step 1265. Note that other measures may be considered to allow transmission, including adjusting the terminal's location, transmit properties (e.g., diverse polarity, reduced transmission power, etc.), and so on, but such optional enhancements are described in greater detail below. Note further that as mentioned above, the steps of procedure 1200 are merely an example of a particular embodiment, and are not meant to be limiting to the scope of the present disclosure, as many alternatives to the above configuration of steps may be conceived as described below.

As mentioned above, the techniques herein start with acquiring information about the incumbent system 300 for which interference protection is desired. This information, notably, may be computed by, and stored in, either the ground station 430 or in server 450, and any combination of their cooperation is conceived herein (e.g., computation on server 450, and storage on ground station 430, etc.). In particular, in an illustrative embodiment, the construction of this information may be performed by an offline tool associated with the system, meaning it can be done in the server 450 or calculated offline and then loaded into the server/ground station 430. Similarly and without limitation, the computations can be performed in the cloud, such as on the Amazon Web Services (AWS) or similar cloud based servers and storage, as may be appreciated by those skilled in the art.

According to an illustrative embodiment, a database 460 may contain all of the required information for all the receivers of the incumbent system 300 (e.g., PtPRs in the US) which allow the system to calculate the protected zones, as described below. For instance, in the illustrative embodiment of PtPRs, this information may be stored in the FCC's ULS database as mentioned above, which contains an up-to-date account of Fixed Service PtP licensed pairs and applicant pairs (e.g., in the C-band, or other overlapping frequency band with system 400) and their associated identification (e.g., call signs). This information, notably, includes the coordinate locations/orientation of PtPRs, the frequencies of the PtP communication (e.g., frequency center and width), and antenna height, height above mean sea level (base altitude), receiver polarization, antenna type, and optionally other information, such as azimuth, gain characteristics (lobe shape), and so on for each PtPR antenna. (Note that if such information is not directly within the database 460, the system herein may compute such values based on public knowledge of antenna characteristics, or else based on various assumptions thereof. Also, for embodiments where the system ensures that the transmitter does not interfere with the operations of another nearby satellite, the locations of geostationary satellite are well known while the momentary locations of non-stationary satellites can be calculated.)

Periodically (e.g., daily), the system (e.g., server 450) accesses the database 460 (e.g., the FCC ULS database) and obtains the most recently updated licensing and applications information in the frequency band of interest (e.g., C-band in our case). This information is used by the system to construct a relevant server-side database 543, which contains updated information regarding all active (and pending) receivers (e.g., PtPRs) and their location, altitude of antenna base, antenna height above ground, azimuth, antenna type/gain, diversity height polarity, and frequencies assigned to the incumbent receiver. Notably, channels/frequencies used by a specific PtPR may change, such as when a segment of a network requires additional bandwidth and as such acquires an additional frequency channel. Also, it should be noted that at times there can be changes to the location, azimuth, height, antenna information, etc. in the ULS database (e.g., correcting errors, updating with greater accuracy, accounting for actual changes or planned movements, changes in polarity, and so on).

Additionally, the system also maintains a current map of the covered area (also within illustrative database 543), which may illustratively include geographically significant features, such as terrain (e.g., hills, mountains, valleys, and other topographical information that may be relevant to line-of-sight calculations described below). As noted above, such information may be obtained from various sources, and may also be updated as deemed necessary.

As described in greater detail below, the server database 543 contains the information that may be used to create a detailed representation of protection zones, that is, locations where a terminal 410 could potentially interfere with an incumbent receiver 310 (e.g., on a particular frequency band/channel). These protection zones for each receiver 310 may notably be computed (and subsequently referenced) per intended receiver (e.g., per satellite), per incumbent receiver polarity (e.g., horizontal and/or vertical), and any number of other factors that would vary the potential for interference (such as, e.g., different levels of uncertainty or "smearing", described below). For instance, the set of unintended receivers for which a transmission on "channel 1" would interfere would be different from those that would be potentially interfered with by a transmission on "channel 2". Additionally, a computation of interference at one unintended receiver at a horizontal polarity would be different from that at the same unintended receiver at a vertical polarity. Furthermore, a computation of interference for a transmission to an intended receiver (satellite) in one location (e.g., azimuth) would be different (for the same unintended receiver) than a transmission to another intended receiver in a different location. The techniques described below, therefore, may be applied for each of these different inputs and in different combinations, both in terms of initial computation and for subsequent reference (as would be necessary, that is, based on available transmission possibilities by the terminals 410, such as, e.g., whether the same channel is available on different receivers/satellites, or whether the terminal can transmit on different polarities, etc.). As such, while certain considerations for such factors may be explicitly described below, it is important to note that the generalized portions of the description below assume that the potential for interference may be based on such factors, and the server database 543 (and corresponding local database 643) may provide the adequate distinctions in transmission configurations with regard to their corresponding potentials for interference (protection zones), accordingly.

It is important to note that servers 450 can compute, in advance, exactly on a map where a terminal 410 is allowed to transmit (and not interfere with any receiver 310) based on link budget calculations using antenna properties, transmitter properties, communication characteristics, and so on. However, since at the time of computing this information the servers would not know where a mobile terminal would be, and since the terminals themselves would generally not have enough storage to keep a complete record of this information, the techniques herein may calculate approximated protection zones representing a potential for interference, where the terminal 410 (e.g., a mobile device) may then be responsible for determining for itself whether it is allowed to transmit. For example, the terminal 410 may calculate the link budget to each receiver having an approximated protection zone that covers the terminal's current location (described further below). (Note also that in one embodiment, the terminals 410 may have sufficient resources for precise mappings of all acceptable transmission locations, at least within a given region, as also described below.)

According to the present disclosure, two illustrative techniques for computing the approximated protection zones (i.e., a potential for interference) are described, namely, a simplified geometrical approach based on antenna properties, and, as a preferred embodiment herein, a more sophisticated link-budget-based approach. (Notably, other approaches may be used, including, but not limited to, various hybrid combinations of the details aspects from each approach described herein.)

Figure 13:
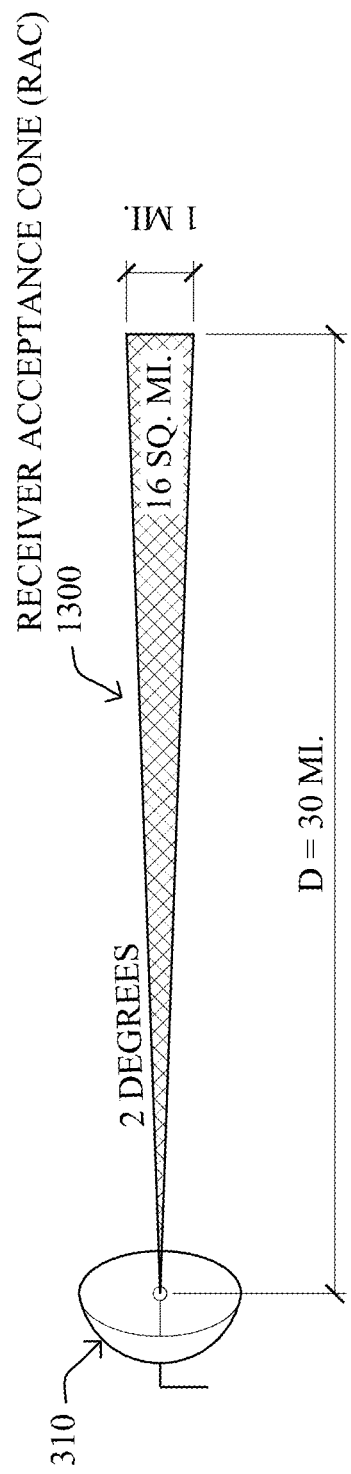
FIG. 13 illustrates an example receiver acceptance cone.

Regarding the simplified approach first, FIG. 13 illustrates an example receiver acceptance cone (RAC) 1300. (Note that one interferes with receivers, not transmitters, so the receiver side of the link is the only acceptance cone at issue.) The RAC, based on receiver antenna properties and configuration, is the coverage area corresponding to a region, in a particular direction of coverage (noting that certain receivers may be configured with more than one direction of coverage, and thus resulting in multiple coverage areas), for which a receiver is configured to receive (accept) a transmission. Though the intent is that the opposing transmitter (e.g., PtPT 305) may generally be placed within (e.g., and pointing along) the RAC 1300 of its corresponding receiver (e.g., PtPR 310), the RAC 1300 also implies a region in which a third-party transmitter (with a specific transmission power) might interfere with the receiver 310. Said differently, the RAC 1300 also defines an area, where outside of this area the receiver 310 may not be adversely affected by a terminal 410 operating at the same frequency band as the receiver (e.g., and at a predetermined transmission power). (Note that RAC 1300 represents a simplified region and is for illustrative purposes only, particularly since antennas have side-lobes which need to be factored into protection zones, as described below.)

As shown, the maximum communications range for a transmission is the distance "D" (e.g., 30 miles), defined for microwave frequencies by the transmitter antenna's height above sea level, the topology of the area, and the curvature of the earth, as mentioned above. The angle of the RAC's inclusion triangle is defined by the receiver antenna characteristics. For example, PtP microwave antennas are typically two or three meters in diameter, which defines a 1.7-degree (or less) acceptance angle (3 dB), so illustratively an angle of 2 degrees (+/−1 degree) is shown. Note that the receiver database (e.g., FCC ULS) contains information regarding smaller or larger receiver dishes and other parameters (e.g., antenna apertures), and this data may be used when accounting for the RAC of any given receiver. As shown, RAC 1300 for this specific example covers approximately 16 square miles, and is approximately 30 miles long away from the receiver with an approximately 1-mile wide maximum spread.

Figure 14:
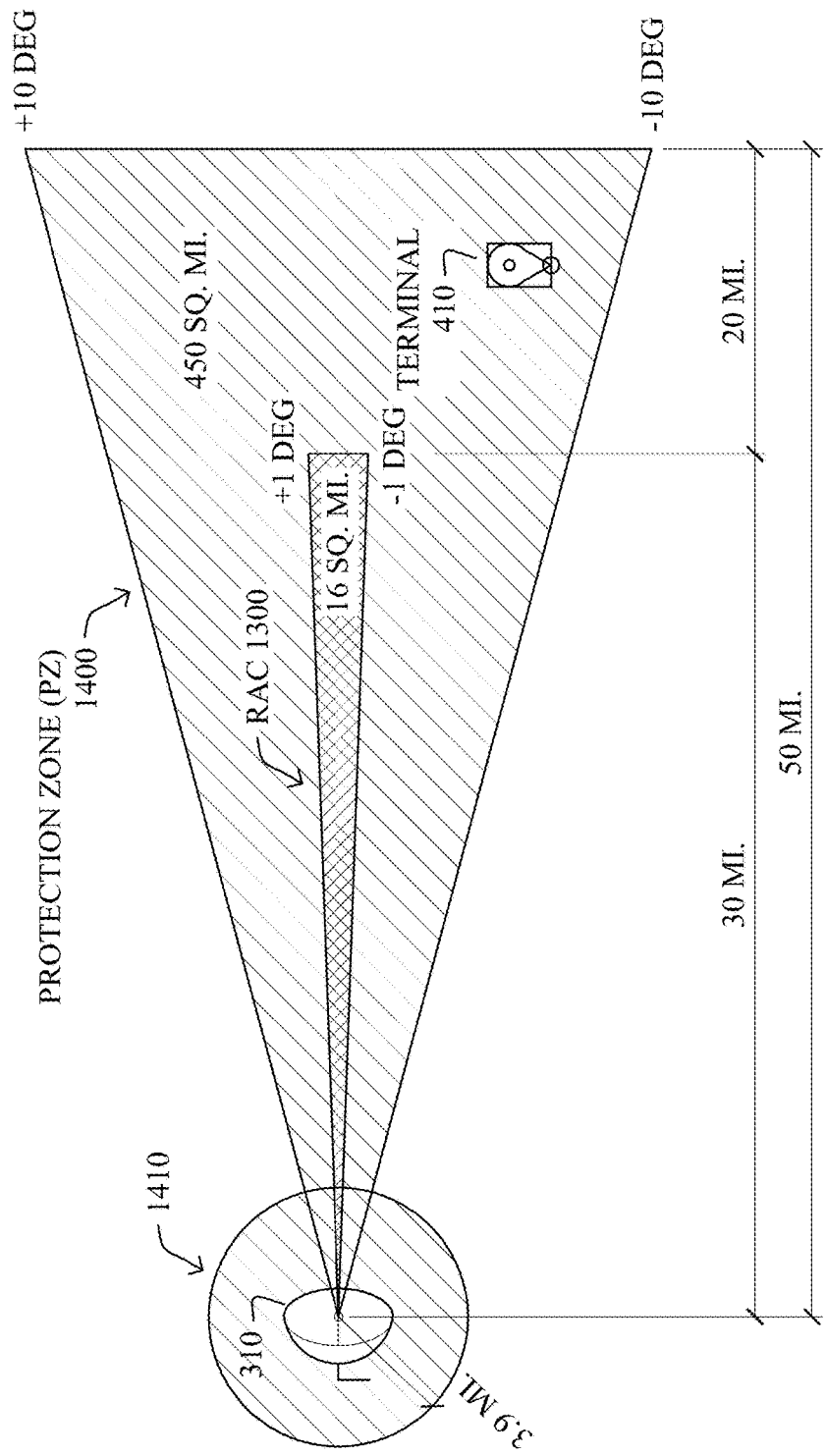
FIG. 14 illustrates an example receiver protection zone (simplified)

The RAC 1300 is an intended focal range for a receiver 310, within which the receiver is designed to receive transmission signals, and accordingly attenuate interference signals from transmitters outside the RAC. However, in order to provide additional assurance and protection from interference, the techniques herein may be configured to assume an expanded protection region beyond the RAC 1300 of FIG. 13. For instance, in this first simplified embodiment, as shown in FIG. 14, a receiver's "protection zone" 1400 need not be limited to the RAC 1300, but may be expanded to a larger region to provide extra protection against inadvertent interference. In particular, an expanded protection zone may be constructed to account for inaccuracies in various measurements such as measurement of the direction in which the transmitter points, GPS location, height of the transmitter, etc. For example, in one embodiment as shown, the expanded protection zone 1400 may span an acceptance angle of approximately 20-degree arc (+/−10 degrees, rather than merely +/−1 degree, i.e., ten times larger and ⅟₁₈ of a 360-degree circle), and may extend for an additional distance (e.g., 50 miles or more, particularly depending upon antenna height, rather than merely 20-30 miles), resulting in a coverage area of approximately 450 sq. miles (notably larger than the RAC's 16 sq. miles), a substantial safety factor in addition to the physical RAC.

Note also that antennas (even those that are highly directional in nature) may have side lobes (also back lobes) that extend in other directions as mentioned above, even in a direction opposite the intended coverage area or RAC 1300. To account for such side lobes to ensure that the terminals 410 will never cause harmful interference—even at very close proximity, the extended protected area 1400 may also include additional coverage areas 1410 in one or more other directions. For instance, in one simplified embodiment as shown, the additional coverage area 1410 may account for such side lobes by adding a fixed-radius circle (or one or more other polygonal regions) about the receiver 310, to account for such side lobes. This may be considered part of the expanded protection zone 1400, and any prospective transmitter within such areas may also need to be accounted for interference purposes, as described below. Based on example PtPR side lobe properties, the additional coverage area 1410, which may be considered a "close proximity circle" surrounding the PtPRs, may have an illustrative radius of approximately 3.9 miles. (Note, any suitable radius for this additional coverage area may be used, such as depending on the receiver antennas, transmitter power, etc., and this illustrative and non-limiting example of 3.9 miles was selected based on an example of a minimum side-lobe stand-off distance calculated according to an illustrative configuration, described below.)

Furthermore, according to one or more aspects of the disclosure, additional margins of error may be provided in the expansion of a RAC 1300 into a protection zone 1400 to allow for extra protection of an incumbent network. For example, in terrain mapping, it may be assumed that the transmitter and/or receiver is located at a height higher than where it would actually be located (e.g., for a handheld device, the elevation of the transmitter above the earth at the given proposed location may be a few meters (taller than a person), and/or the height of the receiver may also be assumed to be higher than it actually is). Also, other factors of estimation or error, such as transmitter angle, transmitter location, receiver placement, receiver's physical properties, and so on, may benefit from a forgiving margin of error on top of the RAC 1300 or even on top of an already expanded protection zone 1400. As such, the protection zone 1400 may be additionally based on various margins of error (e.g., percentages, set values/multipliers, administrator-defined ranges, measured errors, and so on).

The first illustrative (simplified) protection zone 1400 described above may thus range from the RAC 1300 up to a pre-defined expanded range, including any additional areas 1410 based on antenna properties (e.g., antenna lobe patterns including main lobe and side lobes), and may be used to determine whether a transmitter 410 is within an area in which it may interfere with a receiver 310. (Note that in some cases, the protection zones may be effectively limited to areas on the earth's surface, though in other cases, the protection zone may be considered to extend in elevation, as well as azimuth, and this may be similarly accounted for.)

Notably, a more accurate (and generally more preferred) determination of a zone of potential interference is to calculate the RAC as the interaction between the pattern of the antenna of the transmitting terminal and the antenna of the specific PtPR, assuming the given (nominal) transmission power of the terminal. Regarding this more sophisticated (and preferred) link-budget-based approach for calculating protection zones, recall that the servers can compute, in advance, exactly on a map from where a terminal 410 is allowed to transmit (without interfering with any receiver 310). While this is certainly one conceived manner of attacking the problem in one embodiment herein, in another (e.g., preferred) embodiment, the techniques herein need only to determine the locations wherein the calculated link budget equals (or surpasses) the noise floor for each receiver, and define this line as the boundary of the protection zone. In particular, in this illustrative embodiment, the boundary of a receiver's protection zone may be based on applying a link budget equation for transmission from the 410 transmitter to the intended receiver (e.g., satellite) 420, in order to determine the distance from the receiver 310 at which point a noise floor is exceeded at the receiver 310 (i.e., interfering with the operations of receiver 310).

For instance, for each known receiver (e.g., PtPR) 310, the system calculates the farthest horizon distances at which a terminal 410 could interfere with the receiver. To do this, the system calculates a "protection zone" polygon around the position of the PtPR. This is done by calculating, at small angular increments (e.g., 1-degree increments) for 360 degrees around the receiver location, the distance at which the result of the link budget calculation along that radial is exactly equal to the noise floor. Any closer to the PtPR along that radial, the transmitter could possibly interfere with the operation of the PtPR, and conversely transmitting from farther away along the same radial would not interfere with that PtPR.

Figure 15:
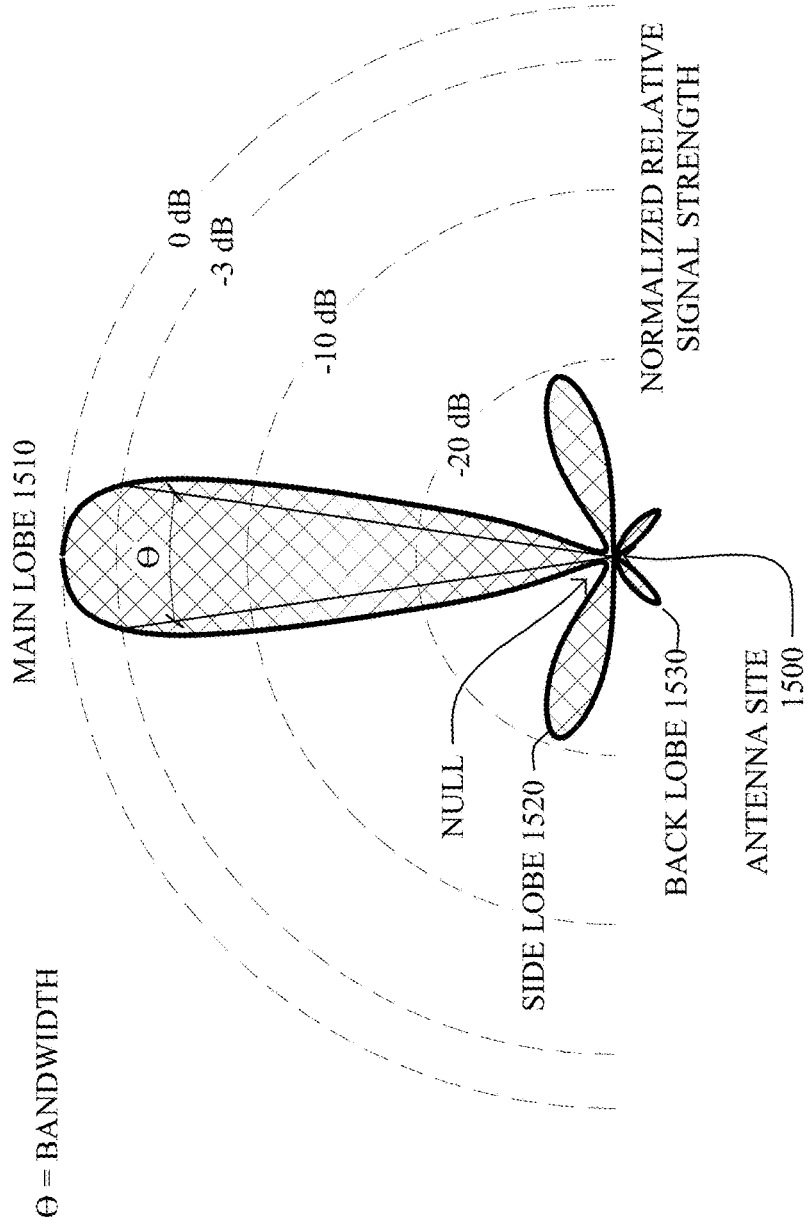
FIG. 15 illustrates a simplified example of antenna lobes from an antenna site.
Figure 16:
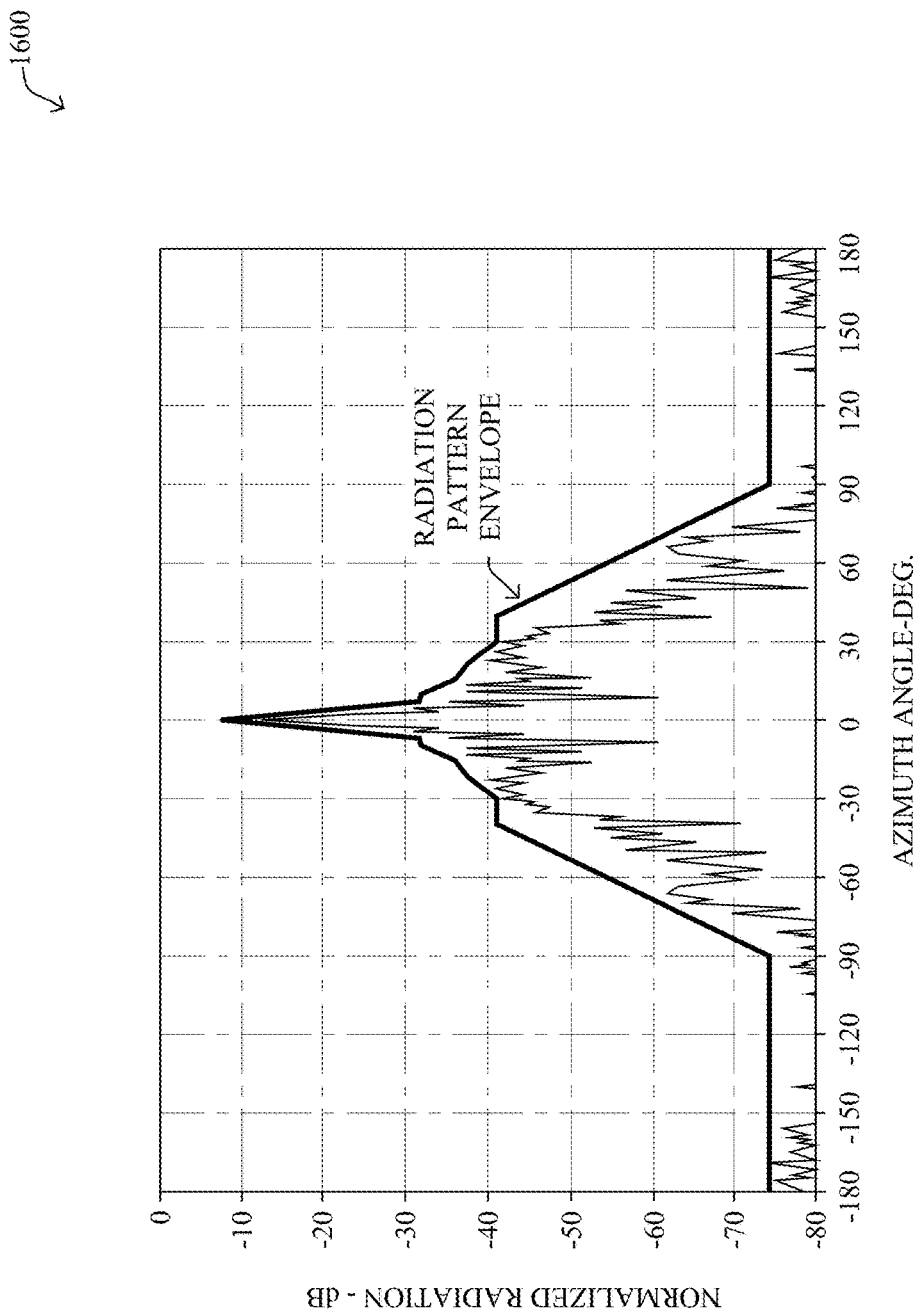
FIG. 16 illustrates an example gain pattern for an example (e.g., 2-meter) point-to-point microwave dish.

The specific shapes of the polygons are governed by the link budget interaction between the lobes of the incumbent receiver's antenna and the lobes of the terminal's antenna, and assuming that the terminal is pointing towards a specific intended receiver (e.g., satellite). For example, FIG. 15 illustrates a simplified example of antenna lobes from an antenna site 1500, where a main lobe 1510 may be the intended transmission and/or reception focus, but various side lobes 1520 and back lobes 1530 may also result from the antenna design (and radio communication principles). Additionally, FIG. 16 illustrates an example gain pattern 1600 for an example (e.g., 2-meter) PtP microwave dish. (Note that this radiation pattern is typical for a microwave antenna, with side-lobe signals being generated at significant levels at azimuth angles out to +/−90 degrees.) As such, the techniques herein compute the noise floor "interference boundary" (protection zone) based on the antenna lobe pattern of the associated antennas of systems 300 and 400, and based on the particular directions of the antennas, and the expected transmission direction and power of the transmitter.

The techniques herein may first determine a typical received signal noise power of an incumbent receiver 310 (e.g., PtPR), and then can determine the link budgets necessary to maintain a transmitted signal level from a terminal 410 sufficiently below that noise floor. For instance, a high performance receiver 310 will have a best case Boltzman noise floor equal to approximately −174 dBm/Hz. Now, by adding in 6 dB of noise immunity (or some other chosen level of noise immunity), and an example signal bandwidth of 8 MHz (e.g., 69 dB), then the techniques herein define a new and more robust noise floor threshold which is 6 dB more noise than Boltzman noise, or:

$$\text{Noise Power}=-174+69+6=-99 \text{ dBm} \qquad \text{Eq. 4.}$$

With this (or any other suitably) computed power value, and using any suitable link budget equation based on antenna lobe patterns, the techniques herein can now compute the location along each radial from a receiver 310 at which a transmission from the terminal 410, aiming at an intended receiver (e.g., satellite) 420, would cross (i.e., is equal to) the noise floor, interfering with the incumbent and unintended incumbent receiver. (That is, determining the location where the terminal's power is the same noise power as the Boltzman (natural) noise level at the receiver). Illustratively, recall that the actual "crossing" of the noise floor may illustratively be based on a safety margin (e.g., 6 dB), for added assurance of non-interference. Said differently, the potential for crossing the noise floor may be based on an artificial "safe" noise floor value, and not the actual noise floor of the receiver.

As an aside, the power value may also be used to calculate an absolute "stand-off distance" (D) from a receiver, particularly for locations near (behind and to the side of) the receiver as described above, such as should a transmitter be aimed directly at the receiver. For example, based on various known antenna lobe link budget equations, and using the 6 dB safety margin, this value may result in a behind-the-dish stand-off distance (D) of 630 meters, and for the side-lobes a stand-off distance (D) of 6300 meters (3.9 miles). This means that the transmission of a terminal's signal from any distance greater than 630 meters behind the dish and/or 6300 meters to the side will result in a received signal of 6 dB or more below the Boltzmann (natural) noise floor at the incumbent receiver. (Note that this maximum stand-off distance (e.g., 3.9 miles) could be used to establish the additional safety range 1410, as mentioned above with reference to the "simplified" protection zone 1400.)

Returning to the discussion of the link-budget-based protection zone, once the link budget computations are completed for a receiver (in all 360 degrees around the receiver), each distance and angle may then be converted to latitude and longitude, which results in a polygon that represents the transition boundary of the protection zone for that particular receiver (e.g., for a particular transmitter azimuth to a given intended receiver, at a particular polarity, etc.). This boundary can then be overlaid onto a map, where points inside the polygon are inside the protection zone, and points outside are not inside the protection zone. Said differently, as a result of the computations above, the server 450 may obtain numerous polygons which describe the potential interaction between each receiver 310 and terminal 410 attempting to transmit towards a given receiver (e.g., satellite) 420 at a specific frequency channel and nominal power. Note that these protection zone polygons may be stored in a database of the ground station 430 or in a server 450, however may generally not be transmitted to the terminals in this form; rather they may first be modified (e.g., simplified) as described below, since the detailed description of these polygons may consume too much memory and may require high network bandwidth to update. (Note further that in one embodiment, these protection zone polygons are not stored in the gateway/server, either, and need only be calculated for further processing and storage in a different format, such as described below.)

Figure 17:
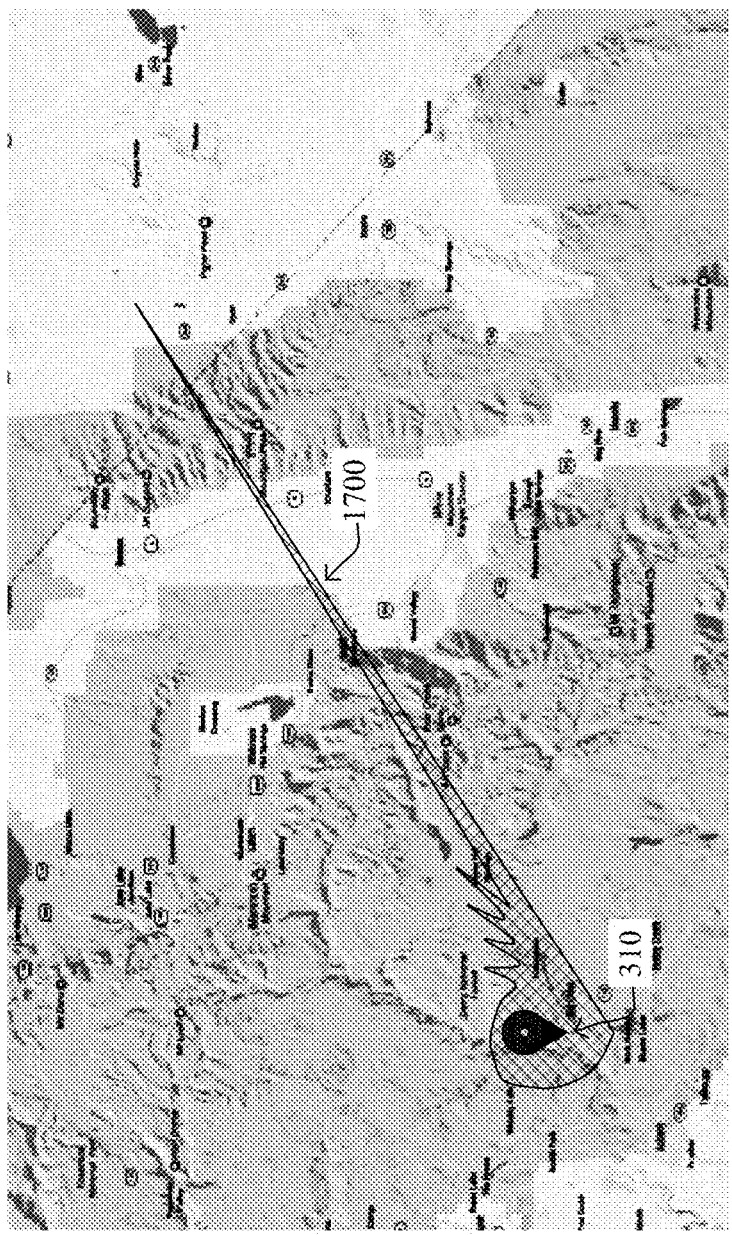
FIG. 17 illustrates an example polygon resulting from link budget calculation towards a receiver, representing a noise floor crossing boundary for a given transmission configuration from surrounding geographical locations.

FIG. 17 illustrates an example polygon 1700 resulting from link budget calculation towards a single receiver 310 (e.g., overlaid on a map), for a given frequency band, polarity, and intended receiver azimuth (e.g., a particular satellite 420). That is, the resultant polygon 1700 represents a noise floor crossing boundary of a particular receiver 310 for a given transmission configuration from a transmitter (terminal 410) in surrounding geographical locations. As can be seen, a main lobe of interference extends generally northeasterly, in an example direction of the antenna of the receiver 310 for intended reception.

Note also that the polygon in the proximity to the receiver is a complex pattern (and, notably, need not be limited to areas bounded only by straight lines). This is due to the interaction of the transmitter's antenna lobes from the various locations along that complex curve, pointing at an illustrative receiver (e.g., satellite) 420, which may be in a southerly direction (e.g., a geo-synchronous satellite). At the same time, based on this southerly pointing of the transmitter, it can be seen that the southern-facing side lobes of the receiver 310 are much less prevalent as a potential for interference (i.e., the transmitter would be aiming away from the receiver from those locations).

As noted, the pointing angle (azimuth, elevation) of the terminal 410 (terminal antenna 660) relative to the incumbent receiver 310 changes the link budget calculation. Accordingly, each intended receiver (e.g., satellite) 420 to which the terminal may be pointed changes the results of the link budget calculation for a terminal location. Therefore, each incumbent receiver will have somewhat different protection zones for each intended receiver (e.g., satellite).

Figure 18:
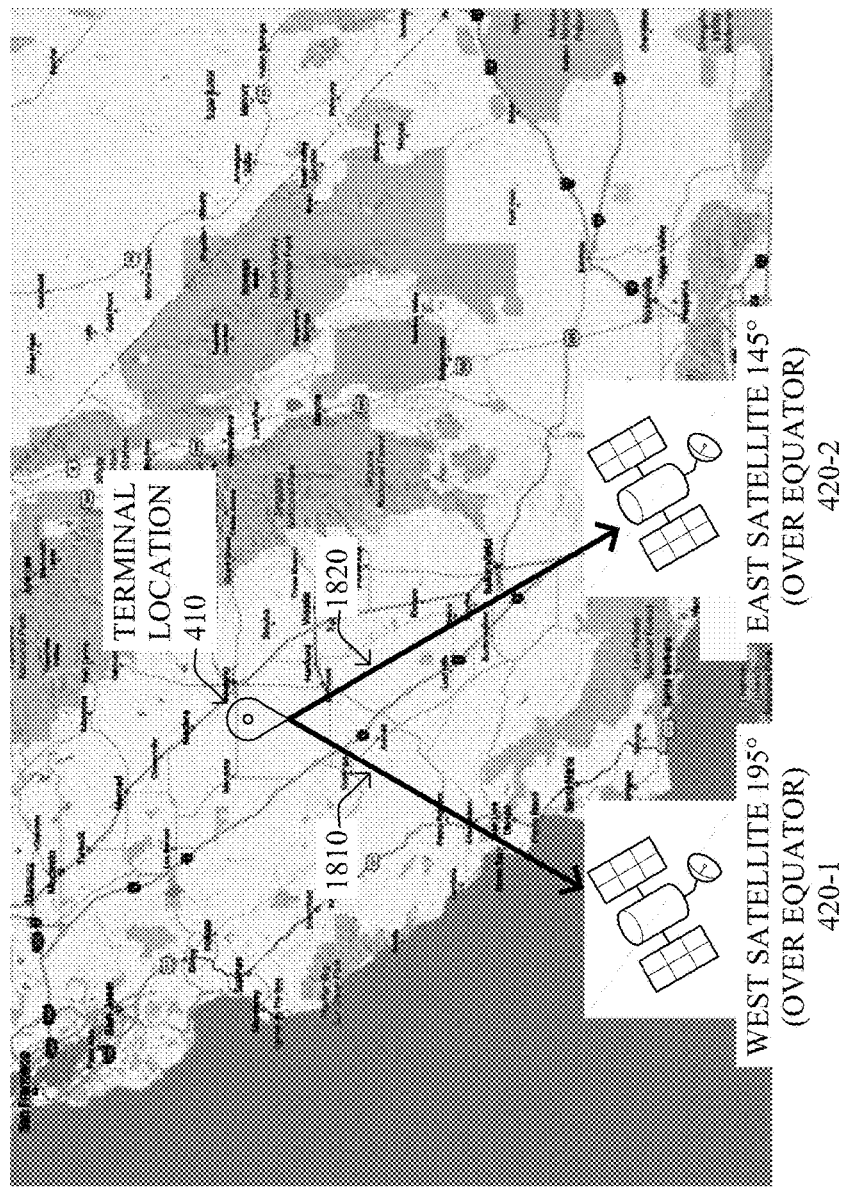
FIG. 18 illustrates an example of intended receiver diversity and azimuth angles due to such diversity.

Specifically, with regard to intended receiver (e.g., satellite) diversity, the illustrative satellite-based system herein may operate initially with two or three geostationary satellites. For instance, to provide diversity and to manage occlusions from mountains or other obstructions, the illustrative system may employ one geostationary satellite in the westerly direction, and one in the easterly direction. An example of such intended receiver orientation from a terminal is shown in FIG. 18, where a terminal 410 at any particular location may point at (aim at) each of the intended receivers at a slightly different azimuth and elevation appropriate for the corresponding satellite, e.g., a southwesterly azimuth 1810 to satellite 420-1, and a southeasterly azimuth 1820 to satellite 420-2. (As described below, the terminal (or server) may select the best available satellite based on location and other factors.) Using the illustrative locations of example geostationary satellites, the difference between azimuth 1810 and azimuth 1820 may result in a 40-degree to 60-degree difference in azimuth look angle. As such, the resultant protection zones 1700 based on link budget calculations as described above could vary significantly, and as such may require separate computations depending upon which intended receiver is being considered.

It is important to note again that the link-budget-calculated protection zone boundary is governed by one or more (or illustratively all) of the following:
  On the receiver:
    location (latitude/longitude);
    antenna azimuth;
    antenna polarity; and
    antenna gain definition for all angles around the receiver;
    (and, in certain optional embodiments, the antenna elevation and the antenna gain defined for all angles around the receiver).
  On the terminal:
    location (latitude/longitude);
    antenna pointing direction (azimuth and elevation);
    transmit antenna gain definition for all angles 0-360 of azimuth and elevation;
    power output of the transmitter; and
    transmitter antenna polarity.

Note that channels/frequencies do not affect the calculation of the actual protection zone (that is, if a frequency is changed/added in the ULS database, it does not affect the protection zone calculation or the horizon calculation). However, since the protection zones are referenced by frequency/channel (e.g., transmitting on "channel 1" would not generally interfere with a receiver configured to receive "channel 2"), it is also important to keep accurate record of the receiver frequency band/channel.

Those skilled in the art would also recognize that similar protection zones can be computed to ensure that the transmission does not interfere with receivers of other satellites which may be in the sky in an angle (elevation and azimuth) proximity to the intended satellite, as noted above.

According to one or more embodiments herein, the techniques herein may also compensate for any potential inaccuracy in the sensors of the terminal 410, such as, for example, the GPS location, the direction at which the mobile device points (azimuth), and the elevation relative to the horizon (tilt angle towards the satellite), and so on. In particular, to prevent any of these inaccuracies from misleading the terminal into thinking that it is not in a protection zone (where terminal transmission would not adversely impact any PtPR), the techniques herein may perform a "smearing" operation which expands the size of the protected zone (as denoted by the polygons 1700 above).

In one specific embodiment, the techniques herein include a smearing operation on the table of the terminal's transmitter antenna gain relative to the direction of incumbent receiver 310 (e.g., PtPR), and the tilt (elevation) of the transmitter toward the intended receiver 420 (e.g., satellite) relative to the horizon. However, in general this operation may factor in the uncertainty of the terminal's GPS location, the uncertainty of the azimuth of the intended receiver/satellite relative to the terminal's current position (which may come from the compass reading of the terminal, or from any other suitable azimuth sensor and/or calculation, and the uncertainty in elevation relative to the horizon (tilt angle towards the satellite).

This smearing process is meant to ensure that even in the worst case of any of these errors (or the combination of these errors), the system would still prevent a terminal 410 from interfering with any of the receivers 310. To this end, the protection zones (polygons) 1700 calculated through the link-budget-based approach above may be expanded by varying the above parameters and expanding the protection zone for the worst case that could be caused by errors in the terminal's sensory system. Note that in accordance with yet another embodiment, the system may also bring into account the shaking of a user's hand by adding a fixed angular smear factor (such as, e.g., +/−5 degrees), and using this information to expand the protection zone even further.

Figure 19:
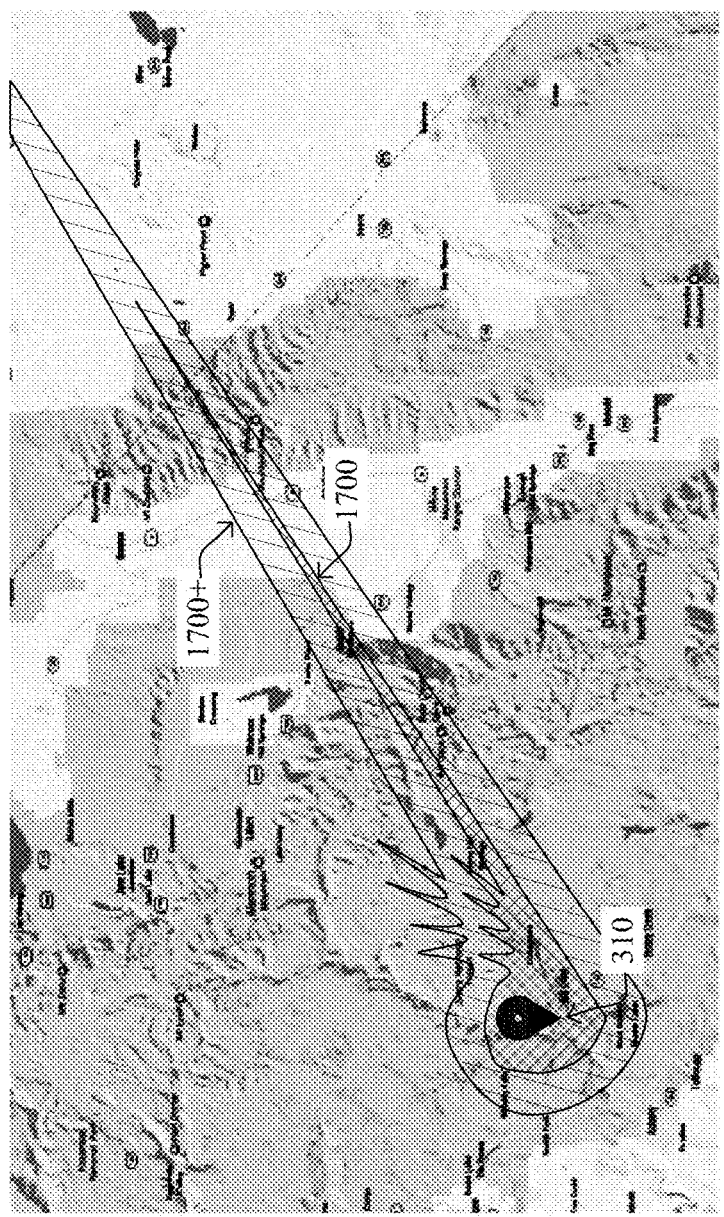
FIG. 19 illustrates an example of how a smearing operation may affect a protection zone to compensate for any potential inaccuracy by expanding it in certain directions.

FIG. 19 illustrates an example of how smearing may affect the protection zone 1700, by expanding it in certain directions (e.g., "1700+") to compensate for any potential inaccuracy. As shown, for illustration only, this particular expansion as shown in FIG. 19 results in a general extension of the protection zone along each of the radial directions of the original zone 1700. However, actual computations of the zone based on smearing factors being input into the calculations above may result in a slightly different shape of the polygon, a different proportion of expansion, and perhaps with different expansion affects in different directions (e.g., greater along the main lobe than along the side lobes, etc.). For example, illustrative computations may be made (for each satellite) for a 0 az (zero azimuth) and 0 el (zero elevation) (no smear, e.g., FIG. 17), as well as for a +/−30 az and +/−5 el antenna smear, and a +/−180 az and +/−5 el antenna smear. Such different azimuth/elevation smearing for the same unintended receiver/PtPR would thus result in different protection zones 1700/1700+. Accordingly, the expanded zone 1700+ is merely a visual example of how protection zone 1700 may be expanded, and is not meant to be limiting to the embodiments herein.

It should be noted that in one or more embodiments herein, the relative height of the terminal 410 with respect to the incumbent receiver 310 need not be factored into the smearing equation above, in order to reduce the computational complexity of the system. Rather, certain embodiments of the techniques herein may assume that that the terminal and the incumbent receiver are at the same altitude. This assumption is valid because when the terminal is at close distance to the receiver, the link budget is very high and the terminal is within a protected zone anyhow. On the other hand, when the terminal is far away from the receiver, the relative height of the mobile with respect to the receiver is much smaller than the distance. This results in a negligible low angle between the line of sight of the terminal to the receiver's antenna and the horizon. At the same time, however, should the height of the transmitter create a more substantial difference, such as for UAVs or other flying vehicles, then the relative height may be an important factor. Accordingly, whether to account for the relative height of the terminal may be configured on an implementation-by-implementation basis. For instance, in one particular embodiment, the system may use an elevation smear value, such as +/−5 degrees, that takes into account the potential elevation difference.

Generally, in the specific satellite network example implementation, if the terminal is actually above the altitude of the incumbent receiver antenna, the elevation won't be an issue because the terminal would be pointing up to the satellite (and away from the incumbent receiver antenna). However, if the terminal is lower than the incumbent receiver and closer to it, the terminal could be transmitting much closer to the antenna, especially in a mountainous area where the terminal is in a valley at the base of a mountain and the incumbent receiver (e.g., PtPR) is on the top of the mountain. One way to handle this would be a progressive smear of the elevation table for the incumbent receiver, so that the closer the terminal is to the incumbent receiver antenna, the more it can be smeared.

Notably, in certain embodiments (e.g., the preferred embodiment), the protection zone polygon 1700 need not be stored in the server database 543 or transmitted to the terminal (for local database 643), and instead may be used as a boundary around the incumbent receiver 310 within which the elevation of each geographic point may be evaluated to determine if that point is visible from the incumbent receiver or not. As described below, therefore, the distance of the farthest point within the protection zone that is visible from the line-of-sight receiver (e.g., a PtPR) is then stored in the database as a horizon.

Microwave communication, in particular, is line of sight, and is effectively blocked by earth features that are in the line of sight between the terminal 410 and the incumbent receiver (e.g., PtPR) 310. Topology mapping/information about the terrain in which the incumbent network 300 operates is known, and as mentioned above, information about the topology of the terrain is available to the server 450. (Note that in accordance with a specific embodiment, topographic information may also exist in the terminal, such as partial information (e.g., based on smaller map areas or less detailed information), and used as described below.)

According to one or more embodiments of the disclosure herein, the techniques herein may factor in the topographical layout associated with each incumbent receiver 310. That is, in the previous steps above, the protected zones (polygons 1700) were calculated without bringing into account the topology of the area, and as such, the previous calculations were made under the assumption that the incumbent receivers 310 and terminal 410 operate on a flat plain (e.g., receivers 310 at their designated altitude above sea level, and the terminal 410 at sea level, but without any terrain features between them). In reality, various locations within the protected zones which were calculated in the previous steps may actually not need to be included in the protected zone because some topological feature (e.g., a higher hill or the actual horizon based on the elevation of the surrounding terrain) obscures a line of sight from that location to the incumbent receiver.

Figure 20:
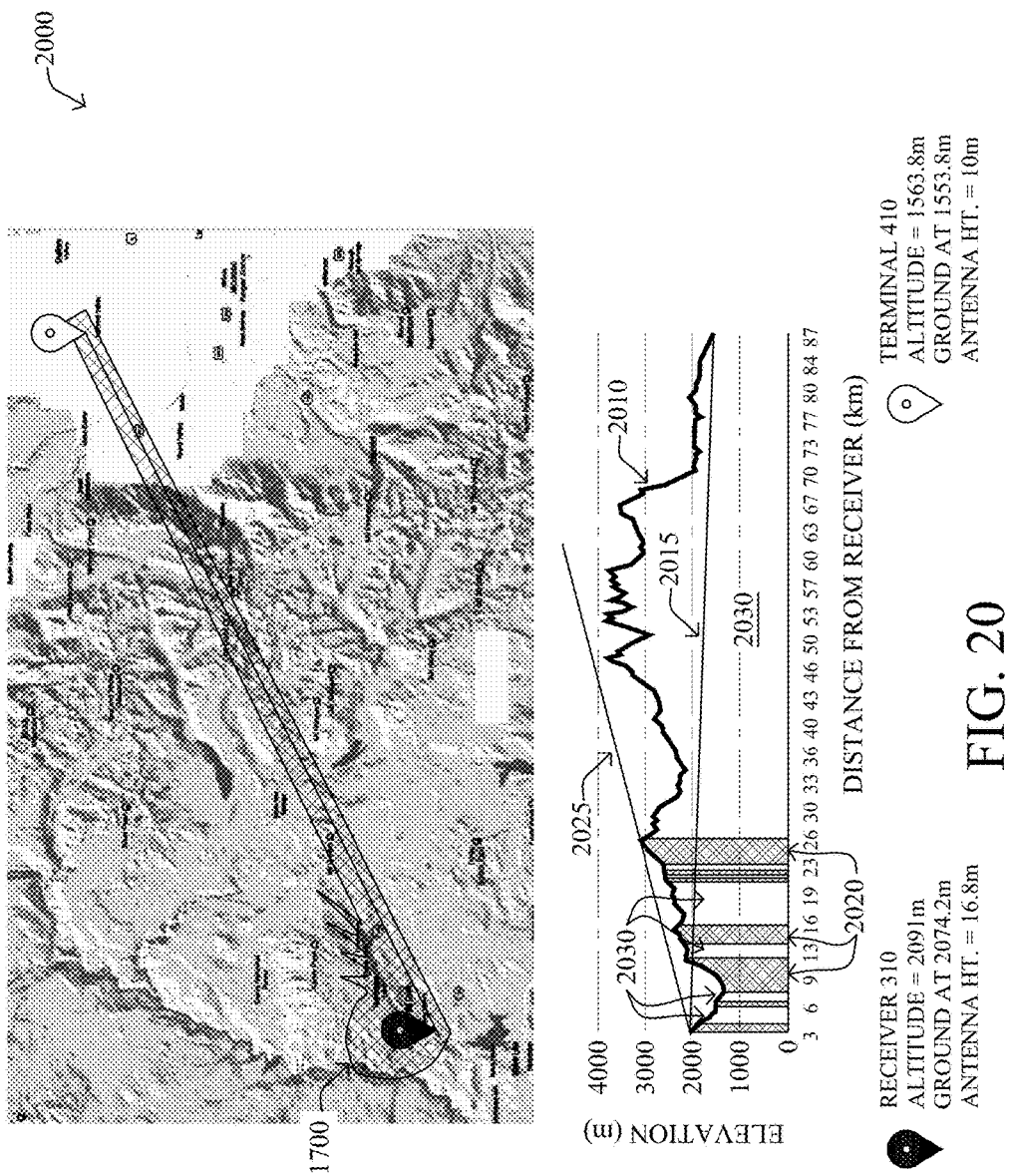
FIG. 20 illustrates an example cut-away view of an illustrative terrain/topology along a line from an incumbent receiver to points within its example protection zone.

FIG. 20 illustrates an example cut-away view 2000 of an illustrative terrain/topology 2010 along the line 2015 from an incumbent receiver 310 to any point within its example protection zone 1700 (e.g., along the main lobe). (Note that any protection zone may be used, such as simplified zone 1400 above or, preferably, the extended protection zone 1700+, and the view in FIG. 20 is merely an example for discussion of the techniques herein.) Locations 2020 from which there is a line of sight from the location on the ground towards the incumbent receiver 310 are marked with a hashing, and locations 2030 which are hidden from the receiver 310 have no such hashing.

According to the techniques herein, therefore, terrain around an incumbent receiver 310 may be mapped by sampling the ground elevation in radials every r degrees around the receiver location (starting at the incumbent receiver and extending outward from the incumbent receiver). Terrain mapping is location-dependent rather than link-budget-dependent, so it only has to be done once per location (per incumbent receiver), optionally limited to processing elevations within calculated protection zones (which differ by smear value, incumbent receiver azimuth, and intended receiver/satellite for a particular location). The elevation mapping only needs to know the status of terrain points (visible or not visible to the incumbent receiver). Notably, however, keeping a status for each individual point in the radial is data intensive.

Instead, therefore, the techniques herein also propose a method of using the slope (line 2025) and distance from the incumbent receiver to blocking elevations. For example, if the maximum slope is set to −999 (which is practically straight down), elevation may then be sampled every n meters moving outward from the receiver. For each sample point, the slope from the incumbent receiver to the point is calculated. If the calculated slope is less or equal to than the current maximum slope, then that point is not visible to the incumbent receiver 310, since the elevation point where the current maximum slope was generated would be blocking that point. If the calculated slope is greater than the current maximum slope, then that point is visible to the incumbent receiver, and it is set to the new maximum current slope. Sampling proceeds outwards from that point with the slope calculated at each point, until the calculated slope is less than the current maximum slope. This represents a blocking elevation, and is stored with the slope value and the distance from the incumbent receiver. Sampling continues out the radial until the maximum possible horizon is reached. For example such a maximum might correspond to the maximum distance that two 4000 m peaks (with sea level elevation between them) would be visible from each other, which is approximately 450 km. (Note that optimizations can be done in addition or in the alternative to sampling only within the calculated protection zones, such as using the actual elevation of the incumbent receiver location, among others.)

The topology-based actions above result in a set of [distance, slope] pairs, where for any point along the radial, the visibility can be determined by finding the two [distance, slope] pairs that the point lies between, calculating the slope from the point's distance and elevation to the incumbent receiver, and comparing it to the slope of the [distance, slope] pair closer to the incumbent receiver. If the slope of the test point is greater than the closer [distance, slope] pair, then the point is visible from the incumbent receiver, otherwise it is not visible.

This provides a technique for calculating the visibility of the incumbent receiver from any point around using slopes. For precise implementations (e.g., no forgiveness for interference), error should be made toward the point being visible rather not visible, because interference with the incumbent receiver (e.g., a PtPR) must be avoided at all costs. Using this method, missing a [distance, slope] pair causes more terrain to be revealed rather than obscured.

As the distance from the incumbent receiver increases, so does the distance between adjacent radials. To avoid missing lower areas between sampled points, each of the points are sampled perpendicular to each side the radial at increments of "n" meters up to half the distance to the next radial, and the lowest elevation value is used. (Note that in one illustrative example, both the highest and lowest elevation values may be used: the highest for testing the visibility, and the lowest for determining the slope.)

The last [distance, slope] value for a radial gives the maximum horizon for the radial. Any of the values in between it and the incumbent receiver can be used to increase the amount of blocked area; ignoring a [distance, slope] value simply decreases the amount of blocked area that is calculated.

The maximum [distance, slope] value for the total set of radials can be considered to be the maximum horizon for the location of the specific incumbent receiver (e.g., PtPR), since from no direction is the incumbent receiver be visible beyond that distance. This is defined to be the "Maximum Horizon" for an incumbent receiver. Note that this applies primarily for terrestrial PtPRs; when dealing with a PtPR incumbent receiver in the sky, e.g., a satellite, the corresponding horizon may be based on the height/altitude of the satellite applied to corresponding three-dimensional horizon calculations, accordingly. Note further that a satellite may be also affected by local topology. For example, if a satellite is placed on the sky over Hawaii, it may appear for some users (for example users in Colorado) as being low above the horizon and as such it may (or may not) be obscured by a mountain.

Notably, terrain mapping calculations also take into account curvature of the earth when calculating the blocked distances (e.g., using a standard 4/3 earth model to compensate for surface refraction effects).

Referring again to FIG. 20, the cross section associated with a specific azimuth from a specific incumbent receiver towards a terminal's location on the ground is shown. Despite the fact that the protection zone 1700 may mathematically extend up to 125 km, the topology map indicates that more than 75% of the places along the specific azimuth (areas 2030) can be safely excluded from the protected zone. Different azimuths will have a different cross section, and as such, identify different areas that could be excluded from the protected zone 1700.

Figure 21:
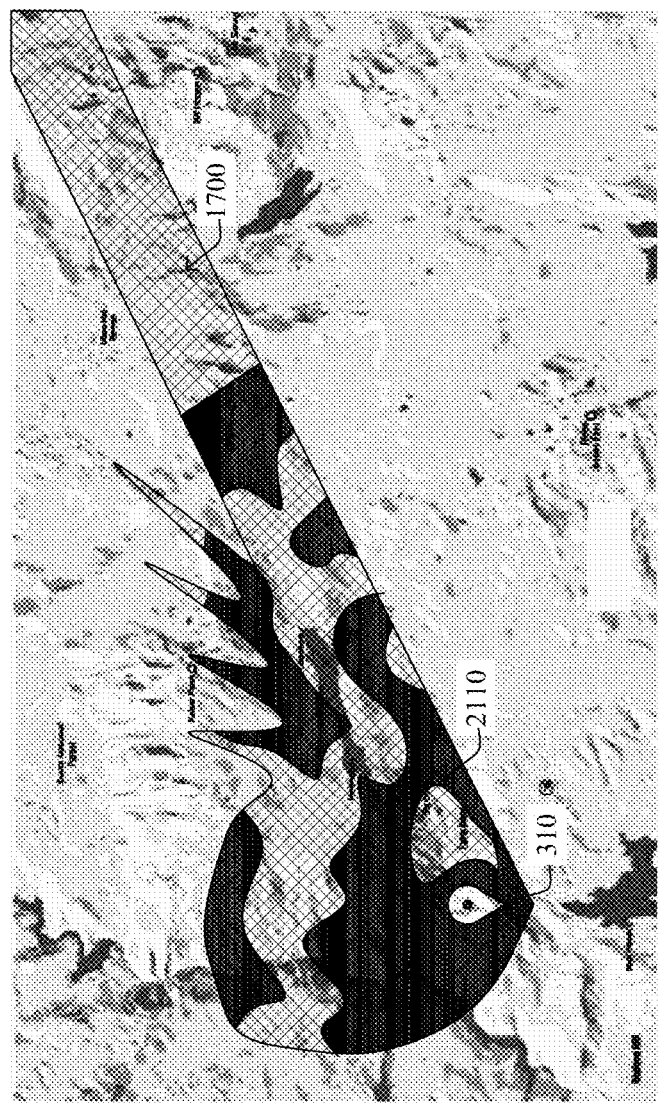
FIG. 21 illustrates an example reduced protection zone due to topology and line-of-sight considerations.

According to one or more embodiments herein, the server 450 may thus calculate the topological cross sections for each incumbent receiver 310 radially at small increments (e.g., on 1-degree increments) around the incumbent receiver's location up to the intersection of the radial with the protection zone polygon 1700. Referring to FIG. 21, therefore, which illustrates the completely blackened areas 2110 on the map to show the locations that were in the protection zone 1700 (with respect to the given incumbent receiver and specific channel and based on the link budget calculation) which have a line of sight towards this specific incumbent receiver. The hashed areas within the protection zone 1700 now indicate locations which could be excluded from the protection zone because the topology obscures the incumbent receiver, and as such, there is no line of sight from these locations towards the incumbent receiver.

Notably, in the illustrative embodiment, the server 450 calculates the polygon boundary 1700 for all incumbent receivers where the link budget is equal to the noise floor, prior to calculating the reduced coverage of areas 2110. This keeps the amount of terrain data that is computed to a minimum. However, in alternative embodiments, the server may first compute all lines of sight regions from incumbent receivers, and then calculate the portions of those visible regions that meet the link-budget equations above. The end result would be the same, and it is merely a matter of computational preference.

Note further that according to one or more embodiments herein, terrain mapping reductions can be applied selectively in areas, such as where multiple protection zones overlap to give better channel selection options. Moreover, since terrain mapping information does not change, it can be downloaded a single time into the terminals 410 for the regions (or for specific incumbent receivers) where it has the greatest benefit, such as near mountainous areas, and used by the terminal as described below.

In accordance with a preferred embodiment, the link budget calculation and the topological line of sight horizon calculation may be performed in the server 450 or in offline cloud-based servers. Generally, the size of the server database 543 that would contain all of the details of the calculated link-budget protection zones 1700 and/or line-of-sight reductions to coverage area 2110 would often be too large to store in its entirety within local database 643 of a terminal. In addition to the size of the database, the calculations required to determine the impact of the topology on protected zones may also make it impractical to use the entire server database data in the terminal. Though in certain embodiments contemplated herein, sufficient resources (e.g., CPU and memory) may, in fact, be available on the terminals 410, and the complete server database may be stored on the terminal for computation of terrain-based line-of-sight computations, more likely embodiments may consist of a hybrid approach, where only some of the terrain data is stored on the terminal, as noted above. Furthermore, based on the fact that the information about the incumbent system may change (e.g., the large FCC ULS database may change), it may not be practical to update the entire database over a low-bandwidth (e.g., satellite) communication channel.

In order to reduce the necessary size of the terminal's local database 643, and in order to reduce the amount of data transmission to the terminal which may be required in order to update it for changes in the information (e.g., the FCC ULS database), the techniques herein introduce the concept of major and minor horizons (described below), which are calculated in the server 450 as a compressed representation of the relevant the areas 2110 within the protection zone which have a line of sight to the incumbent receiver, and passed to the terminal in lieu of using the entire server database 543. For example, the local database 643 need only to store the parameters that the terminal would require to calculate (on the terminal 410) which channels (if any) can be used to transmit towards a given intended receiver (e.g., satellite) 420 from a specific GPS location without interfering with any incumbent receiver (e.g., PtPR) 310. To achieve this, a system in accordance with the embodiments herein may introduce the use of major and minor horizons, which provide a representation of the more complex description of areas 2110 within the protection zone which have a line of sight to the incumbent receiver as viewed from an incumbent receiver (and projected onto link budget derived boundary polygons 1700). This representation method reduces the amount of stored data on the terminal (e.g., as well as the time/bandwidth required to synchronize the local database 643 with any updates to the FCC database and/or the server database 543), as described below.

Specifically, rather than maintain the topographic information in the mobile device and calculating the visible protection zones 2110 or maintaining a list of all of the out-of-sight portions of the protection zones 1700 which could be excluded from the protected zone, one or more embodiments of the techniques herein simplify the data structure stored on the terminal by maintaining only the farthest locations ("horizons") in the protected zone 1700 (or, as mentioned above, simplified zone 1400), from which there is still a line of sight towards the incumbent receiver 310.

FIG. 22 illustrates the reduced protection zone 2110 of FIG. 21, along with an associated major horizon 2220 and minor horizon 2230, associated with incumbent receiver 310 as described herein. To calculate the major horizon 2220, the server 450 may determine the farthest distance within an arc (e.g., +/−30 degrees), related to the azimuth of the specific incumbent receiver antenna, from which there is still a line of sight towards the specific incumbent receiver and from which the link budget is greater or equal to the noise level threshold as discussed above. Note that the illustrative +/−30-degree section was chosen empirically (arbitrarily) based on the typical shape of the protection zones 1700/2110, and other angular ranges may be used to define the arc of the major horizon (e.g., +/−10 degrees, +/−45 degrees, and so on), so long as the resultant major horizon (angular range and distance), and minor horizon (described below), would include all of the areas 2110 where a transmission by terminal 410 may interfere with a corresponding incumbent receiver.

Note further that the angular range of the major horizon (e.g., +/−30 degrees) may be consistent across all incumbent receivers (e.g., receiver A having a major horizon with distance X and a receiver B having a major horizon with distance Y, where both angular ranges of the major horizons are a pre-defined +/−30 degrees), or else may be different and defined on a per-receiver basis (e.g., receiver A having a major horizon with distance X and a determined angular range of +/−30 degrees, and a receiver B having a major horizon with distance Y and a determined angular range of +/−20 degrees). Note that in such an embodiment, the different angular ranges for the arcs of the major horizons would thus need to be also transmitted to and stored within the local database 643 of the terminals (e.g., in the above example, the local database 643 would need to store the +/−30 degrees for receiver A, +/−20 degrees for receiver B, etc.).

The major horizon 2220 is illustratively marked within FIG. 22 as a "pie-shaped" section which spans 60 (+/−30) degrees, having a radius (distance from the incumbent receiver 310) being defined by the major horizon. As can be seen, all of the visible (black) locations 2110 from which there is line of sight towards the incumbent receiver within the +/−30-degree section (and that are in the protection zone 1700, i.e., defining the locations where a terminal's transmission may interfere) are located within the arc of the major horizon 2220 (that is, the pie-shaped section).

Similarly, the system may also determine the farthest locations in the remaining 300 degrees (or whichever remaining portion of the 360 degrees surrounding the incumbent receiver) which are in the protection zone 1700, and particularly from which there is a line of sight (reduced zones 2110). This distance is defined to be the minor horizon 2230, which, as shown in FIG. 22, defines an arc that generally surrounds any remaining visible side lobes or back lobes of the incumbent receiver which is not already encompassed by the major horizon. It should be again noted that according to this embodiment, all of the areas 2110 within the protected zone 1700, from which there is a line of sight towards the incumbent receiver, are included either in the major horizon 2220 or within the minor horizon 2230.

According to this particular embodiment of the techniques herein, therefore, an illustrative local database 643 on the terminal would include the following information for each incumbent receiver 310: index (tower ID), tower latitude and longitude, antenna azimuth, polarity (horizontal and/or vertical), satellite transponder channels that the incumbent receiver frequencies overlap, and major and minor horizons (e.g., for each intended receiver/satellite, and for each azimuth/elevation smear value as described above). (Also, for satellite receivers, which may have an assumed altitude of 22,336 miles, an angle of elevation of the receiver (with relation to the terminal, e.g., calculated based on the position of the satellite in the sky and the GPS location of the terminal) may also need to be known for corresponding calculations, as mentioned herein.) Illustratively, the database consists of approximately 17 bytes of data per incumbent receiver. The specific size (number of bytes) of a terminal's local database 643 depends on the number of parameters stored for each incumbent receiver. For example, some antennas operate in only horizontal or vertical polarity while other may operate simultaneously in both horizontal and vertical polarity. As such, in one possible embodiment herein, if an incumbent receiver has a dual polarization antenna, the techniques herein may be configured to assume the worst case and use only a single (i.e., the longest) horizon. Alternatively, if the antenna has only a single polarity, then the database may be populated with two different horizons in this embodiment, one for transmitting in a polarity aligned with the incumbent receiver's polarization, and the other one perpendicular to the receiver's polarity.

Now that the server's database 543 has been populated with a representation of a potential interference zone, particularly selected from one or more of the simple protection zones 1400 link-budget-based protection zones 1700, or, preferably, the major and minor representations 2220/2230, as described above, this information may then be shared with the terminal 410 for storage in its local database 643. In accordance with one or more embodiments herein, the terminal 410 may be configured to receive the information for its database 643 in a variety of manners.

First, with regard to communication of the data, the data about the incumbent network may illustratively be uploaded to the terminal 410 during initial configuration of the device (e.g., by the manufacturer), and/or when high-bandwidth connectivity (e.g., Wi-Fi, USB connection to an Internet-connected device, cellular, etc.) is available. Retrieving the data over a lower bandwidth connection, such as a satellite link, might take a long time, and as such, an illustrative (and non-limiting) embodiment reserves such low-bandwidth link transfers for smaller updates or emergency downloads only.

In particular, with regard to updates to the data, the techniques herein may preferably ensure that the terminal databases are kept updated at all times in order to properly account for any changes to the incumbent system's configuration (e.g., new or changed licenses, etc.). Note that updates to the underlying information of the incumbent network may occur monthly, weekly, daily, multiple times per day, or at any interval determined by the system. The terminals 410 herein may thus be configured to synchronize with the latest server database 543 (i.e., check if it is up-to-date). In one aspect of the techniques herein, the terminals 410 may be configured to regularly synchronize and update (if out-of-date/sync) their local database whenever connected to a high-bandwidth link, or otherwise so long as the terminal is able to communicate with the server (or some other system infrastructure) via a network that does not need to avoid interference with incumbent receivers. For instance, this may occur while a user is at home (e.g., preparing for a trip), or else in the field whenever a wireless network (e.g., Wi-Fi, cellular, etc.) becomes available. In another aspect of the techniques herein, particularly in embodiments with zero interference tolerance, the terminals must confirm that their local database is up-to-date/synchronized with any updated information about incumbent receivers (e.g., at least local receivers) when the terminal desires to transmit. In this aspect, should the local database be out-of-date, then any downloads at this point (e.g., on the reduced-bandwidth satellite channel) may be limited to a relatively small region around the present location of the terminal.

Regarding what, exactly, the data is that is downloaded to the terminal, various embodiments are presented herein, ranging from a full download (all of the information for the entire incumbent network), down to a minimalistic download (e.g., update) of data related to incumbent receivers in the vicinity of the terminal 410. In particular, since a general embodiment of a terminal 410 assumes that storage of information about the entire incumbent network (and terrain information, etc.) may be too large for the terminal's memory (and/or processing) capacity, various storage efficiencies may be considered herein. That is, though the storage and computation requirement of the database 643 and processor 620 of device 410 may be reduced greatly by the simplified major and minor horizons representation of the protection zones, this simplified database representation may still be too large (and time consuming) for updates over a low-bandwidth satellite communication channel 400. To alleviate this problem, the database may be further divided into geographical zones, wherein each zone contains only partial information of the whole database.

For instance, in one embodiment, the data used to update the database 643 of terminal 410 is limited to whatever portion (zones) of the incumbent network that is deemed applicable, e.g., based on location of the terminal (e.g., if the terminal is located in the western portion of the United States, only information about incumbent receivers in the western portion of the United States, as opposed to all incumbent receivers in the United States, may be used to update the database of that terminal). Note that the use of western and eastern regions is merely one illustrative embodiment, and any number of regions or "geo-zones" (or zones) may be established, such as based on the size of the resultant per-zone "sub-database" (e.g., to balance the number of incumbent receivers in each zone), or other factors deemed appropriate. In one illustrative (and non-limiting) example, fourteen (14) geo-zones may be used to divide the incumbent network of PtPRs in the United States into manageable portions (note that the geo-zones may overlap).

In another embodiment, various levels of detail may be downloaded to the terminal, such as, for example, detailed (precise) information regarding all incumbent receivers communicating only on certain frequency bands/channels (e.g., hailing channels, described below) within the entire incumbent network (e.g., link-budget-based protection zones 1700/1700+), major and minor horizon information protection zones (2220/2230) for a given geo-zone region (e.g., California), and then detailed terrain information (2010) for a sub-region (e.g., the hills within 50 miles of Palo Alto, Calif.). Any combination of information granularity and coverage may be conceived, and the present disclosure is not limited to only those mentioned herein. In addition, the different levels of information may also be time-dependent, meaning general information may first be downloaded, and then as the terminal attempts to transmit from a given location or moves around to different transmission locations, then depending upon the level of available bandwidth on the communication medium, additional information may be supplemented while "in the field". (For example, as described below, a "hailing channel" may be used to initiate communication, and then for this currently mentioned embodiment, that initial communication could be used to supplement additional information to the terminal to assist in deciding the particular channel to use for the remainder of the communication.)

Armed with the appropriate information about the incumbent network 300, the terminals 410 may proceed to transmit safely (without interfering) according to the terminal-based operations described herein. (See, again, the general description above in FIG. 12B.) In particular, a terminal 410 (e.g., attached to a smartphone, within a smartphone, or as a part or accessory to any other device with a primary communication channel, such as cellular, Wi-Fi, etc.) may first turn on its potentially interfering communication process (e.g., satellite-based communication in the C-band). In one embodiment, this may be a simple on/off functionality, or else in another embodiment may be based on whether the primary communication channel lacks sufficient coverage.

Once on, or once otherwise ready to attempt transmission, the terminal 410 must determine its geographical location within the incumbent network. Generally, the level of accuracy of a satellite-based global positioning system (GPS) is preferred, though other known location techniques may be used. (Note that for reduced accuracy locations, including GPS location inaccuracies, additional safeguards may be utilized, such as expanded location possibility calculations, reduced communication power, designated/reserved channel usage only, etc.) For example, due to limitations of GPS systems, the location of the terminal 410 may not be determined with complete certainty, so the putative coordinates of the terminal may be insufficient to guarantee that transmission is allowed. (Certain GPS software provides not only coordinates but an uncertainty distance d_uncertain, such that the mobile device is assumed to be found within a circle of radius d_uncertain around the reported location (latitude/longitude).) Note that in addition, the techniques herein, in certain embodiments (e.g., adhering to FCC requirements), may also determine the distance that can be traveled from the current location, so that transmission occurring while the terminal is in motion can be performed without moving into a interfering protection zone (that is, for example, while moving in a car, on a boat, on a drone, etc.).

With its current location information, the terminal 410 may then proceed to ensure that its transmission will not interfere with an incumbent system 300 (e.g., ensuring that it complies with FCC rulings and never interferes with any of the incumbent PtPRs). In particular, for the current terminal location (e.g., any and all positions within an uncertain circle mentioned above, or any position potentially reached while in motion), the terminal references its database 643 to determine whether the location is within a protection zone (simplified zone 1400, link-budget-based zone 1700, smeared zone 1700+, major/minor horizons 2220/2230, and so on) of any incumbent receivers 310, as detailed above.

Recall, as described above, that a protection zone for a receiver 310 (e.g., PtPR) is the geographical area around the receiver (as determined/defined by the server 450) in which a transmitting terminal might add an unacceptable amount of noise to that receiver. For example, PtPRs are sensitive to a terminal that is transmitting on a frequency whose bandwidth (e.g., +/−4 MHz) overlaps the frequency band of the PtPR. The chance for a terminal's transmission to interfere with an incumbent receiver 310 is a function of the incumbent receiver's antenna characteristics and that antenna's orientation relative to the terminal's location, the transmission power of the terminal antenna relative to the incumbent receiver location, and the distance between the terminal and the incumbent receiver, and so on. Recall, also, that the server 450 may be configured to provide simplified but less-precise (and more conservative) representations of the protection zones to the terminals (e.g., simplified protection zones 1400, major/minor horizons 2220/2230, etc.), in order to save resources of the terminals.

According to the techniques herein, therefore, rather than merely taking a generalized protection zone as a simple go/no-go indication of an ability to transmit (one optional, though imprecise embodiment herein), when the terminal 410 detects that a potential for interference exists (i.e., that the location is within a protection zone of a specific incumbent receiver), the terminal may then specifically determine whether any chance of interference would actually occur based on real-time link budget calculations from the precise location of the terminal towards this specific incumbent receiver.

In particular, according to one or more embodiments herein, for each one of the incumbent receivers having a protection zone within which the terminal's location resides, the terminal may calculate the link budget from the current location to the incumbent receiver, and may determine whether transmission from that location would interfere with operations of the unintended receiver (that is, whether the transmission would surpass a noise floor of the unintended receiver, optionally plus an additional safety margin, e.g., 6 dB). If it would (or would possibly) interfere, then that particular communication configuration (e.g., a particular channel to a particular receiver/satellite, at a particular polarity, etc.) may be deemed unavailable for transmission by the terminal in that location. Otherwise, the communication configuration is available to transmit without interfering with the incumbent network 300.

Note that this calculation takes into account the transmitter properties, such as pointing towards a given intended receiver (e.g., satellite) 420. For instance, in one embodiment, a terminal may first check a default communication configuration, e.g., a particular channel to a particular receiver/satellite, and as such, would compute the link budget for that particular receiver/satellite. In another embodiment, however, the terminal may first check all possible communication configurations (e.g., different channels, different intended receivers, etc.) to determine whether any channels are freely available (i.e., that do not need a link budget calculation). In this instance, if no channels are freely available, then the terminal may compute the link budget for any one or more of the communication configurations (e.g., different channels, different intended receivers, etc.), and may select one particular channel on which to transmit, as described below. (It is of course possible that in some cases there are no protection zones covering the location of terminal 410, and in such a case, link budget computations may not be necessary, and the terminal may simply transmit freely without fear of inducing interference.)

In one or more embodiments herein, in order to further ensure eliminating the prospect of interfering with an incumbent receiver, the link budget calculation performed by the terminal 410 may also take into account any uncertainty in any parameter used to calculate the link budget, such as measuring the direction (azimuth and elevation) in which the terminal points (e.g., similar to the smearing operation performed in the ground station/server as described above), or the uncertainty of the GPS location, such as uncertainty specifically reported by the GPS system of the terminal. For instance, regardless of the smearing or other expansion to protection zones as described above, the link budget computation by the terminal is based on whether it is within a protection zone, and the link budget computation itself thus returns to a level of mathematical precision according to various assumptions of the physical properties of the terminal at any given moment. However, for the same reasons as described above (inaccuracy in location or azimuth, shaking hands, etc.), this extra level of assurance may be beneficial to re-include into the link budget computation in order to account for such variations in actual transmission properties in order to ensure that under no circumstances the terminal 410 would interfere with incumbent receivers 310.

Other considerations, such as line-of-sight, may also be used to determine the chance of interference. For instance, as described above, since certain communication frequencies (e.g., C-band) need a clear path to the receiver, granting the terminal a permission to transmit also depends on whether or not there is a clear line-of-sight between the terminal and the unintended receiver (i.e., whether the terrain between the receiver and prospectively transmitting terminal would block the transmission in the direction of the receiver). In embodiments where the terminal has terrain information, further limitations may be placed on (or removed from) the possibility of interference with an incumbent receiver, since there will be defined regions within which a terminal would not be visible to, and would thus not actually interfere with, the incumbent receiver, regardless of what the link budget calculations above would otherwise assume. That is, even if the link budget calculation might indicate an interfering location, the fact that the unintended receiver would be topologically blocked from the transmitting terminal would render communication from that location available. Note that in one embodiment the link budget calculation may be performed first, and then terrain-based limiting may be performed to further filter the results of the interfering regions. Alternatively, terrain-based limiting may first be performed to filter the areas within the approximated protection zone for which a link-budget calculation would be necessary (e.g., if an unintended receiver is blocked for a particular region within which the terminal is located, there would be no need to perform a link budget calculation for that particular receiver).

Notably, the techniques described herein may make the choice of frequency diversity, satellite diversity, or polarization diversity by selecting the minimal potential for harmful interference, e.g., based on the particular location of the terminal 410 at the time it desires to transmit. As described above, frequency diversity is one way to avoid interference on one frequency by moving to another frequency for which the terminal would not be within a protection zone.

Figure 23A:
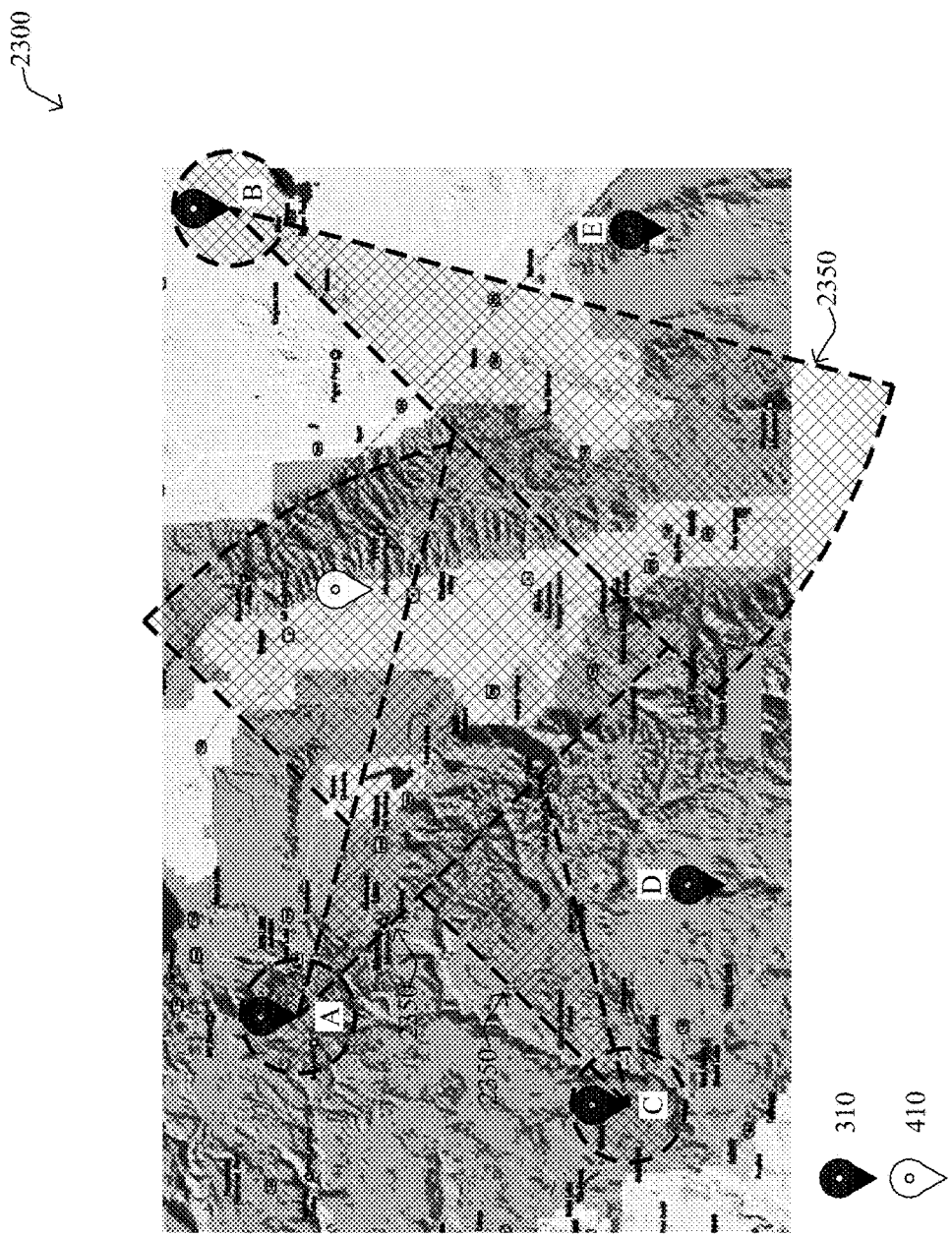
FIGS. 23A-23B illustrate a geo-locational example of avoiding interference in wireless communications in accordance with the techniques herein.
Figure 23B:

FIGS. 23A-23B, for example, illustrate a geo-locational example of avoiding interference in wireless communications in accordance with the techniques herein. For instance, in the geographical visualization 2300 of FIG. 23A, assume that there are five receivers 310, A, B, C, D, and E, within the proximity of a potentially transmitting terminal 410. As shown in FIG. 23A, three of receivers, A, B, and C are configured to receive on an illustrative channel "1" (a given frequency band), and their respective protection zones 2350 are shown. As can be seen, terminal 410 attempting to transmit to a specific intended receiver (e.g., satellite) 420 falls within the protection zone of receiver C on channel 1, and, assuming either that protection zones 2350 (e.g., simple protection zones 1400, link-budget-based protection zones 1700, or the major and minor representations 2220/2230) are dictating go/no-go authorities, or else assuming that a link budget calculation to receiver C determines that a transmission on the incumbent receiver's channel 1 would interfere, the system described herein would determine that channel 1, at that current location of terminal 410, is unavailable for transmission towards the intended receiver.

Conversely, as shown in visualization 2310 of FIG. 23B, assume that receivers D and E are configured for an illustrative channel "2" (a different frequency band than channel 1 above), and that protection zones 2350 of those receivers either do not overlap with the location of the terminal, or else the link budget calculation determines that communicating on channel 2 would be acceptable (non-interfering) with any incumbent receivers (e.g., PtPRs). In this instance, the terminal 410 would be permitted to transmit on non-interfering channel 2 towards the intended receiver (e.g., satellite) 420, but not permitted to transmit towards that intended receiver (e.g., satellite) on the interfering channel 1. Note that the views shown in FIGS. 23A-23B are vastly simplified from real-world examples, and are meant solely as an illustration, and are not meant to be limiting to the scope of the techniques herein.

In addition to frequency diversity, there are several additional communication configurations that can be adjusted to avoid any risk of interfering as well. For instance, in addition to frequency diversity, there are also satellite (or orientation) diversity and polarization diversity. Polarization diversity involves switching to the opposite antenna diversity to reduce interference. For example, certain terminal configurations may be able to transmit with either horizontal or vertical polarity, switchable on demand, or else by instructing a user to rotate the terminal to a different polarity. When the unintended receiver's antenna utilizes the same polarity as the terminal's transmitted signal, the distance from the incumbent receiver where communication is safe is quite a bit farther than when the transmitter and incumbent receiver polarities are not the same. The techniques herein may also account for various considerations for when one or both of the intended and unintended receivers may operate in dual polarities, particularly in a manner that reduces interference at the unintended receiver.

Figure 24A:
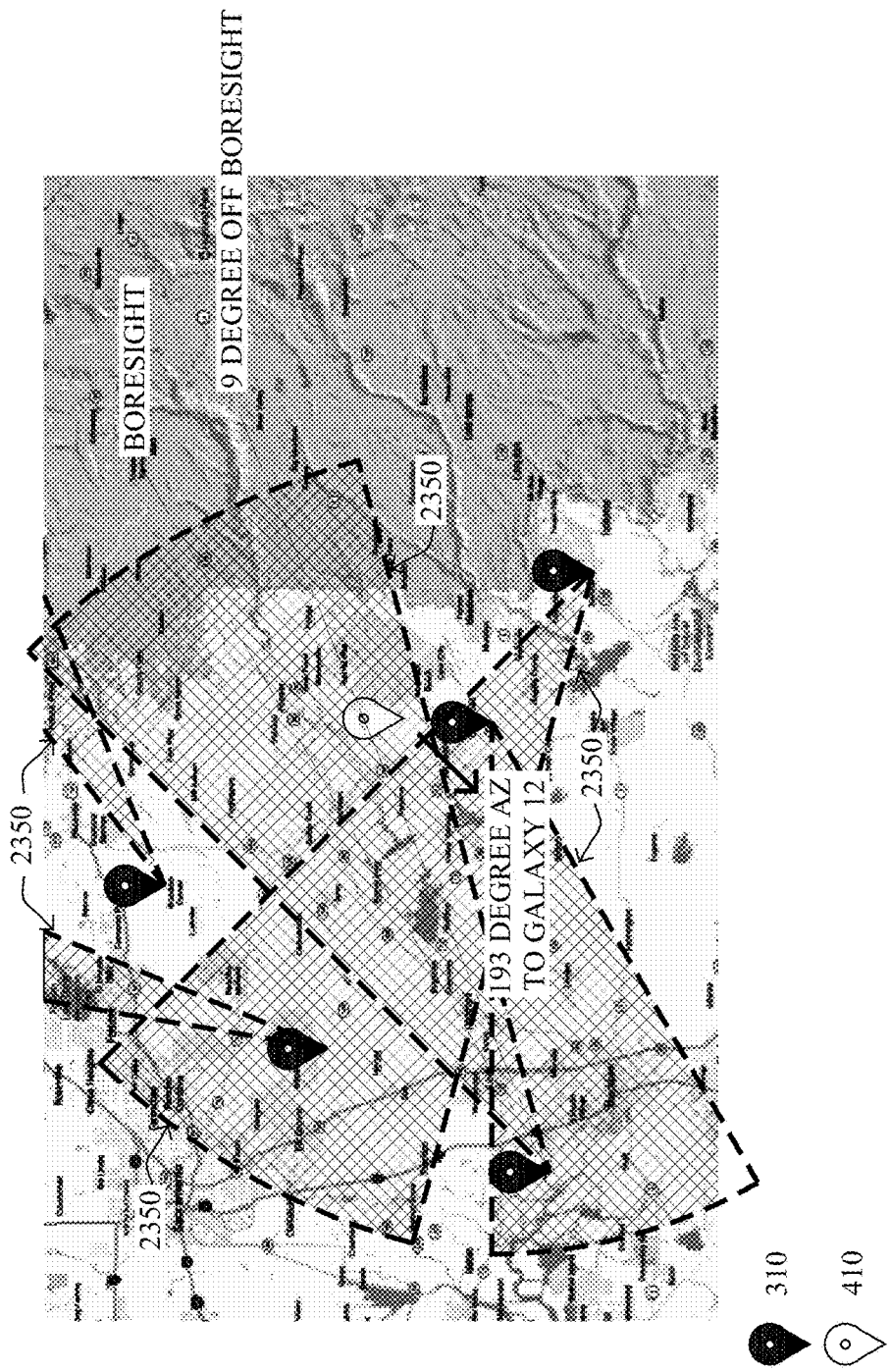
FIGS. 24A-24B illustrates an example of choosing satellite diversity for avoiding interference in wireless communications in accordance with the techniques herein.
Figure 24B:
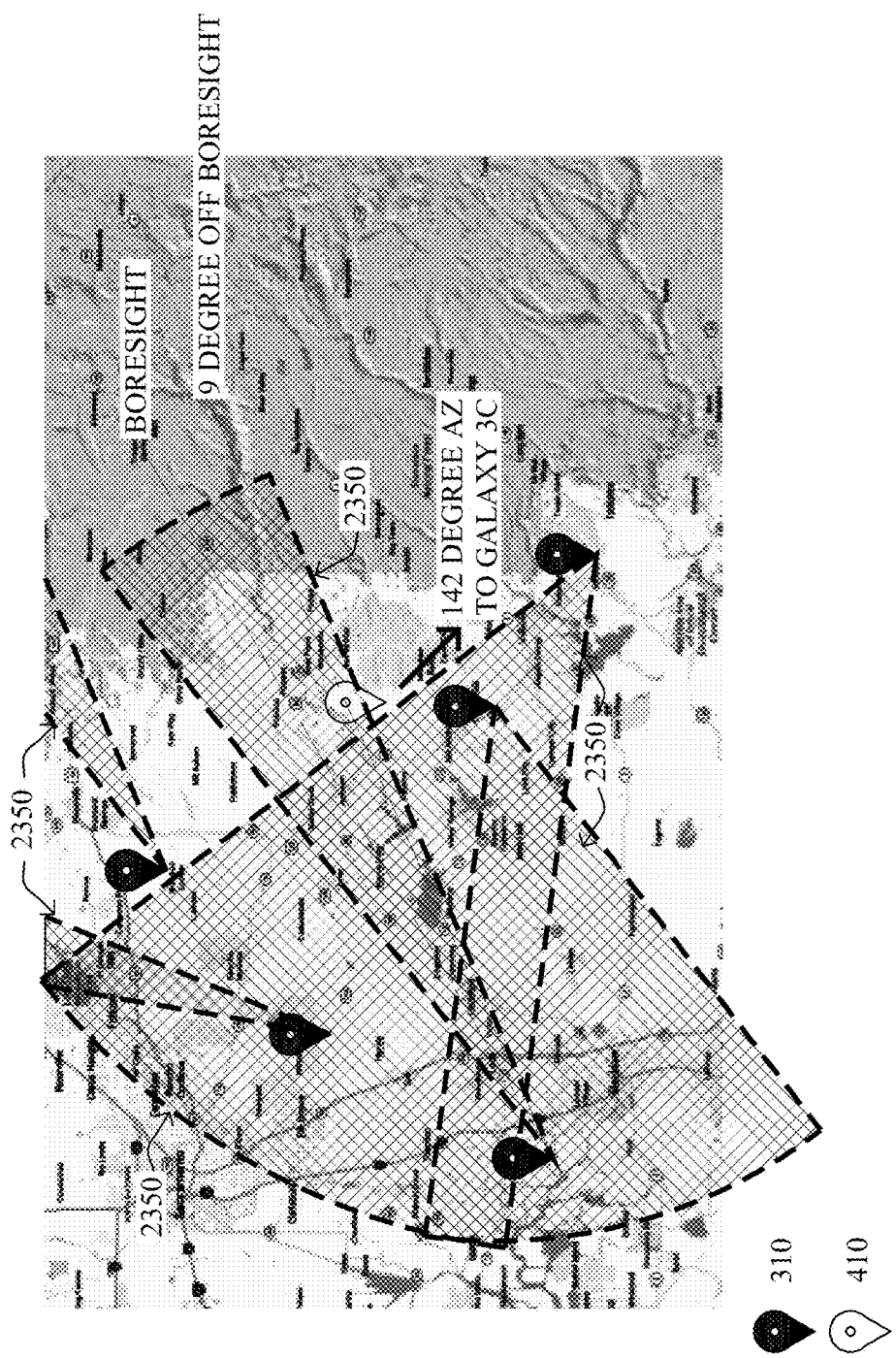

In FIGS. 24A-24B, an example of choosing satellite diversity is shown. Here, for example, a switch from a western satellite (e.g., 193-degree azimuth to the illustrative Galaxy 12 satellite) to an eastern satellite (e.g., 142-degree azimuth to the illustrative Galaxy 3C satellite), while remaining on the same channel, can be confidently computed by using the antenna gain parameters of both the unintended receiver antenna (Gr) and the gain of the terminals' transmitting antenna (Gt). For example, assume that as shown in FIG. 24A the terminal 410 considers a transmission to the western satellite (while at a location that is illustratively 9 degrees off of the incumbent receiver's bore-sight). In this position, and based on the corresponding aiming direction of the terminal's antenna for transmission to the western satellite, the terminal 410 falls within the protection zone 2350 of one particular incumbent receiver 310. Assume, for this example, that after perform the link budget calculations above, the terminal determines that a transmission from this location to the western satellite would (potentially) interfere with the operation of this incumbent receiver (the received power at the incumbent receiver would be above the noise floor), and would thus prohibit transmission under these parameters.

In FIG. 24B, on the other hand, when communicating with the alternative eastern satellite (e.g., 142-degree azimuth to Galaxy 3C), thus pointing slightly away from the incumbent receiver at issue, a corresponding protection zone 2350 may change based on the new angular relationship of the transmitter and incumbent receiver, since the link budget calculation to the incumbent receiver takes the aimed direction (transmission lobe) of the terminal's antenna into account. Note that while the satellite diversity switch may result in the terminal no longer being located within a protection zone 2350, at which time no further analysis would be necessary (i.e., the terminal would be free to transmit to that alternative satellite), the terminal 410 in this example may be still illustratively located within protection zone 2350, which still requires additional detailed analysis. According to the new aimed direction of the terminal's potential transmission, assume that it may now be determined (e.g., based on a link budget calculation) that the received power at the incumbent receiver would be below the noise floor, and as such, the transmitter would be allowed to transmit to the alternative satellite, unlike when transmitting toward the western satellite in FIG. 24A above from the same location. Thus, by using intended receiver (e.g., satellite) diversity, additional communication configurations may be achieved that offer more available options for a successful (i.e., non-interfering) transmission.

Note that where multiple communication configurations are available for transmission (i.e., without introducing any interference at any unintended receivers), the techniques herein may provide various considerations to allow the terminal 410 to select a specific configuration, and to proceed with its communication to the intended recipient (e.g., satellite) 420. For instance, the configuration (e.g., channel, recipient, polarity, transmission power, etc.) may be selected either a) in a manner that maximizes the link budget towards the intended receiver (e.g., one of the satellites), b) in a random way amongst the entire available set of configurations for the terminal to communicate with a specific receiver (e.g., a specific satellite), c) in a random way amongst the entire available set of configurations for the terminal to communicate with all of the available receivers (e.g., all of the available satellites), or d) in a manner that load balances any given channel's use across a plurality of terminals (e.g., based on server participation).

Conversely, should no communication configurations be available for transmission, regardless of communication diversity options discussed above, then the techniques herein prevent transmission from the terminal in order to avoid interference with the incumbent system 300. Note, however, that various additional measures may be attempted by the terminal prior to completely ruling out any communication from its current location. In particular, and described in greater detail below, the techniques herein also provide for various considerations for controlling an expected receive power at an incumbent receiver 310. For example, in one embodiment, if it is determined that the terminal 410 is in a location where the link budget is only marginally over a predetermined threshold, thus indicating that terminal 410 is prohibited from transmitting towards a specific intended receiver (e.g., satellite) because it would interfere (albeit marginally) with a given unintended incumbent receiver (e.g., PtPR) 310, the terminal may be configured reduce the power encountered by the unintended receiver (e.g., PtPR), and as such render a location which was marginally in a protected zone to become an unprotected transmission location for that particular channel.

According to one or more embodiments herein, such a reduction of receive power at the unintended receiver may be based on reducing the transmit power of the transmitter, that is, attempting to transmit at less than the nominal power on a given channel. To accomplish this, the terminal 410 may first calculate a reduced transmission power that would not cause any interference with the incumbent receiver (e.g., PtPR) 310. The terminal 410 may then calculate the link budget with this reduced transmission power towards the intended receiver (e.g., satellite) 420. If the link budget, using the reduced power, is greater than the sensitivity of the intended receiver (while still not interfering with the unintended incumbent receiver), the terminal 410 is then allowed (e.g., granted the permission) to use the given channel at a reduced power. Alternatively, and as described in greater detail below, the device may compare the amount of power it is over the noise floor of the unintended receiver, Delta PU, against the amount of power it is over the sensitivity of the intended receiver, Delta PI. If Delta PI is greater than Delta PU, then the receiver may reduce its transmission power by Delta PU as to reduce the received power at the unintended receiver below the required threshold while maintaining adequate power level (above receiver sensitivity) at the intended receiver.

Note that in one or more additional embodiments herein, the transmit power from the terminal 410 may also be selected for other reasons, such as based on an ability to transmit at reduced power while still meeting the link budget at the intended receiver 420, e.g., to save/extend battery life. That is, the transmission power may be based on the link budget calculations described above ahead of the transmission (or else based on a measure of receive power at the intended receiver, i.e., a feedback-based control). Further, such reduced transmit power may be in the form of a non-linear duration representation to save on transmission bandwidth.

As an alternative to explicit transmission power reduction, other measures may be taken to reduce the receive power at the unintended receiver, such as changing the azimuth, elevation, and/or elevation angle of the transmitter. In particular, by varying the physical orientation or placement of the terminal's transmitting antenna 660, such modifications may have the effect of improving the link budget calculation to the unintended incumbent receivers. This concept was described generally above with reference to satellite diversity (FIGS. 24A-24B above), where changing the angle away from an incumbent receiver from one satellite to another could create a situation where a transmission would be allowed. Here, however, the concept is the same, but rather than switching, for example, from the western satellite to the eastern satellite, imagine now that the terminal (or user holding the terminal) is instructed to aim the terminal's satellite 660 in a position that is even further east (e.g., up to 20 degrees beyond the illustrative 142-degree azimuth, say 122 degrees), e.g., for the duration of the communication session or only for the duration that the device is transmitting. In this manner, though the receive power at the intended receiver (e.g., the eastern satellite) may be reduced by the off-center aim, the receive power at the unintended incumbent receiver may be reduced to a level that no longer interferes (e.g., based on additional link budget calculations according to the updated transmitter orientation). As such, the techniques herein provide various physical orientation provisions (e.g., instructions, control of automated actuators, etc.) to re-orient the transmitter in a manner that reduces the receive power at the unintended receiver. Some illustrative examples of such re-orientation may include, among others: a higher elevation angle; further away from the unintended receiver; at an azimuth away from the unintended receiver (and possibly away from the intended receiver as well); at an azimuth slightly different than towards the intended receiver (and away from the direction towards the unintended receiver); at a rolled pitch (e.g., sideways) in order to reduce the received power at the unintended receiver by misaligning the polarization of the transmitted signal with the unintended receiver; moved to a higher elevation (e.g., climbing a hill, elevating a drone); or possibly even to a lower elevation (e.g., removing the terminal from the line-of-sight of the unintended receiver); and so on.

Other options for reducing the interfering receive power may be available, and any combination of the above options may be suitable as well. It should also be noted that in any of the above cases, the system (e.g., terminal and/or server) verifies that the reduction of link budget towards the unintended receiver (e.g., PtPR) 310 maintains sufficient link budget from the terminal 410 towards the intended receiver (e.g., satellite) 420. In addition, transmissions (e.g., packets) sent at a reduced power (or alternate orientation) may be marked accordingly to make the ground station aware that a reduced power (or orientation) is used from a protected area from which transmission with nominal power (at an expected orientation) is prohibited. Furthermore, it is important to note that certain of these above actions may also affect the link budget in the direction from the intended receiver (e.g., satellite) as a transmitter back towards the terminal 410 as the receiver (i.e., the downlink direction), and care and instruction should also be taken to remain within the proper reception conditions for the intended communication in both directions (if necessary).

Notably, should the intersection of protection zones in any given area be covered on each channel/frequency for which the terminal 410 is configured to transmit, or, more specifically, if the link budget calculations at the terminal confirm that any possible communication configuration (channel, power, direction, etc.) would interfere with at least one incumbent receiver, then such an area is a protected or "blocked" area, and no transmission would be allowed. Said differently, a protected/blocked area is a geographical area in which none of the selected transponder frequencies can be used to transmit from the terminal 410 to its intended receiver (e.g., the satellite 420). That is, a transponder frequency can only be used if the transponder lies outside of the interference levels (e.g., protection zones/link budget) of all receivers whose frequency range overlaps the transponders' frequency range, and a terminal is determined to be within a protected or blocked area if it is in the protection zone of at least one receiver 310 (e.g., PtPR) for each of the available transponder frequencies. (Notably, with the illustrative example communications systems and frequencies as mentioned below, such areas are considered to correspond to less than 0.001% of the United States' geographical area.)

According to one or more embodiments of the present disclosure, the techniques described herein may be based on a centralized model, a localized model, or some other model in between. For instance, according to an illustrative centralized model of operation, a local terminal 410 may provide its location information to a centralized system (server 450) on a first cleared channel (e.g., a hailing channel that is computed to not interfere, or that is known to never interfere), illustratively via the satellite link 420, and the centralized system performs computations and reports back to the mobile transmitter a set of one or more potentially interfering channels (e.g., communication channels) on which the transmitter (terminal 410) is allowed to transmit from that particular location (i.e., that do not interfere). In localized embodiments, information about the local incumbent wireless communication system 300 may be loaded in the terminal 410 from the server 450 (e.g., when connected over a higher speed network), and the terminal may perform the computations and determine, for itself, acceptability of transmitting on potentially interfering channels. Even in such localized embodiments, periodic updates and permission-based confirmation/validation may be required before the terminal is allowed to transmit. That is, a permission-based operation can be used to shut down terminal communication if necessary. (Note also that in the preferred embodiment, no earth terminal will transmit until it synchronizes with the spread spectrum signal that a satellite transmits. That is, the satellites 420 may be configured to send out a regular, repeating broadcast on a non-interfering downlink channel (e.g., 3702.5 MHz or other pre-arranged frequency bands). This broadcast may, among other things, provide frequency and timing symbols to decode the direct sequence spread spectrum signal for forward path communications, as well as indicating database updates/versions in order to allow a terminal to determine whether its local database is up-to-date before transmitting.)

In order to effectuate the centralized and/or local (permission-based) modes mentioned above, the techniques herein may provide for one or more "hailing" frequency bands/channels, which as described below, are generally consistent in configuration (few updates), and have minimal regions of potential interference (sparsely assigned).

In particular, using the illustrative embodiment as an example, satellite transponder channels may be defined by a center frequency, a width, and polarity. Each satellite may have any number of the same or different transponder frequencies that one can communicate with. As noted above, some of these transponder frequencies may lie in areas of the C-band spectrum where the FCC will likely allocate very few (if any at all) frequencies to be used by PtPRs in the future, and the rest may lie in frequencies where any number of changes may occur on a daily basis. The techniques herein propose to assign these specific channels that have the perceived minimal potential for additions or changes as the hailing frequency channels (or hailing channels). It should be noted that while areas of the C-Band spectrum have been identified where it can be assumed that few, if any, changes will occur in the future, the techniques herein may also have the ability to use transponder channels in areas of the C-band spectrum where many changes may occur.

Currently, in the entire United States and its territories, of the 56,000 PtPRs in use, there are approximately 61 PtPRs whose frequency and width overlap the frequency range of 6168-6182 MHz, and approximately 18 PtPRs whose frequency and width overlap the frequency range 5925-5930 MHz (as opposed to an example of thousands of PtPRs whose frequency channel overlaps any arbitrary 8 MHz wide bandwidth channel in the 5930-6168 and 6182-6425 MHz range). Per FCC regulations, it is currently expected that the FCC will issue few new licenses to use these hailing channels on any new or old PtPRs. However, the existing PtPRs which utilize frequencies and widths that overlap the hailing channels are grandfathered in with permission to continue using these channels. Accordingly, these two frequency ranges, 5925-5930 MHz and 6168-6182 MHz, may be selected for use as the hailing frequencies/channels herein. (Note that in the 6168 to 6182 MHz spectrum, new allocations are currently limited to 3.75 MHz or less, which prevents the allocation of a single frequency at a location from consuming the entire 14 Mhz spectrum width.)

In one example implementation, the hailing channel has a bandwidth of 4 MHz (a half-width channel) but nothing restricts the hailing channel to 4 MHz. The 4-MHz bandwidth was selected because it fits within the 5925-5930 band, and similarly three total hailing frequency channels of 4 MHz can fit within the 6168-6182 band. The half-width 5927.5 frequency, at the center frequency of the 5925-5930 MHz segment of the C-band, may be illustratively chosen as the primary hailing channel because there are only 18 PtPRs in the United States on this frequency (between 5925.1 and 5930 MHz), which provides a very high coverage rate as a low-bandwidth, lightly-used channel. Of course, these 18 PtPRs must still be avoided when a terminal is in the Protection Zone of one of these specific receivers. As such, the terminals in this illustrative embodiment initially contain the records of all 18 Hailing Frequency PtPRs, which may be updated whenever they change.

Figure 25B:
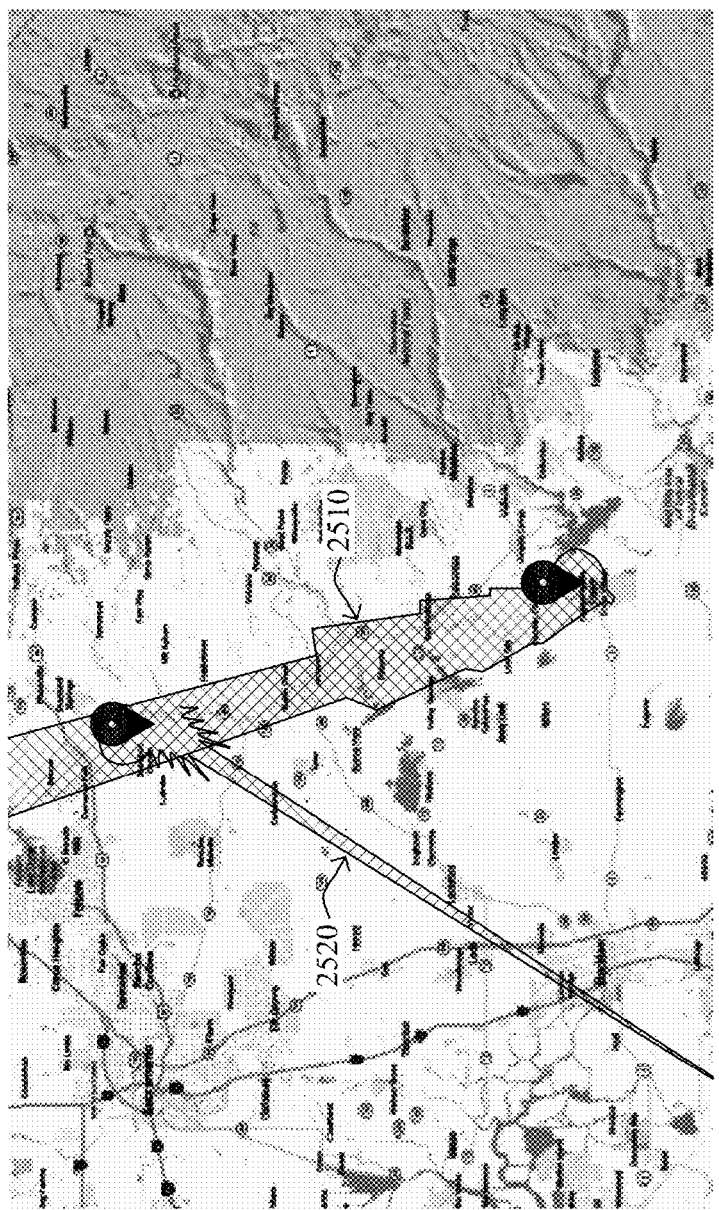
FIG. 25B illustrates an example of a difference between northerly facing and southerly facing protection zones.

FIG. 25A illustrates an example table 2500 of active point-to-point microwave links between 5925.01 MHz and 5930.0 MHz in the United States. Note that from the northern hemisphere to communicate with a geostationary satellite, a terminal must be pointed in a southerly direction to the equatorial plane, where the geostationary satellites reside. As can be seen from the table 2500, of these 18 links, only eight have receivers that point in a northerly direction. Thus, if the PtPR protection zone points south, the resultant protection zone(s) would be smaller than northerly facing PtPR protection zones. A simplified illustration of this is shown in FIG. 25B, with northerly facing zone 2510 being larger than southerly facing zone 2520.

Notably, in the illustrative example, each satellite has n full-width (8 MHz) channels. From initial analysis, using different channels on each satellite gives maximum coverage for the minimum number of channels—for instance, simply using 5934 MHz and 5998 MHz on Galaxy 12 and 5974 MHz and 6030 MHz on Galaxy 3C (in addition to the hailing frequency on both) yields 99.999% coverage of the US (including Hawaii and Alaska). Full analysis may be used to determine the optimum/minimum channel selection to produce the largest unblocked area overall, and the example frequencies and configurations herein are merely representative examples of generally large coverage areas. Note also that this assumes using only two satellites and only two channels per satellite (e.g., in addition to the illustrative 5927.5 MHz hailing frequency on each satellite), but more than two satellites and channels may be available and may be accounted for.

In general, given that the illustrative embodiments above for centralized and/or localized communication may use the hailing frequencies as an initial part of the communication with satellite (e.g., to confirm or determine the actual channel to use for the following transmission) for all terminals 410 in the network 400, techniques herein attempt to minimize the use of the hailing frequencies, such as for only the initial signaling as mentioned above (e.g., permission, channel selection for the primary transmission, and so on). In one or more particular embodiments, however, the hailing frequency bands/channels may be made available with limited use for terminals that are blocked from transmitting on the other (non-hailing) channels, such as due to the proximity to a PtPR with an overlapping frequency. In this regard, the techniques herein may allow for certain communication capability on hailing channel, such as in response to a terminal that can communicate with a satellite only via a hailing channel. In such an instance, with no other option, the terminal may be configured to either use the hailing channel as the selected channel, or may use the hailing channel for a limited amount of data (or bandwidth, e.g., data/time), such as by limiting the length of messages sent. Preferably, in one embodiment, the terminal 410 may only use the hailing frequency for its communication based on first receiving server permission, or else once a user has acknowledged that it is an emergency condition (e.g., to limit over-use of the channel simply because no conventional channels are available at the current location). (Note that in certain embodiments, in such a situation, the terminal may provide or be provided with navigational guidance to move the terminal to a place where additional communication channels may be available.)

Note that there may be circumstances where, within a given region, PtPR protection zones may change and intersect all return path channel frequencies (e.g., if the hailing channel(s) have changed for the current zone), such that transmission from that zone is effectively blocked, unless a wireless update can be received since the terminal will have no available return path frequencies to transmit on. To avoid the terminal from being "locked out" by this occurrence, a pushed-update mechanism may be provided to broadcast, e.g., from the satellite 420 to terminals 410, any channel changes that have recently occurred (e.g., in the last 21 days) to the hailing channels. (Note again that in the example implementation, the downlink channels, e.g., 3702.5 MHz, are not channels that would interfere within the incumbent PtP system 300, and thus the terminals can freely listen on these channels for updates.) This allows a terminal to determine the availability of an available hailing channel for the terminal's current zone, so that an incremental database update can be requested to allow re-evaluating the overall (and up-to-date) channel availability from a current location. This update may be broadcast on a separate downlink channel by each satellite, but may contain information for the available hailing channels for each of the satellites. Note that while this does not guarantee that transmission will be allowed from the current location (if there is a local intersection with all hailing channels), it does allow update of the PtPRs whose frequencies intersect the hailing channels, which then allows the terminal to transmit once it is moved outside of the local hailing channel intersecting PtPR's protection zone.

Advantageously, the techniques herein provide for avoidance of interference in wireless communications. In particular, the techniques herein enable a mobile communication device (e.g., terminal 410) to know whether or not it is permissible to transmit in a particular location and, if so, on what particular frequency (channel/band) and in what particular direction, so as to reduce or eliminate any interference on other communication devices and networks. Additionally, the techniques herein assist in determining suitable placement and orientation of terminals for a potentially interfering wireless communication system in the presence of an existing wireless communication system.

In one specific embodiment, the techniques herein allow (and/or add value to) the introduction of a new, ubiquitous service with consumer- and IoT-based applications via satellite (e.g., messaging via satellite), and make more intensive and efficient use of C-band spectrum through a non-interfering sharing regime. The proposed system will protect other C-band operations from harmful interference—for example, by using a database-driven, permission-based authorization regime to ensure no operations cause harmful interference to C-band terrestrial fixed service ("FS") point-to-point ("PtP") operations.

Notably, other advantages and additional implementation (use-case) embodiments of techniques described above may be readily apparent to those skilled in the art, and those specifically mentioned herein are not meant to limiting to the scope of the present disclosure.

—Server Participation in Avoiding Interference in Wireless Communications—

In furtherance of the techniques described above, the following discussion specifically addresses and expands the mode of operation where a server (e.g., on a satellite, an intended receiver, a satellite ground-station, or a separate server) participates in ensuring that communication from the terminal does not interfere with any unintended receiver (e.g., PtPRs, other satellites, and so on).

In particular, as described above, the illustrative terminal is able to make decisions based on pre-loaded information from a server, such as protection zones or otherwise, to select communication parameters it believes do not interfere with any unintended receiver. The terminal may thus transmit to the intended receiver (e.g., selected satellite) based on its location-based calculations, and may include the location information and communication parameters (e.g., frequency, power, azimuth, tilt, etc.) within the communication. As such, according to the preferred embodiments herein as described in greater detail below, upon receiving the information and the associated communication parameters, the server (e.g., ground station) may perform its own calculations which may result in taking an action such as, e.g., no action (implied approval), approving continued transmission with the same parameters, suggesting different parameters for continued transmission, instructing the terminal to cease transmission altogether, and so on. Such instructions to the terminal (e.g., sent on the return channel via the intended receiver/satellite) would thus cause the terminal to transmit only according to acceptable communication parameters, if at all.

Operationally, according to one or more embodiments herein, either as an initial communication of a session or else as a subsequent communication of the session (e.g., during a longer transmission), the ground station and/or server (e.g., 430, 440, and/or 440) may receive one or more wireless transmissions (e.g., packets) 405 from a terminal 410 via an intended receiver (e.g., satellite) 420, as described above. This transmission may illustratively include an indication of the location (e.g., GPS coordinates) from which the terminal is transmitting, as well as one or more communication parameters (e.g., frequency/channel, satellite, polarization, elevation, azimuth, transmit power, and so on).

In one embodiment, the ground station server may assume that the terminal is transmitting at nominal power, aiming the device at the direction (azimuth) of the intended satellite, using the tilt as to comply with the polarity of the receiver, and on the frequency received by the intended receiver (e.g., satellite). The least information that must be transmitted from the terminal is the location information, from which all other calculations may be made by the server. That is, as described above, the server (ground station, etc.) is generally technically capable of computing everything necessary (link-budget, line-of-sight, and so on) to ensure that a terminal's transmission will not interfere with incumbent unintentional receivers, but will not know the location from which the terminal is going to transmit.

In another embodiment herein, further information may be included within the terminal's transmission 405 to the intended receiver, in addition to the location. In particular, in one embodiment, an identification of the terminal may be transmitted, such as a manufacturer type, a unique identification of the terminal (which may be used to identify the type), or other usefully identifying information may be included, such that the server may determine more information with which to complete the additional server-based computations. For instance, if such information is included, transmission attributes, such as nominal transmit power, antenna pattern, and other antenna characterizations (e.g., polarity, size, shape, etc.) may be determined by the server. In the event such information is not available, a worst-case scenario computation may be used (e.g., the "loudest" or "noisiest" or otherwise most potentially interfering transmission characteristic for all known terminals).

In still another embodiment, the terminal's transmission power, as well as other transmission and/or reception power characteristics that would affect the potential for interference (and intended reception), may be included in the transmission as well. For instance, if a transmitter is transmitting at a reduced power, an alternative transmission orientation (e.g., azimuth, elevation, polarity, etc.), and so on, this information may also be used for the more detailed server-based computations herein. (This particular concept is described in greater detail below.)

Generally, in the preferred embodiment, the terminal has already calculated acceptable communication parameters for this transmission, as described above. However, in certain embodiments, it may be important to confirm the computation, or else to expand the computation, based on information or computation capability not available to the terminal. For instance, as described above, the protection zones may be simplified into larger regions, link-budget calculations may be too intense for mobile terminals, terminals may not have topology information, FCC databases may have been updated, software of the terminal may experience an error or be outdated, and so on. As such, the techniques herein provide various server participation techniques to monitor and control the terminal's operation to ensure prevention of interference with unintended receivers. Accordingly, as described below, the "server" (ground station 430 or server 440/450) may be configured to "double check" and verify that the terminal would not interfere with any unintended receivers (or cause congestion) from its current location, potentially requesting that the terminal change its communication parameters, suggesting better options which are not exposed to the terminal based on its limited stored data or limited processing power, or else to cease transmission completely.

According to one or more embodiments herein, the server (intended receiver, satellite, ground station, gateway, router, server, associated cloud computing resources, etc.) may perform its local computation (or else may look up pre-computed information using the location and any other relevant information for reference) as described above. In this manner, the server may determine acceptable communication parameters for the terminal to communicate such that the communication would not interfere with an unintended receiver (e.g., and still be receivable by the intended receiver). For instance, as described above, the server may determine acceptable frequencies/channels that do not interfere with any incumbent unintended receiver based on link-budget calculations, terrain/line-of-sight considerations, and other factors as mentioned above. Additionally, the server may suggest alternate parameters such as transmission power, direction (e.g., azimuth), etc. that would improve upon the performance of the overall system.

Specifically, from this server-based computation, a number of actions may then take place according to various embodiments herein, based on the outcome of the computations (and configuration of the system, i.e., a desired response to various situations). As mentioned briefly above, such actions may consist of implied acceptance (e.g., no action/response), explicit permission/approval, shut-down of communication from the terminal, or guidance to make a change in any number of communication parameters.

Regarding permission/approval, a validation (double-check) of communication parameters selected by the terminal may assist in both reducing storage and computation complexity for use on a terminal, and also ensures that no interference occurs in sensitive incumbent networks (e.g., PtP networks). For instance, if the terminal's initial wireless communication has the potential for already interfering with an unintended receiver, the server can promptly suspend any terminal operations by turning off further communications, either generally (all transmissions, including synchronization broadcasts or other "background" communication), or else on only the interfering communication parameters (e.g., on the particular frequency band). Note that such "cease transmission" orders may also be sent by the server, for example, if there were a notification by another licensee of harmful interference or a notification from the FCC (i.e., before another potentially interfering transmission by the terminal).

On the other hand, should the terminal be transmitting using acceptable communication parameters, or is otherwise proposing to use acceptable communication parameters (described below), then the server may reply with an approval acknowledgment message indicating that the terminal is actually permitted to transmit on the given channel from its current location. As an alternative, the server may also return one or more usable (non-interfering) frequencies, as well as other acceptable communication parameters in certain embodiments herein. In accordance with yet another embodiment, when the terminal transmits on one out of numerous acceptable frequency channels, the server may calculate and compare the level of interference caused by this (acceptable) transmission against the interference that may be caused by transmission using the other set of acceptable parameters and if indicated, request that the terminal use the preferred set of parameters for future transmissions.

This "return-path validation" is thus a process where the server validates that for a given terminal location, a given return-path frequency for a given satellite is valid for the satellite it was transmitted to. The idea behind this concept is thus that when the terminal chooses a return-path frequency and satellite to transmit to after checking its current local PtPR database, the server will validate the frequency/satellite chosen for operation from the specific GPS location of the terminal and, if that frequency is not considered viable for that specific location, the server can respond back to the terminal with a command to cease communication, or else with a usable list of return-path frequency/satellite pairs for the terminal's current location. This process is a fail-safe check to keep the terminal from errantly interfering with an unintended receiver. (Note that this should not normally happen if the terminal has correctly processed up-to-date unintended receiver information (e.g., protection zones).) In accordance with yet another embodiment, the server may provide a list of preferred parameters (other than the frequency channel) to be used by the terminal. These parameters may include but are not limited to transmission direction, transmission power, etc.

Notably, in one embodiment herein, the terminal may be configured to first communicate on a hailing frequency, as described above. For example, hailing frequencies may be used to request permission to use terminal-selected communication parameters, to request server-selected communication parameters, or else as a last-resort option if the terminal does not know of any other available frequencies. In such instances, when the server detects that a terminal is using the hailing frequency, then the server may provide either permission, denial, or a suggested set of communication parameters for continued communication from the terminal.

When the server determines acceptable communication parameters that are either different from those used or proposed by the terminal, or else where the terminal does not suggest any, the techniques herein thus allow the server to suggest (or even require) that the terminal use a selected set of communication parameters that prevent interference with unintended receivers. For example, the server may determine one or more frequencies for the terminal to use, and may send instructions to the terminal that those one or more frequencies are to be used. Other parameters, such as transmission power, terminal orientation, location, alternate receivers/satellites, and so on may also be included in the instruction message(s) to the terminal, accordingly. Note again that such instructions may take place either at the beginning of a transmission sequence or at any phase during the communication. (Note also that suggesting a different intended receiver/satellite may also require aiming the terminal at the newly instructed receiver/satellite; that is, while the switching between various frequency channels may occur either with or without a user's participation, switching between satellites in a user-controlled terminal may require notification to the terminal's user and action by the user.)

When there are a plurality of communication parameter options (e.g., multiple available frequencies), the server may be configured to choose from the options through various measures, such as, e.g., selecting a particular one of a plurality of available (and acceptable) configurations, selecting communication parameters that provide the least link budget towards all of the unintended receivers (e.g., PtPRs), selecting a random set of communication parameters from a collection of available parameters, selecting least used frequency channel, and so on.

As mentioned above, any number of reasons may cause the server to suggest or require communication parameters for the terminal to use, such as requests to do so, greater server ability for link-budget computations, other knowledge of the server not available to the terminal (e.g., detecting that the terminal is in a geographic location which is in a shadow of a hill, unbeknownst to the terminal), and so on. Note that in one embodiment, when multiple acceptable communication parameters are available for terminals, a distributed assignment of parameters may be used to reduce congestion. For instance, instructions from the server may comprise one or more decongestion-based instructions, such as, for example, either to distribute use generally, or else in response to the server detecting that there are too many terminals using a specific frequency channel of a given satellite, thus instructing specific terminals to move to another channel in order to alleviate the load/congestion on an over-used channel.

In addition to commands (permission, prevention, or changes), the techniques herein also allow for the server to provide updates to the terminals through the instruction messages. For instance, as part of the instruction messages, the server may decide to send a PtP information update patch. That is, since the server may know what information (e.g., database version) the terminal contains, it may send new patches which extend the range and direction of the area in which the terminal is located (particularly when on the move). In addition, if any changes must be made to the terminal's database because of FCC ULS database changes (e.g., additions or modifications particularly, with deletions being less critical), the server may inform the terminal to make those changes first.

According to one or more embodiments herein, any of the commands or other instruction messages from the server to the terminal may be associated with one or more security measures to ensure that the commands/instructions are from a valid server. For example, in one embodiment, the instructions may be signed by the server with digital signature. Therefore, the terminals may be configured to verify the validity of any messages and/or the identity of the server before it operates according to the commands or instructions.

Figure 26:
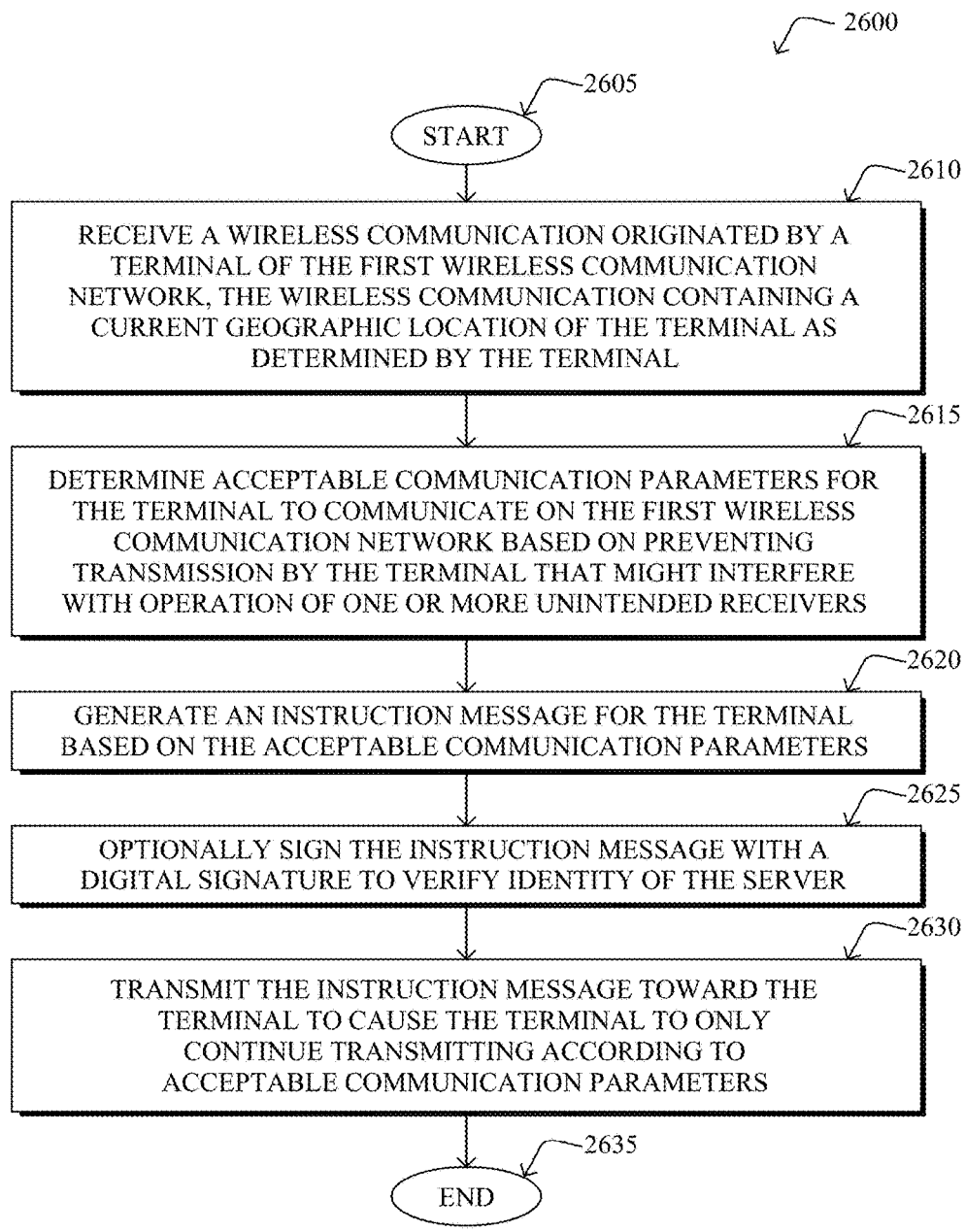
FIG. 26 illustrates another example procedure for avoidance of interference in wireless communications.

FIG. 26 illustrates an example procedure for server participation in avoidance of interference in wireless communications in accordance with one or more embodiments described herein. For example, one or more non-generic, specifically configured devices (e.g., server 500) may perform procedure 2600 by executing stored instructions. As shown in FIG. 26, the procedure 2600 may start at step 2605, and continues to step 2610, where, as described in greater detail above, the server of a first wireless communication network receives a wireless communication originated by a terminal of the first wireless communication network, either as an initial communication of a communication session or a subsequent communication of the communication session. As detailed above, the wireless communication contains at least a current geographic location of the terminal as determined by the terminal, and may contain other information (ID, type, current communication parameters, etc.). Note that without being otherwise indicated by the terminal, the server may assume that the terminal is using nominal transmission power.

In general, as described above, the terminal originates the wireless communication according to a terminal-made decision based on pre-loaded information from the server (e.g., protection zones). According to the techniques herein, therefore, in step 2615, the server may then determine acceptable communication parameters for the terminal to communicate on the first wireless communication network, e.g., based on preventing transmission by the terminal that might interfere with operation of one or more unintended receivers. As mentioned above, determining the acceptable communication parameters may be for verification, or may be based on additional information at the server not pre-loaded onto the terminal, such as topology information, line-of-sight calculations, link-budget computation values, a number of terminals communicating on particular communication parameters, and so on. The acceptable communication parameters, described in detail above, may comprise one or more frequencies that will not interfere with operation of the one or more unintended receivers, a particular satellite of the first communication network (requiring that the terminal aim at the particular satellite), or any other number of parameters.

In step 2620, the server may generate an instruction message for the terminal based on the acceptable communication parameters. For instance, according to the illustrative embodiments described above, the instruction message may be any one of the following: an approval for the terminal to use current communication parameters when they are acceptable communication parameters; instructions for the terminal to cease using current communication parameters when they are not acceptable communication parameters; and instructions for the terminal to change to the acceptable communication parameters for continued transmitting. Additionally, the instruction message may also (or alternatively) comprise one or more decongestion-based instructions, such as an unbinding parametrized request to terminals using the particular communication parameters to change to alternate communication parameters.

Note that as also described above, the server may select particular acceptable communication parameters from a plurality of acceptable communication parameters for the instruction message. For instance, selections may be based on acceptable communication parameters having a best link-budget value, randomly selected acceptable communication parameters, selected acceptable communication parameters for congestion reduction amongst a plurality of terminals, and so on.

Optionally, in step 2625, the server may sign the instruction message with a digital signature to verify identity of the server.

In step 2630, the server may then transmit the instruction message toward the terminal (e.g., via the satellite or other intended receiver if the server is not directly in communication with the terminal) to cause the terminal to only continue transmitting according to acceptable communication parameters.

The simplified procedure 2600 may then end in step 2635, illustratively until receiving a further communication from a terminal.

Figure 27:
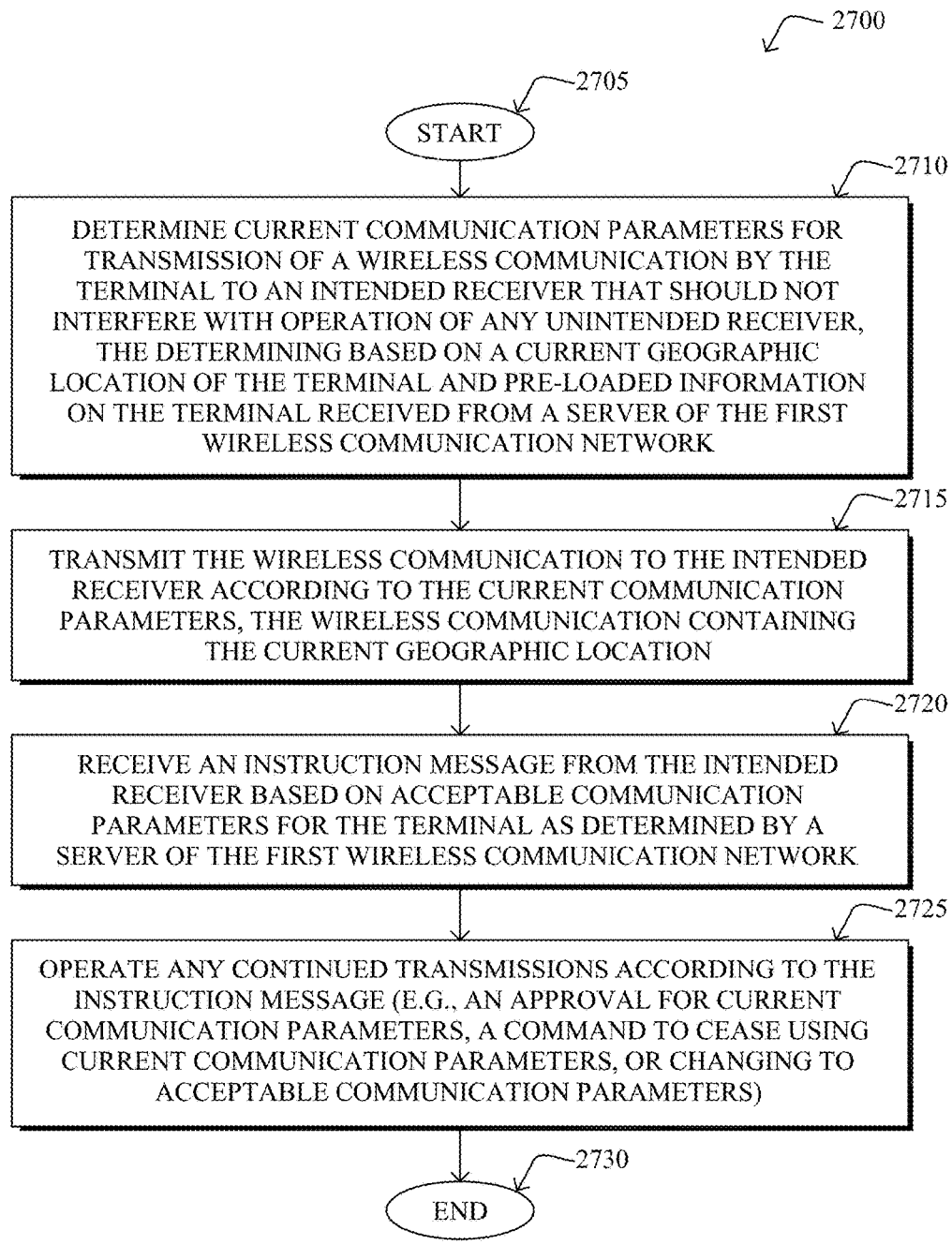
FIG. 27 illustrates still another example procedure for avoidance of interference in wireless communications, particularly with regard to local assessment of interference according to link budget calculations.

Additionally, FIG. 27 illustrates still another example procedure for server participation in avoidance of interference in wireless communications, particularly with regard to the terminal's perspective in accordance with one or more embodiments described herein. Again, one or more non-generic, specifically configured devices (e.g., terminal 600) may perform procedure 2700 by executing stored instructions. As shown in FIG. 27, the procedure 2700 may start at step 2705, and continues to step 2710 where, as described in greater detail above, a terminal of a first wireless communication network determines current communication parameters for transmission of a wireless communication by the terminal to an intended receiver that should not interfere with operation of any unintended receiver. As detailed above, the determining is based on a current geographic location of the terminal and pre-loaded information on the terminal received from a server of the first wireless communication network (e.g., protection zones).

In step 2715, the terminal transmits the wireless communication to the intended receiver/satellite according to (i.e., using) the current communication parameters, where the wireless communication contains the current geographic location (and optionally other information, as mentioned above).

Then, in step 2720, the terminal may receive, in response to the wireless communication, an instruction message from the intended receiver (e.g., originated by the server) based on acceptable communication parameters for the terminal (as determined by the server). As mentioned above, the instruction message may be an approval for the terminal to use the current communication parameters when they are acceptable communication parameters, instructions for the terminal to cease using current communication parameters when they are not acceptable communication parameters, instructions for the terminal to change to the acceptable communication parameters for continued transmitting, or decongestion-based instructions.

Accordingly, in step 2725, the terminal operates any continued transmissions according to the instruction message.

The illustrative and simplified procedure 2700 may then end in step 2730, notably with future communications invoking a restart of the procedure, accordingly.

It should be noted that while certain steps within procedures 2600 and 2700 may be optional as described above, the steps shown in FIGS. 26-27 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

—Reduced Power for Avoiding Interference in Wireless Communications—

As mentioned above, there are numerous ways in which the technology described herein can avoid interference in wireless communications, with the illustrative example being given for selecting certain communication parameters, particularly frequency, in a manner that prevents interfering with the operation of an unintended receiver (e.g., using a different/available frequency). The discussion that follows advances this concept by expanding on the ability to adjust communication parameters in a way that can reduce the received signal power at an unintended receiver. That is, reducing received signal power at an unintended receiver, while still maintaining proper signal level at the intended receiver, can be an effective mechanism for use with avoiding interference in wireless communications, as described herein.

For example, in the case where there is no frequency/channel available to a terminal that would not interfere with some unintended receiver, the above description generally details the corresponding prevention of transmission by the terminal. However, according to one or more embodiments of the techniques herein, if a potentially interfering transmission is perhaps only slightly over a link budget (e.g., a link budget threshold) for the unintended receiver, the possibility of reducing the received power at the unintended receiver (e.g., PtPR), while ensuring that the reduced power still satisfies the sensitivity of the intended receiver (e.g., satellite, or more particularly, at the associated ground station), may be explored as a viable option. Said differently, the techniques herein may determine to adjust certain communication parameters (e.g., reduced transmission power below nominal/full power, or other parameters, such as simply re-aiming the terminal's antenna) in response to the link budget being over some link budget threshold (e.g., noise floor, receiver sensitivity, etc.) in order to correspondingly reduce the link budget below such a link budget threshold in order to prevent interference at the unintended receiver (as opposed to using interfering communication parameters that may have otherwise prevented transmission).

Operationally, in one embodiment the techniques herein first determine a link budget from a terminal 410 in the first communication network 400 to an unintended receiver for a transmission 405 from the terminal to an intended receiver in the first wireless communication network. The computation of link budget may be based on the transmission being configured with some "initial" communication parameters (e.g., a nominal transmission power, conventional aim, and so on). This link budget computation may then be used to determine if the initial communication parameters are acceptable (non-interfering), or if an adjustment may be made as described below to make them acceptable.

Note that the techniques herein may be performed by the terminal 410, or else by a server (e.g., on satellite 420, at ground-station/gateway 430, a router/server 440, or other server 450). For instance, a terminal may unilaterally compute the values and transmit according to terminal-determined communication parameters. Alternatively, a server may perform the computations and create an instruction message to direct the terminal to use server-determined communication parameters. Further, the techniques may also be performed in a cooperative manner, such as terminal computation and server validation, or terminal computation and initial transmission followed by server validation and suggested parameters modification by the server as to improve overall system performance, as also described above. Note also that the unintended receiver may illustratively be a PtPR, but may also be another satellite using the same frequencies, whether on the same satellite network as an intended receiver satellite (i.e., and the terminal), or a different satellite network.

According to one or more embodiments herein, the device (terminal or server) may determine whether one or more adjusted communication parameters would result in reducing a received power at the unintended receiver being below a link budget threshold, thus determining whether any adjustments to the communication transmission could be performed so as to not interfere with the unintended receiver (or for reduced power mode, as described below). To reduce the received power, any applicable communication parameter may be adjusted (changed from an initial or otherwise conventional or assumed default value). Such parameters may include one or more of the following: transmission power (e.g., gain), transmission polarity, an aimed direction of the terminal (e.g., the terminal's antenna), an azimuth and/or elevation, and even location and/or height above sea level, or others, individually or in any combination.

Figure 28A:
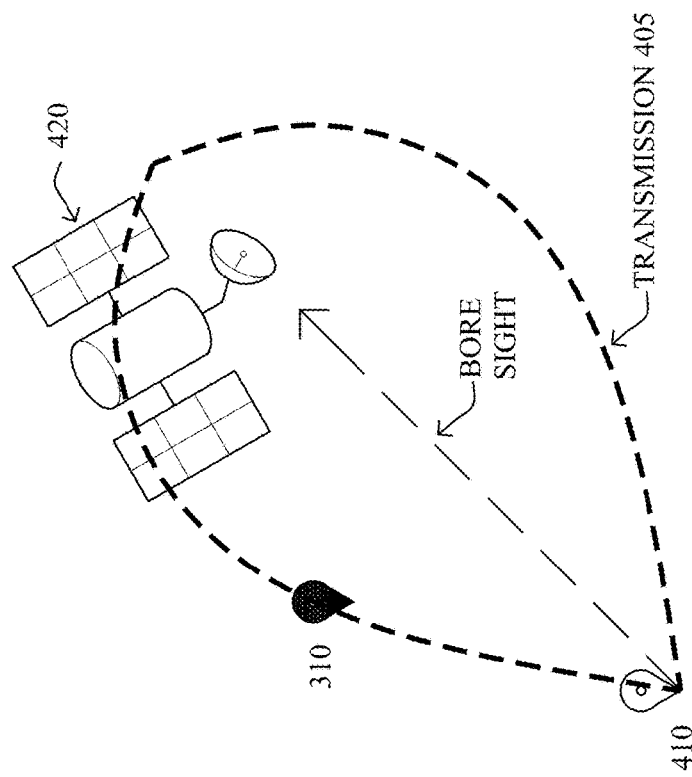
FIGS. 28A-28B illustrate an example of antenna redirection for reduced power for avoidance of interference in wireless communication.
Figure 28B:
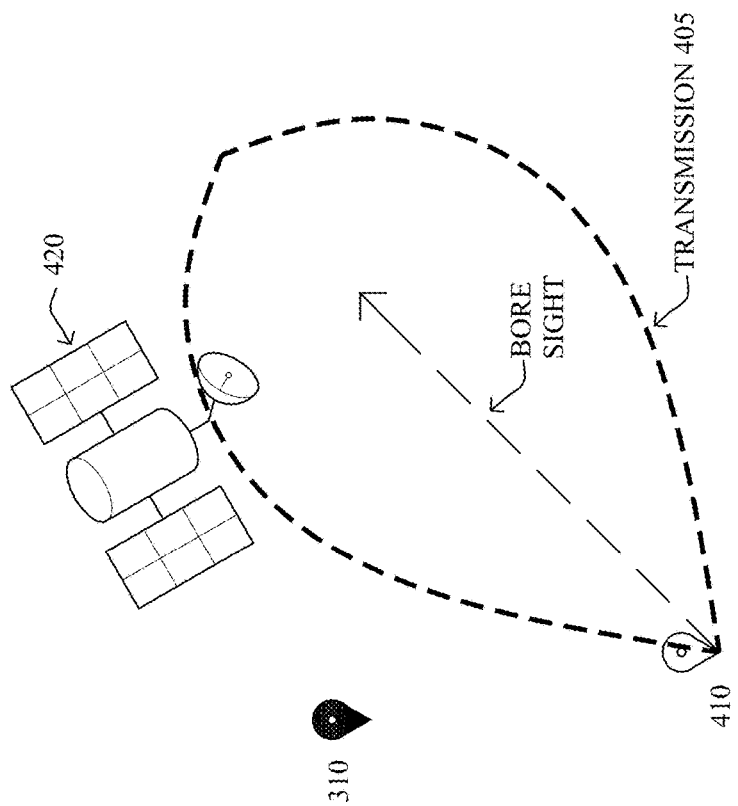

For example, though simply reducing the transmission power is a direct and readily understandable concept for correspondingly reducing the receive power (at both the unintended and intended receiver), FIGS. 28A-28B illustrate a simplified example of how merely tilting the terminal to aim to the side of an intended receiver could beneficially affect the receive power at the unintended receiver. For instance, as shown in FIG. 28A, assume that a terminal 410 is attempting to communicate a transmission 405 with an intended receiver, such as a satellite 420 or a ground station 430 via a satellite 420. However, as discussed at length above, the transmission 405, when aimed at the intended receiver, may adversely be received by an unintended receiver, such as a PtPR 310, such that the link budget is above an unacceptable threshold level (i.e., interfering). However, by adjusting the aim of the terminal 410, as shown in FIG. 28B, off-axis from directly at the intended receiver (satellite 420), the transmission 405 may now result in a lower receive power at the unintended receiver. In accordance with a specific embodiment, the user may be instructed to move/aim the antenna of the transmitter in accordance with the direction indicated in FIG. 28B during transmission time and then, immediately when the transmission ends, the user may be instructed to move/aim the antenna of the transmitter back at the direction indicated in FIG. 28A as to improve the receiver gain.

Though the two-dimensional drawing vastly over-simplifies the actual link budget calculations (e.g., according to receiver acceptance cones, antenna lobes, transmission power-loss characteristics, and so on), the essence is the same: adjusting physical characteristics of the terminal can change the received power in addition to (or as an alternative to) reducing the actual transmission power. In greater detail, assume an example transmit antenna as a simple patch array that has a 3-dB power loss at +/−20 degrees on each side of the bore-sight, illustratively conforming to the off-axis EIRP mask prescribed by the FCC, as may be appreciated by those skilled in the art. The terminal may thus use a combination of spread spectrum and adjusted (e.g., off-axis) antenna pointing to stay below the unintended receiver's interference link budget level (e.g., the receiver sensitivity or noise floor). That is, by moving the terminal's bore-sight, peak power density can be reduced (e.g., from, say, 9 dBW to −24 dBW), such that the off-axis, bore-sight power density stays significantly below the transmit mask limits for the unintended receiver(s).

Notably, adjusting the receive power at an unintended receiver may generally also affect the receive power at the intended receiver. As such, the embodiments herein also ensure that any adjustment to the communication parameters still satisfy a receive sensitivity of the intended receiver. Specifically, according to the techniques herein, receive sensitivity at the intended receiver may be determined (or estimated) through calculation (e.g., link budget calculations, as described above), or else through explicit feedback indicating actual received power at the intended receiver (e.g., a received signal strength indication, or "RSSI"). (Note that the feedback may come directly from the intended receiver, e.g., satellite, or else may be transmitted through to the ground-station/server, for calculation by the ground-station/server or else for return to the terminal for calculation there.) Feedback may be useful, in general, where transmission does not already interfere, such as through the use of a hailing frequency first, or else for power-save mode, as described below.

To ensure that the receive power is satisfied at the intended receiver, the calculation, estimation, or feedback may then be compared to the link budget (e.g., receiver sensitivity, or more particularly, noise floor) of the intended receiver. Note that the techniques herein may determine an amount of adjustment necessary to reduce the receive power at the unintended receiver first, and then determine how those parameters affect the intended receiver. Alternatively, the reverse may be configured, where the minimum receiver power at the intended receiver is maintained at the intended receiver, and then calculations are performed using those parameters for the unintended receiver.

Figure 29A:
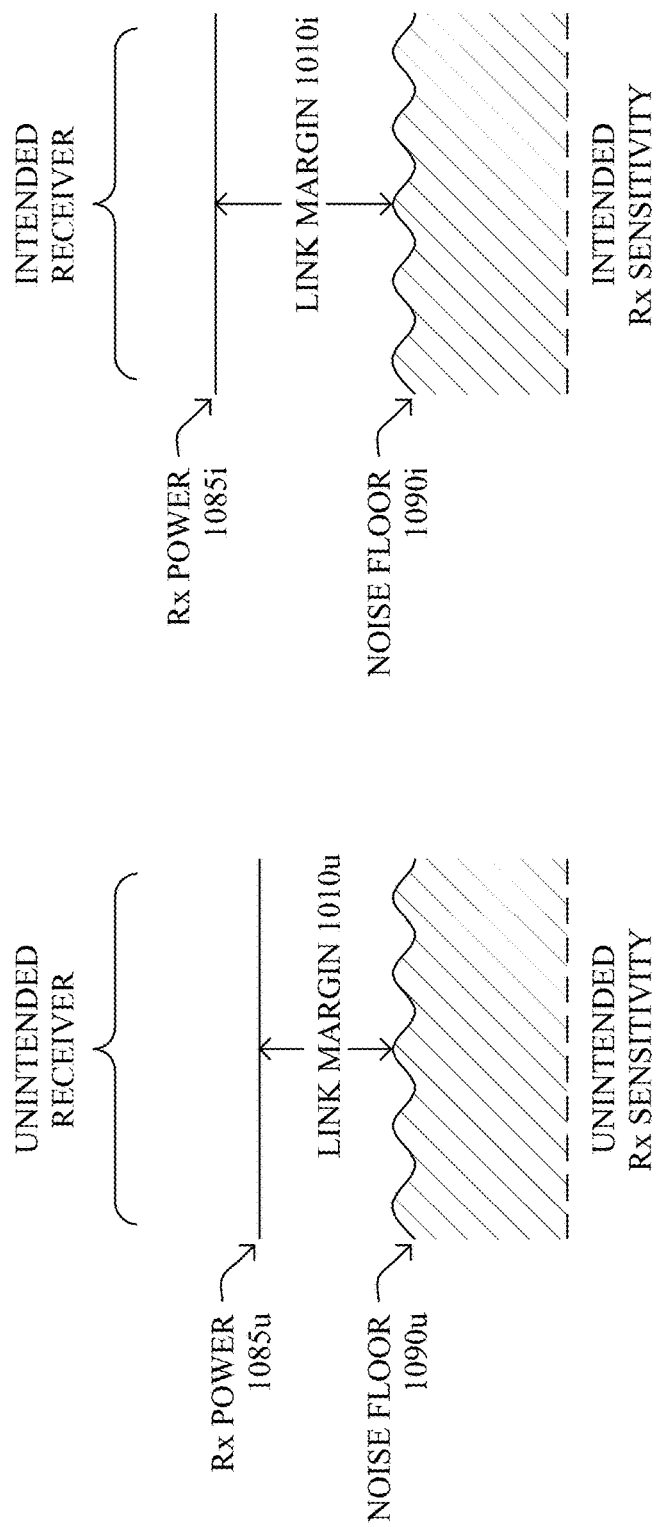
FIGS. 29A-29D illustrate examples of link budgets and receiver sensitivity with regard to reduced power for avoidance of interference in wireless communication.

Example effects of adjusting communication parameters on both the unintended receiver and intended receiver are illustratively shown in FIGS. 29A-29D. (Note that while each illustratively shows a decrease in received signal strength at both the unintended and intended receivers, there are changes to communication parameters that may result in an increase in one and a decrease in the other; the examples shown are merely for demonstration.) For instance, as shown in FIG. 29A, assume that a link margin for the unintended receiver (denoted "1010u") indicates that a transmission that is acceptable to the intended receiver (link margin denoted "1010i") would interfere with the unintended receiver. These communication parameters are thus unacceptable for transmission, as they would interfere with the operation of the unintended receiver.

Figure 29B:
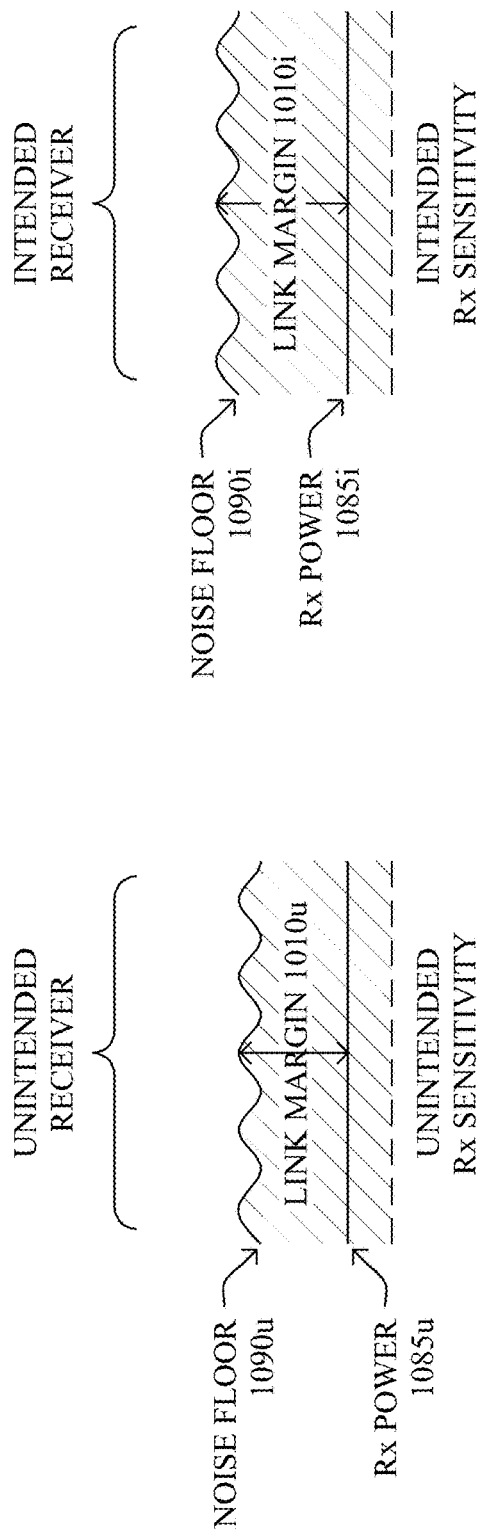

As shown in FIG. 29B, assume that a first adjustment to communication parameters is considered (e.g., reducing transmission power). Though the illustrative reduction in receive power 1085u at the unintended receiver is acceptable (would not interfere), the corresponding reduction in receive power 1085i at the intended receiver may be too great in this example, and as such, the adjusted communication parameters used to create these results would be unacceptable.

Figure 29C:
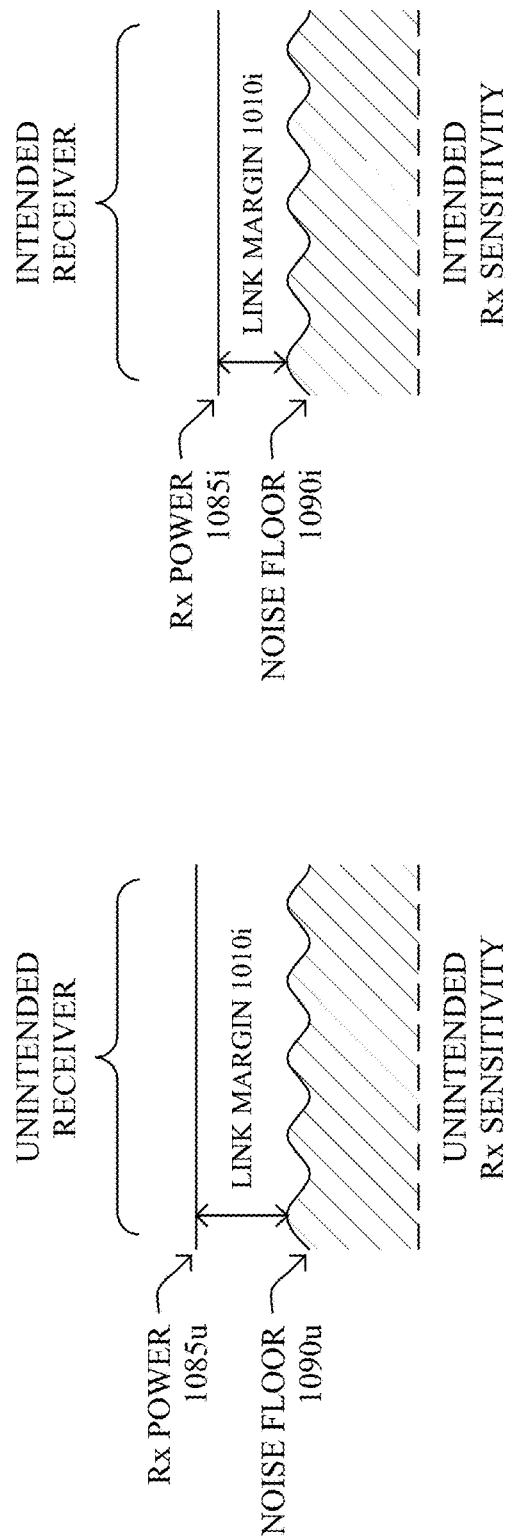

At the same time, assume that FIG. 29C illustrates another example result from a different set of adjusted communication parameters (e.g., aiming off-center from the intended receiver). In this example, perhaps the unintended receiver and intended receiver are too closely in-line with each other, close enough that in order to still maintain an acceptable receive power at the intended receiver, the terminal is still aimed in a manner that the unintended receiver would still be negatively affected (i.e., still interfering with the unintended receiver).

Figure 29D:
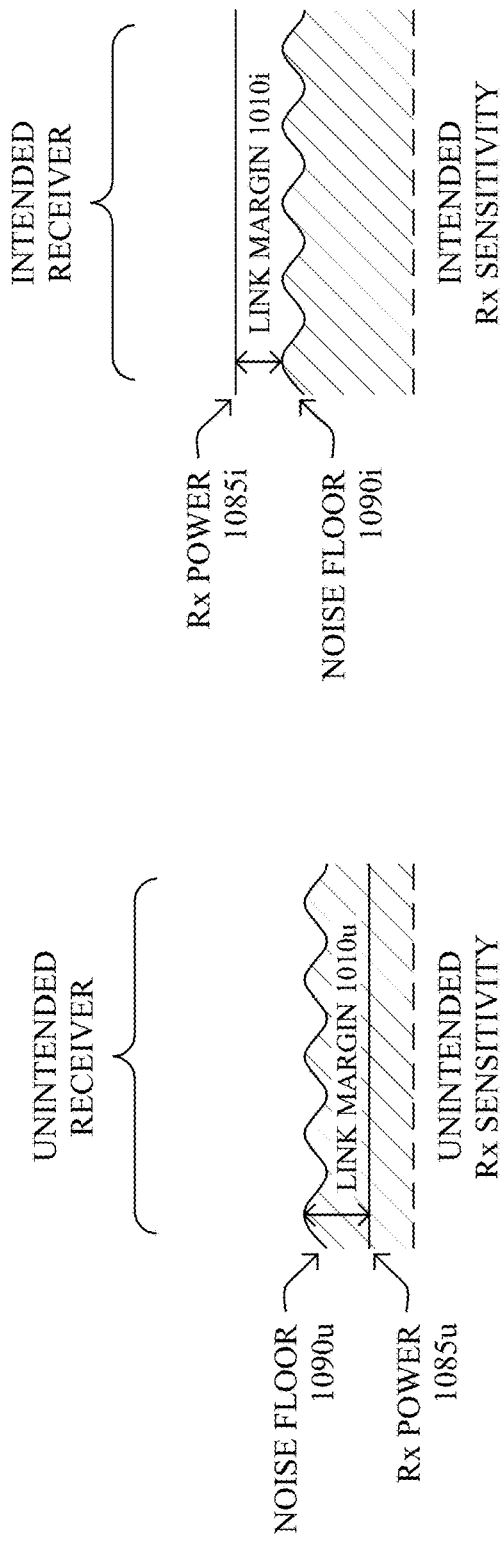

Conversely, in FIG. 29D, the right adjustment(s) to the communication parameters may have been found (e.g., changing the polarity of the transmission), where the adjusted communication parameter(s) result in reducing a received power at the unintended receiver being below a link budget threshold (e.g., noise floor 1090u), while still satisfying a receive sensitivity of the intended receiver (e.g., noise floor 1090i). (For example, the intended receiver may have dual-polarity, while the unintended receiver is designed for a singular polarity; thus the polarity change reduces the received power at the unintended receiver.) As such, the techniques herein for this example have found an acceptable adjustment in communication parameters.

Other considerations, such as location or elevation (e.g., affecting line-of-sight between the terminal and unintended receiver) may also be considered, and link budget calculations need not be performed in certain instances such as this (e.g., where it is known by the system that interference would no longer be an issue, while still being acceptably received at the intended receiver). Also, combinations of adjustments, such as off-axis aiming and reduced transmission power, may also be considered, accordingly, and those shown herein are merely an example for illustration. Also, while certain comparisons between intended receiver and unintended receiver received signal powers were made, any affects may result from adjusting the communication parameters, such as being further below receiver sensitivity (and not merely below the noise floor), or being more than minimally above the noise floor of the intended receiver while being slightly below the noise floor (or receiver sensitivity) of the unintended receiver, and so on.

According to the techniques herein, if an acceptable condition can be met, then the "device" may cause the terminal to transmit the communication using the adjusted communication parameters. As noted above, when the device is the terminal (self-computing the adjusted parameters), then "causing the terminal to transmit" comprises actually transmitting the communication as the terminal. On the other hand, when the device is a server "causing the terminal to transmit" comprises instructing the terminal to transmit the communication using the adjusted communication parameters, as described above (e.g., instruction messages to change communication parameters).

Notably, in the event the terminal self-computes the adjusted communication parameters, in embodiments that use the server participation (e.g., permission/validation), the techniques herein may account for this by marking the transmission (e.g., a field within a transmitted packet's header) as being transmitted at lower power or alternative communication parameters in order to ensure that the ground station server does not command it to stop transmission. That is, according to the techniques herein, the terminal may include an indication of the adjusted communication parameters within the transmission for server validation.

According to one or more embodiments herein, a graphical user interface (GUI) may be illustrated to a user to adjust aim of the terminal according to the adjusted communication parameters. That is, since the adjusted parameters may require physical orientation changes to the terminal, where the system herein may be configured to prevent transmission by the terminal unless the terminal is aimed correctly, various measures may be taken to guide a user. (Note that the GUI described herein may also be used for initial communication parameters, and need not be limited to only adjusted communication parameters.) For instance, the terminal (or a mobile device attached to the terminal) may utilize an embedded (or attached) compass to guide the operator of the mobile device to the direction it should point the mobile device (azimuth and elevation, i.e., tilt angle towards the satellite).

With regard to antenna pointing, the terminal transmitter will be activated only when it is within a "safe" shaking angle (e.g., 15 degrees) of the required pointing angle to the satellite, thus accounting for deviations in aim (e.g., caused by shaking of the terminal, such as from user hand shaking, vehicular travel, and so on). The terminal uses sensors (e.g., its own or else from an attached smartphone), such as its GPS coordinates and bearing, to enable activation/deactivation of the terminal's transmitter. A terminal's transmission may be disabled (e.g., within 100 msec) if the pointing angle envelope is ever exceeded. Note that the amount of "safe shaking angle" may be calculated, and the momentary shaking may be continuously estimated, such that if the shaking may point the antenna of the terminal into an interfering orientation, the user may be alerted and transmission is disabled. The transmission can be quickly enabled again (and the message transmission resumed) once the terminal is pointing back to the desired direction. This process is fast enough to permit mobile operation of the terminal for many consumer recreation activities (e.g., hiking, boating, and horse-back riding) without causing any adverse interference to incumbent receivers such as PtPRs and/or other satellites.

Figure 30A:
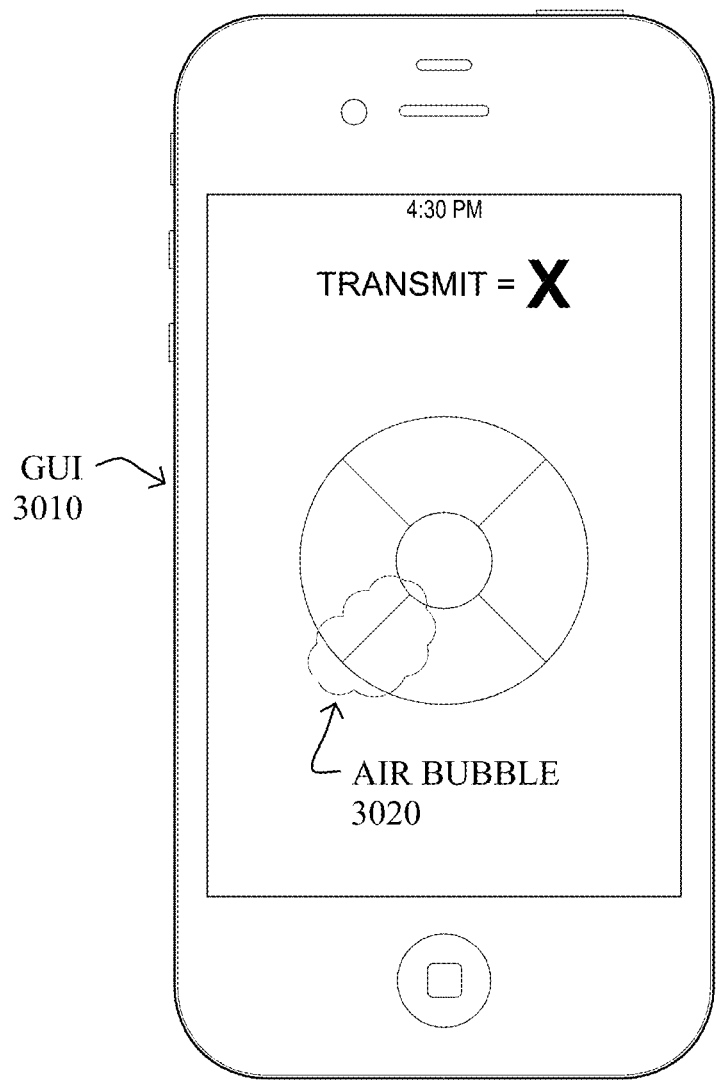
FIGS. 30A-30C illustrate examples of a graphical user interface (GUI) for use with avoidance of interference in wireless communication.
Figure 30B:
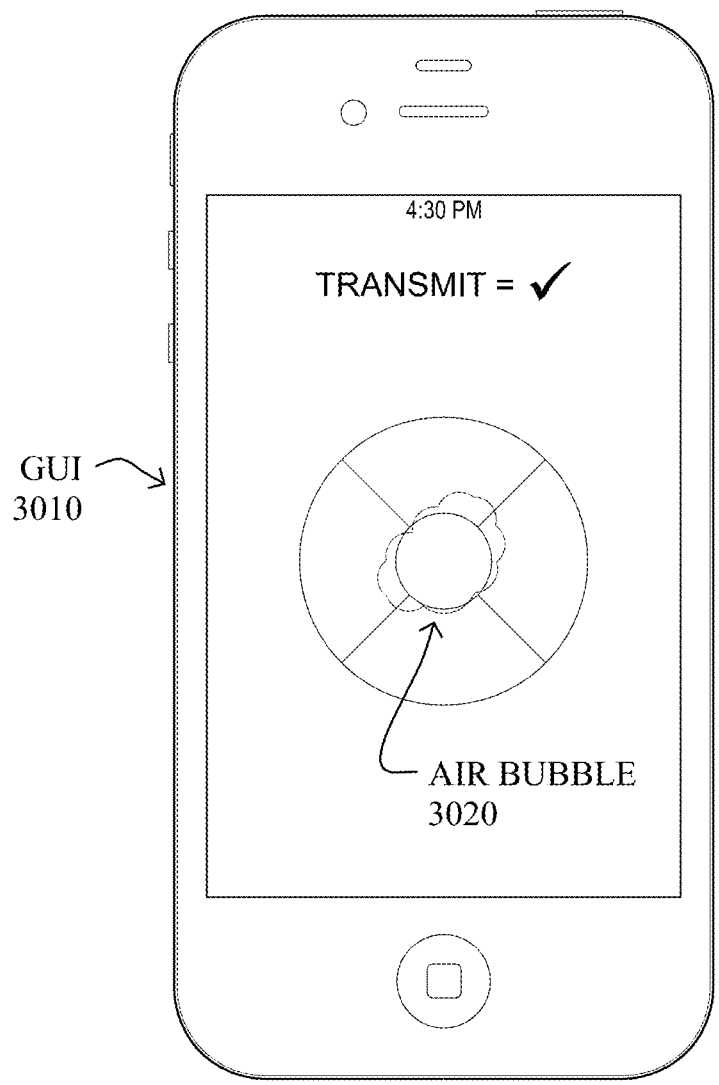
Figure 30C:
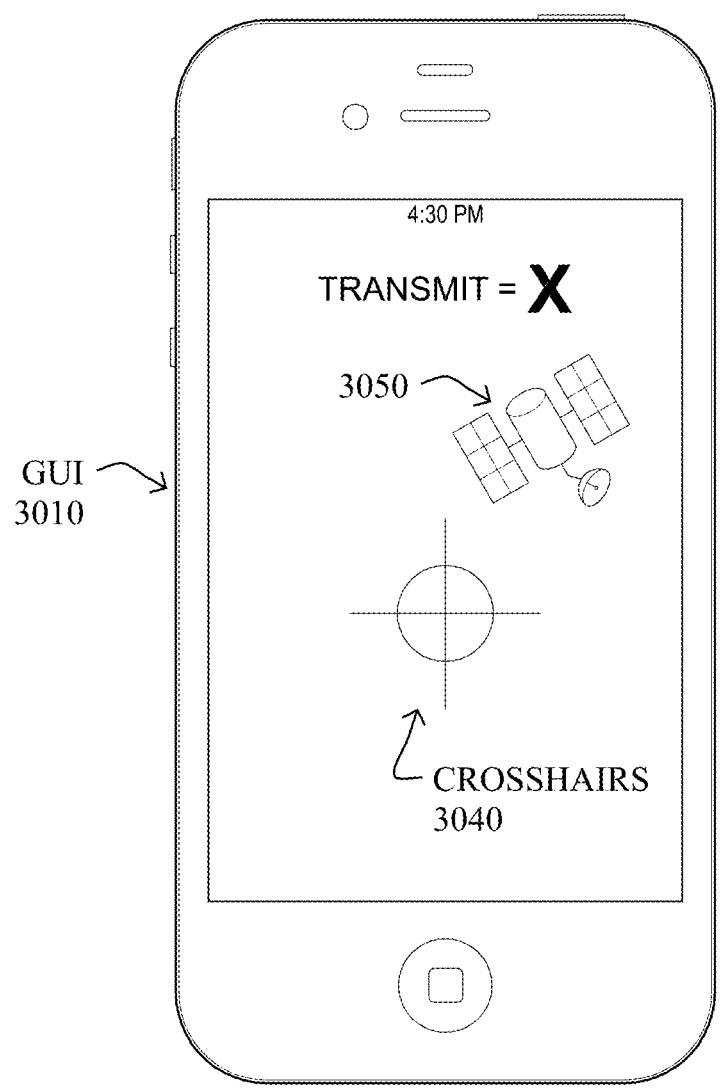

FIGS. 30A-30B illustrate examples of a GUI that may be used according to the techniques described above. In particular, FIG. 30A illustrates an example "level" like GUI display 3010 with an "air bubble" 3020 to point the device to the desired angle. As shown in FIG. 30A, the illustrative air bubble 3020 is not "level", and as such, transmission would be prevented. However, as shown in FIG. 30B, when the terminal is appropriately aimed (whether directly at the intended receiver or else pointing to a direction other than the intended receiver in order to reduce link budget towards a specific unintended receiver), then the transmission may be permitted. An alternative GUI 3030 is shown in FIG. 30C, where stationary "crosshairs" 3040 are shown in an augmented reality display to aim at a satellite 3050 representing the desired direction to point the terminal (whether the satellite is actually located in that direction, or whether that merely represents the desired "aim" of the terminal to allow the transmission according to the acceptable communication parameters). Many other types of GUIs and functionalities may be conceived, and those shown herein are not meant to be limiting to the scope of the present disclosure.

Notably, in other embodiments, such as where user intervention is not necessary for movement (e.g., automated terminals, drones/UAVs, etc.), the terminals may be reaimed, repositioned, moved, elevated, etc., based on terminal-directed or server-directed commands according to the adjusted communication parameters as described herein. That is, no user-based GUI would be necessary to ensure proper adjustment/aim, where sensors and/or controls internal to the terminal would sufficiently and autonomously adjust the orientation of the terminal, accordingly.

In accordance with one or more particular embodiments herein, the techniques above may be used in conjunction with a "power save" mode. That is, determining to adjust the communication parameters may be in response to a power save mode at the terminal, where the terminal reduces its transmission power not because it would interfere with any unintended receivers (e.g., PtPRs), but rather because its calculation indicates that even if it would transmit using lower power, the intended receiver (e.g., satellite) would receive sufficient power above the satellite receiver's sensitivity (e.g., noise floor). In the case where the full-power transmission would not have interfered with the unintended receiver, then the terminal need not (though may still) mark the packet as transmitted with lower power for server validation as described above.

Figure 31:
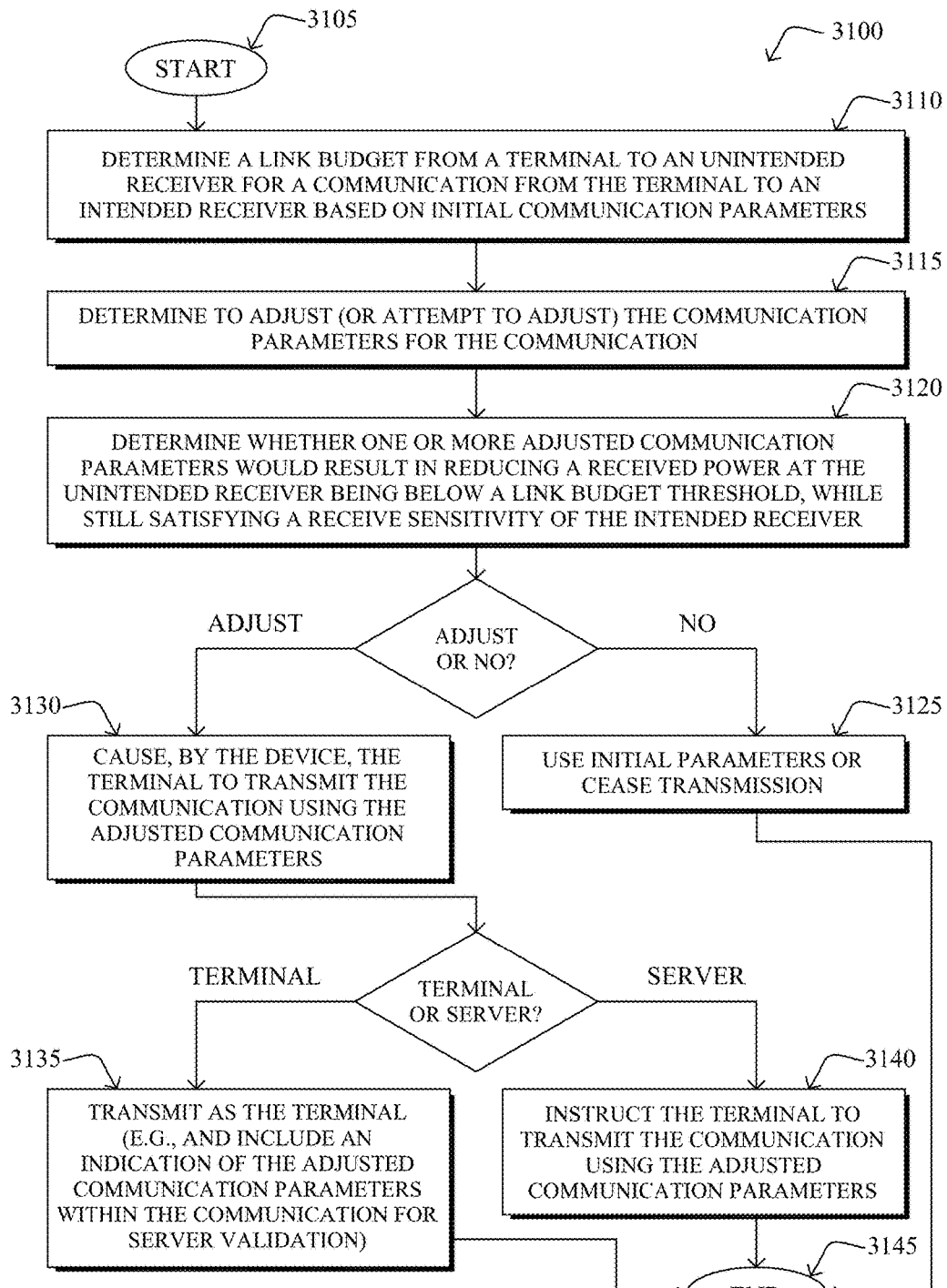
FIG. 31 illustrates an example procedure for reduced power for avoidance of interference in wireless communications.

FIG. 31 illustrates an example procedure for reduced power for avoidance of interference in wireless communications in accordance with one or more embodiments described herein. For example, one or more non-generic, specifically configured devices (e.g., server 500 and/or terminal 600) may perform procedure 3100 by executing stored instructions. As shown in FIG. 31, the procedure 3100 may start at step 3105, and continues to step 3110, where, as described in greater detail above, a device of a first wireless communication network determines a link budget from a terminal in the first communication network to an unintended receiver for a transmission from the terminal to an intended receiver in the first wireless communication network, based on the transmission being configured with initial communication parameters (e.g., a nominal transmission power, polarity, aimed direction, azimuth, elevation, location, height above sea level, etc.). Note that as described above, the device may be a terminal 600 or a server 500, though each may make the same determination, depending upon configuration and situation. Note also that the intended receiver may illustratively be a specific satellite (or more particularly, a ground station receiver associated with a specific satellite) of a satellite communication network, and the unintended receiver may illustratively be another satellite (or more particularly, a ground station receiver associated with another satellite) (e.g., in the same satellite communication network or a separate communication network) or an incumbent PtPR of a second wireless communication network. (It is important to note that for the sake of simplifying the explanation herein, the sensitivity and noise floor of the "receiver" may be discussed from the point of view of a satellite; however, those skilled in the art will understand that unless the satellite is its own processing entity, the affected receiver may actually reside at the ground station of the satellite. That is, a redirecting satellite may merely receive a signal, shift it to a new frequency, and transmit it down to its associated ground station (i.e., "mirroring" received signals), and in which case, the sensitivity and/or noise floor of interest herein correspond to the receiver of the ground station.)

In step 3115 the device may illustratively determine whether to adjust (or attempt to adjust) the communication parameters for the communication. For example, the device may determine that the link budget at an unintended receiver is over a link budget threshold, and may look to determine if any reduction in power would be beneficial for a successful communication (that is, in order to reduce the link budget below the link budget threshold, thus preventing interference at the unintended receiver). Alternatively, the device may determine to adjust the communication parameters merely in response to a power save mode at the terminal.

For any reason in step 3115 that indicates that parameter modification may be in order, in step 3120 the device may determine whether one or more adjusted communication parameters would result in reducing a received power at the unintended receiver being below a link budget threshold, while still satisfying a receive sensitivity of the intended receiver. The complexity of determining received power at an unintended receiver based on adjusted communication parameters is described above. In addition, determining whether receive sensitivity is satisfied at the intended receiver may be based on a calculation, or else based on feedback indicating actual received power at the intended receiver, as also described in greater detail above.

If adjusting the communication parameters would not result in a beneficial outcome (e.g., would not prevent or stop interfering with an unintended receiver or results in being below a power level that ensures reliable reception by the intended receiver), then in step 3125, the device may either use (or instruct to use) the initial communication parameters if acceptable, or else ceases the transmission (if unacceptable).

On the other hand, as described herein, in step 3130, the device may cause the terminal to transmit the communication using the adjusted communication parameters in response to the adjusted communication parameters resulting in a beneficial outcome (i.e., received power at the unintended receiver being below the link budget threshold, while still remaining above a receive sensitivity of the intended receiver).

As described above, when the device is the terminal, then in step 3135 causing comprises transmitting as the terminal (e.g., and including an indication of the adjusted communication parameters within the transmission for server validation). Note that if the aim of the terminal requires adjustment, such as to redirect the antenna pattern slightly away from the intended receiver, or to change polarity, etc., as described above, then a GUI may be illustrated on the terminal such that a user can adjust the aim of a terminal (e.g., hand-held terminals) according to the adjusted communication parameters. In this instance, the terminal may prevent transmission unless the terminal is aimed correctly (e.g., and accounting for deviations/shaking in the aim). As described previously, the GUI may instruct the user to aim slightly away from the intended receiver (e.g., "not directly toward" the intended receiver) only for the duration of the transmission and then guide the user to aim again at the direction of the intended satellite as to improve the reception by the terminal of signals coming from the satellite (or at least, more directly toward the intended receiver than the transmitting direction for receiving return communications from the intended receiver).

Alternatively, in step 3140, when the device is a server of the first communication network, then causing comprises instructing the terminal to transmit the communication using the adjusted communication parameters (such as in an instruction message, as described above). The illustrative simplified procedure 3100 may then end in step 3145.

It should be noted that while certain steps within procedure 3100 may be optional as described above, the steps shown in FIG. 31 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200 (from FIGS. 12A-12B above), 2600 and 2700 (from FIGS. 26-27 above), and 3100 are described separately, certain steps from each procedure may be incorporated into each other procedure, and the procedures are not meant to be mutually exclusive.

While there have been shown and described illustrative embodiments that relate to interference management techniques in wireless communication networks, it is to be understood that various other adaptations and modifications may be made within the scope of the embodiments herein. For example, the embodiments may, in fact, be used in a variety of types of wireless communication networks and/or protocols, and need not be limited to the illustrative satellite network implementation, PtP networks, or even communication in the C-band. For example, though the disclosure was described with respect to satellite communication in the C-Band, those skilled in the art should understand that this was done only for illustrative purpose and without limitations. The techniques herein, in particular, are applicable to any other communication band such as the Ku-band (e.g., Downlink: 11.7-12.2 GHz; Uplink: 14.0-14.5 GHz) or any other suitable band. Furthermore, while the embodiments may have been demonstrated with respect to certain communication environments, physical environments, or device form factors, other configurations may be conceived by those skilled in the art that would remain within the contemplated subject matter of the description above.

Additionally, while certain configurations of terminals and receivers are shown (e.g., PtPRs and satellites), it is important to note that unintended receivers may actually be a part of the same communication network as the intended receiver, or at least the same type of device. For instance, an intended receiver could be a first satellite, and an unintended receiver may be a second satellite, which may be in the same network as the first satellite (e.g., preventing double reception of the same message), or else may be in a different network (e.g., a different satellite communication network that uses the same channels). Further, it is also important to note that in the case of drones or UAVs, a portion of the communication parameters takes into consideration elevation above sea level, such as raising or lowering the drone to change the link-budget calculations or line-of-sight determinations detailed above.

In particular, the foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
   determining, by a device of a first wireless communication network, that initial communication parameters for a communication from a terminal in the first wireless communication network to an intended receiver in the first wireless communication network would result in an unintended receiver receiving the communication at a received power above an interfering threshold level;

in response, determining, by the device, one or more adjusted communication parameters that would result in the unintended receiver receiving the communication at a received power below the interfering threshold level and also would result in the communication satisfying a receiver sensitivity of the intended receiver, wherein the one or more adjusted communication parameters comprise an aim of an antenna of the terminal;

illustrating, by the device, a user interface (UI) to a user to adjust the aim of the antenna of the terminal according to the adjusted communication parameters;

preventing, by the device, the terminal from transmitting the communication unless the antenna of the terminal is aimed according to the adjusted communication parameters; and causing, by the device, the terminal to use the adjusted communication parameters to transmit the communication.

2. The method as in claim 1, wherein the device is one of either the terminal or a computing device locally associated with the terminal, and wherein causing comprises transmitting the communication through the terminal.

3. The method as in claim 2, further comprising:
including an indication of the adjusted communication parameters within the communication for server validation.

4. The method as in claim 1, wherein the device is a server of the first communication network, and wherein causing comprises instructing, by the server, the terminal to transmit the communication using the adjusted communication parameters.

5. The method as in claim 1, further comprising:
determining to also adjust transmission power as an adjusted communication parameter of the one or more adjusted communication parameters.

6. The method as in claim 1, wherein the intended receiver is a receiver at a satellite of a satellite communication network.

7. The method as in claim 6, wherein the unintended receiver is a receiver at another satellite of another satellite communication network.

8. The method as in claim 1, wherein the unintended receiver is a point-to-point receiver (PtPR) of a second wireless communication network.

9. The method as in claim 1, wherein the initial and adjusted communication parameters are selected from: polarity; direction; azimuth; elevation; location; and height above sea level.

10. The method as in claim 1, wherein preventing further comprises:
accounting for deviations in aim caused by inaccuracy of one or more sensors of the terminal to determine the aim of the antenna.

11. The method as in claim 1, wherein preventing further comprises:
accounting for deviations in aim caused by shaking of the terminal.

12. The method as in claim 1, further comprising:
instructing the user to aim the antenna of the terminal in a first direction not directly toward the intended receiver for the duration of the transmission; and
instructing the user to aim the antenna of the terminal in a second direction more directly toward the intended receiver than the first direction for receiving return communications from the intended receiver.

13. The method as in claim 1, wherein the device determines whether the receiver sensitivity is satisfied at the intended receiver based on feedback indicating actual received power at the intended receiver.

14. The method as in claim 1, wherein the terminal and device comprise a configuration-selected from a group consisting of: a standalone device integrated with the terminal; a terminal physically attached to a personal mobile device; a terminal that is communicatively paired to a personal mobile device; a terminal paired with an Internet of Things (IoT) device; a terminal associated with an unmanned aerial vehicle (UAV) as the device; and a device application operating on a personal mobile device associated with the terminal.

15. An apparatus, comprising:
one or more network interfaces to communicate as a device of at least a first wireless communication network;
a processor coupled to the network interfaces and adapted to execute one or more processes; and
a memory configured to store a process executable by the processor, the process when executed operable to:
determine that initial communication parameters for a communication from a terminal in the first wireless communication network to an intended receiver in the first wireless communication network would result in an unintended receiver receiving the communication at a received power above an interfering threshold level;
determine, in response, one or more adjusted communication parameters that would result in the unintended receiver receiving the communication at a received power below the interfering threshold level and also would result in the communication satisfying a receiver sensitivity of the intended receiver, wherein the one or more adjusted communication parameters comprise an aim of an antenna of the terminal;
illustrate a user interface (UI) to a user to adjust the aim of the antenna of the terminal according to the adjusted communication parameters;
prevent the terminal from transmitting the communication unless the antenna of the terminal is aimed according to the adjusted communication parameters; and
cause the terminal to use the adjusted communication parameters to transmit the communication.

16. The apparatus as in claim 15, wherein the apparatus is one of either the terminal or a computing device locally associated with the terminal, and wherein causing comprises transmitting the communication through the terminal.

17. The apparatus as in claim 15, wherein the apparatus is a server of the first communication network, and wherein causing comprises instructing the terminal to transmit the communication using the adjusted communication parameters.

18. A tangible, non-transitory, computer-readable medium having computer-executable instructions stored thereon that, when executed by a processor on a computer of a device of a first wireless communication network, cause the computer to perform a method comprising:
determining that initial communication parameters for a communication from a terminal in the first wireless communication network to an intended receiver in the first wireless communication network would result in an unintended receiver receiving the communication at a received power above an interfering threshold level;

in response, determining one or more adjusted communication parameters that would result in the unintended receiver receiving the communication at a received power below the interfering threshold level and would also result in the communication satisfying a receiver sensitivity of the intended receiver, wherein the one or more adjusted communication parameters comprise an aim of an antenna of the terminal;

illustrating a user interface (UI) to a user to adjust the aim of the antenna of the terminal according to the adjusted communication parameters;

preventing the terminal from transmitting the communication unless the antenna of the terminal is aimed according to the adjusted communication parameters; and causing the terminal to use the adjusted communication parameters to transmit the communication.

19. The method as in claim 1, wherein the interfering threshold level is based on one or both of a receiver sensitivity of the unintended receiver and a noise floor of the unintended receiver.

20. The method as in claim 1, wherein the aim of the antenna corresponds to an aimed direction of the terminal.

21. The method as in claim 1, further comprising:
computing, for the communication from the terminal to the intended receiver using the initial communication parameters, a first link budget towards the intended receiver and a second link budget towards the unintended receiver;

wherein determining that the initial communication parameters for the communication would result in the unintended receiver receiving the communication at a received power above the interfering threshold level is based on the first link budget being above the receiver sensitivity of the intended receiver with the second link budget being above the interfering threshold level of the unintended receiver; and wherein determining the one or more adjusted communication parameters that would result in the unintended receiver receiving the communication at a received power below the interfering threshold level and also would result in the communication satisfying a receiver sensitivity of the intended receiver comprises determining the one or more adjusted communication parameters so as to ensure that a third link budget towards the intended receiver, calculated using the one or more adjusted communication parameters, is above the receiver sensitivity of the intended receiver, and also to ensure that a fourth link budget towards the unintended receiver, calculated using the one or more adjusted communication parameters, is below the interfering threshold level of the unintended receiver.

22. The computer-readable medium as in claim 18, wherein the device is selected from a group consisting of: the terminal; a computing device locally associated with the terminal; and a server of the first wireless communication network.

* * * * *